US012679579B2

(12) United States Patent
Barbaric et al.

(10) Patent No.: US 12,679,579 B2
(45) **Date of Patent: *Jul. 14, 2026**

(54) METHODS AND SYSTEMS FOR FILLING A PREPACKAGED CONTAINER

(71) Applicant: Airgraft Inc., Montreal (CA)

(72) Inventors: Mladen Barbaric, Westmount (CA); Kisae Kim, Westmount (CA); Sungmoon Kim, Brossard (CA); Bong Geun Kim, Candiac (CA)

(73) Assignee: Airgraft Inc., Montreal (CA)

( * ) Notice: Subject to any disclaimer, the term of this patent is extended or adjusted under 35 U.S.C. 154(b) by 605 days.

This patent is subject to a terminal disclaimer.

(21) Appl. No.: 17/867,060

(22) Filed: Jul. 18, 2022

(65) Prior Publication Data

US 2023/0294855 A1 Sep. 21, 2023

Related U.S. Application Data

(63) Continuation of application No. 17/062,030, filed on Oct. 2, 2020, now Pat. No. 11,390,403, which is a (Continued)

(51) Int. Cl.
*B65B 3/14* (2006.01)
*A24D 1/14* (2006.01)

(Continued)

(52) U.S. Cl.
CPC .................. *B65B 3/14* (2013.01); *A24D 1/14* (2013.01); *A24F 40/80* (2020.01); *B65B 3/28* (2013.01);

(Continued)

(58) Field of Classification Search
CPC ............. B67D 7/344; B67D 7/32; A24D 1/14
See application file for complete search history.

(56) References Cited

U.S. PATENT DOCUMENTS 4,756,318 A 7/1988 Clearman et al.
4,947,874 A 8/1990 Brooks et al.

(Continued)

FOREIGN PATENT DOCUMENTS

CA 2805553 C 1/2015
CA 3083248 A1 5/2019

(Continued)

OTHER PUBLICATIONS

Communication, dated Jul. 11, 2022, for European Application No. 19873242.2 (11 total pages).

(Continued)

*Primary Examiner* — Timothy P. Kelly

(57) ABSTRACT

In some embodiments, an apparatus includes a housing and a mount. The housing includes a cover portion and a base portion. The cover portion and the base portion define an interior. The housing defines an opening via which the interior can be accessed from a region external to the housing. The mount is coupled to the base portion and configured to maintain a position of a fillable component within the interior of the housing such that an elastomeric membrane of the fillable component is aligned with the opening defined by the housing and a reservoir of the fillable component is accessible by a needle via the opening and the elastomeric membrane.

13 Claims, 49 Drawing Sheets

Related U.S. Application Data continuation of application No. 16/655,152, filed on Oct. 16, 2019, now Pat. No. 10,822,123.

(60) Provisional application No. 62/746,248, filed on Oct. 16, 2018.

(51) Int. Cl.

| | |
|---|---|
| ***A24F 40/80*** | (2020.01) |
| ***B65B 3/28*** | (2006.01) |
| ***B65D 25/10*** | (2006.01) |
| ***B67D 7/02*** | (2010.01) |
| ***B67D 7/14*** | (2010.01) |
| ***B67D 7/32*** | (2010.01) |
| ***B67D 7/82*** | (2010.01) |
| *A24F 42/80* | (2020.01) |

(52) U.S. Cl.
CPC ........... *B65D 25/10* (2013.01); *B67D 7/0288* (2013.01); *B67D 7/145* (2013.01); *B67D 7/3209* (2013.01); *B67D 7/82* (2013.01); *A24F 42/80* (2020.01)

(56) References Cited

U.S. PATENT DOCUMENTS

| | | | |
|---|---|---|---|
| 5,060,671 | A | 10/1991 | Counts et al. |
| 5,095,921 | A | 3/1992 | Losee et al. |
| 5,105,831 | A | 4/1992 | Banerjee et al. |
| 5,135,009 | A | 8/1992 | Muller et al. |
| 5,179,966 | A | 1/1993 | Losee et al. |
| 5,226,411 | A | 7/1993 | Levine |
| 5,249,586 | A | 10/1993 | Morgan et al. |
| 5,388,594 | A | 2/1995 | Counts et al. |
| 5,408,574 | A | 4/1995 | Deevi et al. |
| 5,564,442 | A | 10/1996 | MacDonald et al. |
| 5,915,387 | A | 6/1999 | Baggett, Jr. et al. |
| 6,053,176 | A | 4/2000 | Adams et al. |
| 6,501,052 | B2 | 12/2002 | Cox et al. |
| 6,513,524 | B1 | 2/2003 | Storz |
| 6,532,965 | B1 | 3/2003 | Abhulimen et al. |
| 6,701,921 | B2 | 3/2004 | Sprinkel, Jr. et al. |
| 7,096,896 | B2 | 8/2006 | Py |
| 7,832,410 | B2 | 11/2010 | Hon |
| 7,997,280 | B2 | 8/2011 | Rosenthal |
| 8,151,832 | B1 * | 4/2012 | Dorney .................. G07F 9/001 141/94 |
| 8,499,766 | B1 | 8/2013 | Newton |
| 8,528,569 | B1 | 9/2013 | Newton |
| 8,689,804 | B2 | 4/2014 | Fernando et al. |
| 8,707,965 | B2 | 4/2014 | Newton |
| 8,733,346 | B2 | 5/2014 | Rinker |
| 8,897,628 | B2 | 11/2014 | Conley et al. |
| 8,991,402 | B2 | 3/2015 | Bowen et al. |
| 9,078,473 | B2 | 7/2015 | Worm et al. |
| 9,308,336 | B2 | 4/2016 | Newton |
| 9,408,416 | B2 | 8/2016 | Monsees et al. |
| 9,516,899 | B2 | 12/2016 | Plojoux et al. |
| 9,549,573 | B2 | 1/2017 | Monsees et al. |
| 9,596,887 | B2 | 3/2017 | Newton |
| 9,717,276 | B2 | 8/2017 | Brammer et al. |
| 9,820,509 | B2 | 11/2017 | Newton et al. |
| 9,894,938 | B2 | 2/2018 | Vick et al. |
| 9,943,114 | B2 | 4/2018 | Batista |
| 9,949,507 | B2 | 4/2018 | Flick |
| 9,986,767 | B2 | 6/2018 | Batista et al. |
| 9,999,250 | B2 | 6/2018 | Minskoff et al. |
| D825,102 | S | 8/2018 | Bowen et al. |
| 10,045,567 | B2 | 8/2018 | Monsees et al. |
| 10,045,568 | B2 | 8/2018 | Monsees et al. |
| 10,058,124 | B2 | 8/2018 | Monsees et al. |
| 10,058,129 | B2 | 8/2018 | Monsees et al. |
| 10,058,130 | B2 | 8/2018 | Monsees et al. |
| 10,070,669 | B2 | 9/2018 | Monsees et al. |
| 10,076,139 | B2 | 9/2018 | Monsees et al. |
| 10,104,915 | B2 | 10/2018 | Bowen et al. |
| 10,111,470 | B2 | 10/2018 | Monsees et al. |
| 10,117,465 | B2 | 11/2018 | Monsees et al. |
| 10,117,466 | B2 | 11/2018 | Monsees et al. |
| 10,130,780 | B2 | 11/2018 | Talon |
| 10,159,282 | B2 | 12/2018 | Monsees et al. |
| 10,201,190 | B2 | 2/2019 | Monsees et al. |
| 10,206,429 | B2 | 2/2019 | Davis et al. |
| 10,231,486 | B2 | 3/2019 | Bowen et al. |
| 10,244,793 | B2 | 4/2019 | Monsees et al. |
| 10,247,443 | B2 | 4/2019 | Flick |
| 10,264,823 | B2 | 4/2019 | Monsees et al. |
| 10,279,934 | B2 | 5/2019 | Christensen et al. |
| 10,405,582 | B2 | 9/2019 | Hatton et al. |
| 10,426,196 | B2 | 10/2019 | Calfee et al. |
| 10,440,989 | B2 | 10/2019 | Gardella et al. |
| 10,524,980 | B2 | 1/2020 | Naing et al. |
| 10,568,357 | B2 | 2/2020 | Metrangolo et al. |
| 10,595,565 | B2 | 3/2020 | Hu et al. |
| 10,721,971 | B2 | 7/2020 | Barbaric et al. |
| 10,729,176 | B2 | 8/2020 | Vasiliev et al. |
| 10,822,123 | B2 | 11/2020 | Barbaric et al. |
| 10,834,968 | B2 | 11/2020 | John et al. |
| 10,856,576 | B2 | 12/2020 | Mironov et al. |
| 10,881,144 | B2 | 1/2021 | Batista et al. |
| 10,973,263 | B2 | 4/2021 | Fursa |
| 11,039,644 | B2 | 6/2021 | Paprocki et al. |
| 11,044,950 | B2 | 6/2021 | Collett et al. |
| 11,129,410 | B2 | 9/2021 | Barbaric et al. |
| 11,154,086 | B2 | 10/2021 | Griscik et al. |
| 11,178,899 | B2 | 11/2021 | Schaller et al. |
| 11,200,770 | B2 | 12/2021 | Hubbard et al. |
| 11,272,731 | B2 | 3/2022 | Zuber et al. |
| 11,311,051 | B2 | 4/2022 | Mironov et al. |
| 11,390,403 | B2 | 7/2022 | Barbaric et al. |
| 11,406,136 | B2 | 8/2022 | Barbaric et al. |
| 2003/0106551 | A1 | 6/2003 | Sprinkel et al. |
| 2004/0182389 | A1 | 9/2004 | Sprinkel et al. |
| 2010/0112815 | A1 | 5/2010 | O'Dougherty et al. |
| 2011/0277761 | A1 | 11/2011 | Terry et al. |
| 2013/0284192 | A1 | 10/2013 | Peleg et al. |
| 2013/0319439 | A1 | 12/2013 | Gorelick et al. |
| 2014/0366898 | A1 | 12/2014 | Monsees et al. |
| 2014/0378790 | A1 | 12/2014 | Cohen |
| 2015/0090280 | A1 | 4/2015 | Chen |
| 2015/0150308 | A1 | 6/2015 | Monsees et al. |
| 2015/0181945 | A1 | 7/2015 | Tremblay |
| 2015/0224268 | A1 | 8/2015 | Henry et al. |
| 2015/0296887 | A1 | 10/2015 | Zhu |
| 2015/0320116 | A1 | 11/2015 | Bleloch et al. |
| 2016/0080535 | A1 | 3/2016 | Stanimirovic et al. |
| 2016/0128384 | A1 | 5/2016 | Luciani |
| 2016/0157524 | A1 | 6/2016 | Bowen et al. |
| 2016/0200463 | A1 * | 7/2016 | Hodges .................. G07F 13/06 53/136.3 |
| 2016/0295917 | A1 | 10/2016 | Malgat et al. |
| 2016/0331031 | A1 | 11/2016 | Malgat et al. |
| 2016/0338413 | A1 | 11/2016 | Li et al. |
| 2016/0363917 | A1 | 12/2016 | Blackley |
| 2016/0366947 | A1 | 12/2016 | Monsees et al. |
| 2017/0042235 | A1 | 2/2017 | Gorilovsky |
| 2017/0156399 | A1 | 6/2017 | Freeman et al. |
| 2017/0208867 | A1 | 7/2017 | Li et al. |
| 2017/0238617 | A1 | 8/2017 | Scatterday |
| 2017/0330137 | A1 * | 11/2017 | Wade ................ G06K 19/0614 |
| 2018/0000157 | A1 | 1/2018 | Batista et al. |
| 2018/0000160 | A1 | 1/2018 | Taschner et al. |
| 2018/0043114 | A1 | 2/2018 | Bowen et al. |
| 2018/0060873 | A1 | 3/2018 | Chu |
| 2018/0077967 | A1 | 3/2018 | Hatton et al. |
| 2018/0093054 | A1 | 4/2018 | Bowen et al. |
| 2018/0104214 | A1 | 4/2018 | Raichman |
| 2018/0117268 | A1 | 5/2018 | Selby et al. |
| 2018/0177231 | A1 | 6/2018 | Woodbine et al. |
| 2019/0158938 | A1 | 5/2019 | Bowen et al. |
| 2019/0159519 | A1 | 5/2019 | Bowen et al. |
| 2019/0183185 | A1 | 6/2019 | Manas et al. |
| 2019/0204126 | A1 | 7/2019 | Kane et al. |

(56) References Cited

U.S. PATENT DOCUMENTS

| | | | |
|---|---|---|---|
| 2019/0261689 | A1 | 8/2019 | Bowen et al. |
| 2019/0335817 | A1 | 11/2019 | Freeman et al. |
| 2020/0029618 | A1 | 1/2020 | Fraser et al. |
| 2020/0085105 | A1 | 3/2020 | Barbaric et al. |
| 2020/0093172 | A1 | 3/2020 | Liu |
| 2020/0113245 | A1 | 4/2020 | Rosser et al. |
| 2020/0113246 | A1 | 4/2020 | Barbaric et al. |
| 2020/0206430 | A1 | 7/2020 | Woodbine et al. |
| 2020/0352224 | A1 | 11/2020 | Plojoux et al. |
| 2021/0015148 | A1 | 1/2021 | Shenton et al. |
| 2021/0045452 | A1 | 2/2021 | Barbaric et al. |
| 2021/0046261 | A1 | 2/2021 | Barbaric et al. |
| 2021/0084977 | A1 | 3/2021 | Batista et al. |
| 2021/0100281 | A1 | 4/2021 | Abi Aoun et al. |
| 2021/0120876 | A1 | 4/2021 | Saleem et al. |
| 2021/0145076 | A1 | 5/2021 | Barbaric et al. |
| 2021/0219386 | A1 | 7/2021 | Atkins et al. |
| 2021/0235762 | A1 | 8/2021 | Jochnowitz |
| 2021/0259309 | A1 | 8/2021 | Taurino |
| 2021/0261277 | A1 | 8/2021 | Barbaric et al. |
| 2021/0361890 | A1 | 11/2021 | Li et al. |
| 2021/0401048 | A1 | 12/2021 | Egoyants et al. |
| 2022/0030944 | A1 | 2/2022 | Griscik et al. |
| 2022/0030954 | A1 | 2/2022 | Rath et al. |
| 2022/0071266 | A1 | 3/2022 | Fujikura et al. |
| 2022/0087311 | A1 | 3/2022 | Han et al. |
| 2022/0104542 | A1 | 4/2022 | Barbaric et al. |
| 2022/0117307 | A1 | 4/2022 | Abi Aoun et al. |
| 2022/0125112 | A1 | 4/2022 | Zuber et al. |
| 2022/0167663 | A1 | 6/2022 | Paton et al. |
| 2023/0148681 | A1 | 5/2023 | Barbaric et al. |

FOREIGN PATENT DOCUMENTS

| | | | |
|---|---|---|---|
| CA | 3086414 | A1 | 6/2019 |
| CN | 204466911 | U | 7/2015 |
| CN | 105962427 | A | 9/2016 |
| CN | 107822208 | A | 3/2018 |
| CN | 110236228 | A | 9/2019 |
| EP | 2592005 | A1 | 5/2013 |
| EP | 3957197 | A1 | 2/2022 |
| FR | 3039039 | A1 | 1/2017 |
| WO | WO-9527411 | A1 | 10/1995 |
| WO | WO-9632854 | A2 | 10/1996 |
| WO | WO-2016096745 | A1 | 6/2016 |
| WO | WO-2017139595 | A1 | 8/2017 |
| WO | WO-2017185051 | A1 | 10/2017 |
| WO | WO-2017187148 | A1 | 11/2017 |
| WO | WO-2018024154 | A1 | 2/2018 |
| WO | WO-2019082280 | A1 | 5/2019 |
| WO | WO-2019104227 | A1 | 5/2019 |
| WO | WO-2019114597 | A1 | 6/2019 |
| WO | WO-2019126805 | A1 | 6/2019 |
| WO | WO-2019138043 | A1 | 7/2019 |
| WO | WO-2019152873 | A1 | 8/2019 |
| WO | WO-2019204812 | A1 | 10/2019 |
| WO | WO-2020056510 | A1 | 3/2020 |
| WO | WO-2020077454 | A1 | 4/2020 |
| WO | WO-2020077455 | A1 | 4/2020 |
| WO | WO-2021026660 | A1 | 2/2021 |
| WO | WO-2021026661 | A1 | 2/2021 |
| WO | WO-2021069525 | A1 | 4/2021 |
| WO | WO-2021069526 | A1 | 4/2021 |
| WO | WO-2021118186 | A2 | 6/2021 |
| WO | WO-2022118009 | A1 | 6/2022 |
| WO | WO-2022133611 | A1 | 6/2022 |
| WO | WO-2022198337 | A1 | 9/2022 |

OTHER PUBLICATIONS

Extended European Search Report and Search for European Application No. 19861746.6 Mailed on May 17, 2022, 10 pages.
Extended European Search Report for Application EP19873242.2, mailed Oct. 12, 2022, 11 pages.
International Search Report and Written Opinion for Application No. PCT/CA2022/050455 dated Jun. 20, 2022, 10 pages.
International Search Report and Written Opinion for International Application No. PCT/CA2021/051881 dated Feb. 23, 2022, 10 pages.
International Search Report and Written Opinion issued for PCT/CA2020/051113, mailed Nov. 5, 2020.
International Search Report and Written Opinion issued for PCT/CA2020/051114, mailed Nov. 13, 2020.
International Search Report issued for PCT/CA2019/051326 mailed on Nov. 21, 2019.
International Search Report issued for PCT/CA2019/051468 mailed on Dec. 19, 2019.
International Search Report issued for PCT/CA2019/051469 mailed on Dec. 30, 2019.

* cited by examiner

METHODS AND SYSTEMS FOR FILLING A PREPACKAGED CONTAINER

CROSS-REFERENCE TO RELATED APPLICATIONS

This application is a continuation of U.S. patent application Ser. No. 17/062,030, filed Oct. 2, 2020, entitled "Methods and Systems for Filling a Prepackaged Container", which is a continuation of U.S. patent application Ser. No. 16/655,152, filed Oct. 16, 2019, now U.S. Pat. No. 10,822,123, issued on Nov. 3, 2020, entitled "Methods and Systems for Filling a Prepackaged Container," which claims priority to and the benefit of U.S. Provisional Application No. 62/746,248, filed Oct. 16, 2018, entitled "Methods and Systems for Filling a Prepackaged Container," the entire contents of which are hereby expressly incorporated by reference for all purposes.

BACKGROUND

Electronic vapor delivery systems are increasingly popular. Such systems have been developed for inhalation-based delivery of cannabis components and nicotine.

BRIEF DESCRIPTION OF THE DRAWINGS

FIG. 24A shows one or more of the components of the filling assembly and FIG. 24B shows a sectional view of the filling assembly to show one or more of the components of the filling assembly that may have been occluded in FIG. 24A.

DETAILED DESCRIPTION

As the popularity of, and commercial interest in, electronic vapor delivery systems (also referred to as "vapor devices" or "vaporizers") such as electronic cigarettes ("e-cigs") continues to grow, their manufacture and distribution is becoming more globally widespread. However, regulation is not yet finalized in many jurisdictions, and varies widely across jurisdictions. For example, some jurisdictions may allow the manufacturing of vaporizers but forbid filling the vaporizers with consumables, such as cannabis. In addition, it might also be commercially advantageous to manufacture the vaporizer in one place (e.g., with lower labor cost) and fill the vaporizer with consumables in another place (e.g., closer to the source of the consumables). To streamline the production of filled vaporizers ready for consumers, it can be helpful to have standardization and quality control for vaporizers and the filling devices. Furthermore, it would be advantageous to be able to ensure the traceability of individual components of a vaporizer system (e.g., vaporizer cartridges and/or disposable vaporizers) and substances disposed within reservoirs of the components, and to be able to store information relating to each component and delivered substance for later access and usage. Systems and methods for achieving such objectives are set forth herein.

Figure 1A:
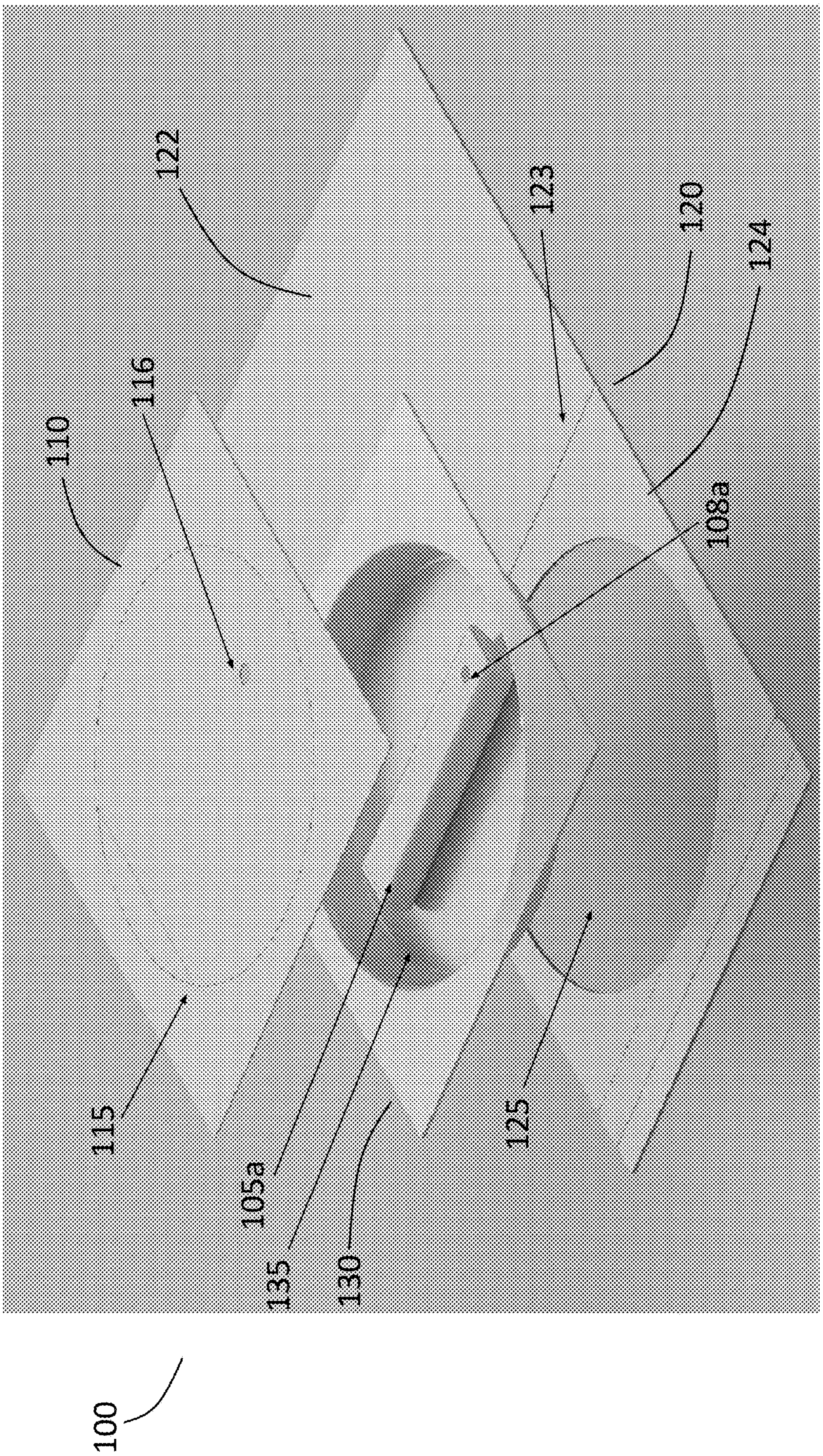
FIG. 1A shows an exploded view of a package configured to hold a vaporizer for consumable filling, according to an embodiment.

FIG. 1A shows an exploded view of a package 100 configured to hold a vaporizer 105*a* (also referred to as a Tillable component) for consumable filling, according to an embodiment. The package 100 includes a top section 110, a base section 120 (also referred to as a bottom section 120), and a middle section 130 disposed between the top section 110 and the base section 120. The middle section 130 includes a depressed region 135 (also referred to as a dented region 135) to receive the vaporizer 105*a* for consumable filling via an opening 108*a* located on the vaporizer 105*a*. The top section 110 includes a filling fixture 116 that is aligned with the opening 108*a* on the vaporizer 105*a* when the package 100 is assembled. During use, a filling device (e.g., a needle) can fill the vaporizer 105*a* via the filling fixture 116 and the opening 108*a*.

The top section 110 also includes a perforated line 115 substantially along the perimeter of the depressed region 135 of the middle section. After the filling of the vaporizer 105*a* and before the use of the filled vaporizer 105*a*, the package 100 can be torn open along the perforated line 115 so as to retrieve the vaporizer 105*a*. In some embodiments, the depressed region 135 is substantially round (as illustrated in FIG. 1A). In some embodiments, the depressed region 135 is rectangular. In some embodiments, the depressed region 135 is elliptical. In some embodiments, the depressed region 135 can have any other appropriate shape.

The bottom section 120 of the package 100 includes a cover 122 and a receiving structure 124 separated by a folding line 123 (e.g., a perforated line). The receiving structure 124 defines an aperture 125 that has substantially the same shape as the depressed region 135 so as to receive the depressed region 135 when the package 100 is assembled. In addition, when the package is assembled, the cover 122 can be folded over along the folding line 123 so as to cover the top section 110 (including the filling fixture 116) and prevent undesired substance (e.g., dust) from entering the vaporizer 105*a* via the filling fixture 116.

In some embodiments, the package 100 can be encoded with one or more types of information to facilitate the subsequent filling process. In some embodiments, the package 100 can be encoded with filling instructions to direct the filling system during filling. The instructions can include, for example, the type of consumable to be filled in the vaporizer 105*a*, the volume of the consumable, the speed of filling.

In some embodiments, the package 100 can be encoded with information regarding the consumable to be filled into the vaporizer 105*a*. In some embodiments, the vaporizer 105*a* can be configured to vaporize nicotine. In these instances, the information encoded on the package 100 can include nicotine concentration, nicotine plant genetics, and nicotine provenance data (e.g., the tobacco plant(s) from which the nicotine was derived, the grow location of the nicotine plant(s), the growth and/or harvesting date of the nicotine plant(s), etc.), among others.

In some embodiments, the vaporizer 105*a* can be configured to vaporize cannabis (or its derivatives. In these instances, the information encoded on the package 100 can include cannabinoid concentration(s) and cannabinoid provenance data (e.g., the cannabis plant(s) from which the cannabinoid(s) were derived, the grow location of the cannabis plant(s), the growth and/or harvesting date of the cannabis plant(s), the dispensary from which the cannabinoid(s) were obtained, etc.), among others.

In some embodiments, the vaporizer 105*a* can be configured to vaporize medicine. In these instances, the information encoded on the package 100 can include, for example, active ingredient (e.g., drug) concentration, inactive ingredient concentration, and/or the like.

In some embodiments, the information encoded in the package 100 can include information regarding the vaporizer 105*a* disposed within the package 100. For example, the encoded information can include the identity of the manufacturer of the vaporizer 105*a*, the address of the manufacturer, the serial number (or other identification information) of the vaporizer 105*a*, and the target market of the vaporizer 105*a*, among others.

In some embodiments, the vaporizer 105*a* is configured to be filled with a liquid consumable (e.g., cannabis oil). In some embodiments, the vaporizer 105*a* can be configured to be filled with a solid consumable, such as powders or leaves. In some embodiments, vaporizer 105*a* is configured to be filled with a mixture of liquid and solid materials.

In some embodiments, one or more types of the above mentioned information can be encoded into a tag (not shown in FIG. 1A) coupled to the package 100, and the tag can be readable by the filling system that is employed to fill the vaporizer with the consumable. The tag can be disposed at any proper location, such as on the cover 122, on the top section 110, or any other locations. In some embodiments, the tag includes a radio frequency identification (RFID) tag. In some embodiments, the tag includes a bar code. In some embodiments, the tag includes a QR code. In some embodiments, one or more types of the above mentioned information can be stored in the memory of the vaporizer 105*a*.

Various materials can be used to construct the package 100. In some embodiments, the package 100 can be made of cardboard (or similar paper-based materials). In some embodiments, the package 100 can be made of a plastic material. In some embodiments, the package 100 can be made of a resin. In some embodiments, the package 100 can be made of glass. In some embodiments, the package 100 can be made of a metal.

In some embodiments, different portions of the package 100 can be made of different materials. For example, the middle section 130 can be made of rigid materials (e.g., metal or hard plastics) and the top section 110 can be made of a softer material (e.g., paper-based material). Any other proper combinations can also be used.

In some embodiments, the package 100 can further include a securing structure (see, e.g., FIGS. 3-5 below) to secure the vaporizer 105*a* within the package 100. In some embodiments, the securing structure can include a mount to receive and secure the vaporizer 105*a*. In some embodiments, the securing structure can include a slot (or cradle) to secure the vaporizer 105*a*. In some embodiments, the securing structure can include an adhesive surface (e.g., an adhesive pad) on the bottom of the depressed region 135 to secure the vaporizer 105*a*. In some embodiments, the securing structure can include one or more Velcro straps to secure the vaporizer 105*a*. Any other appropriate securing techniques can also be used.

Figure 1B:
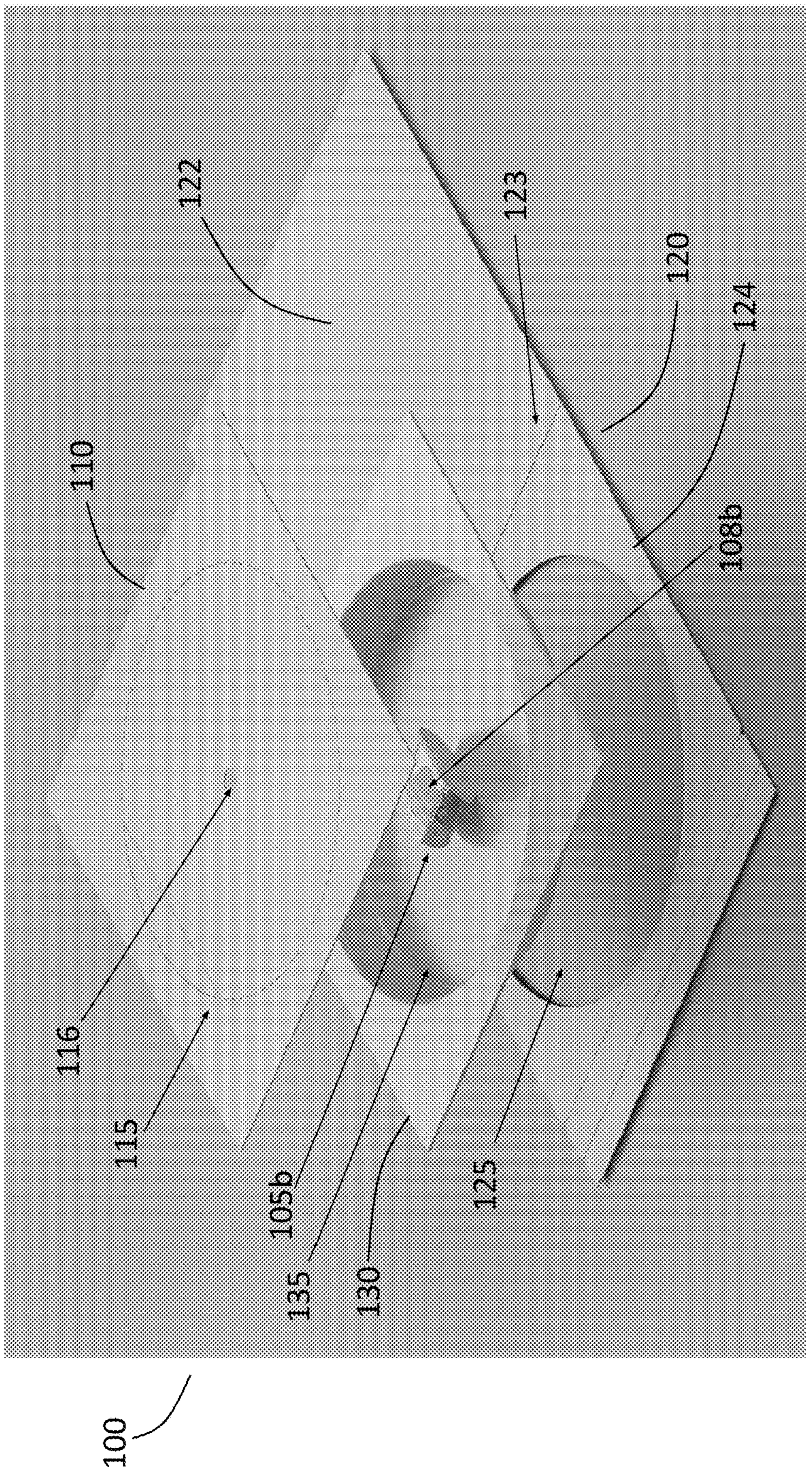
FIG. 1B shows an exploded view of a package configured to hold a capsule for consumable filling, according to an embodiment.

In some embodiments, in addition to the opening 108*a*, the vaporizer 105*a* further includes a mouthpiece, a precursor reservoir, fluidic channels (e.g., microfluidics or other passageways), one or more chambers, a power supply, memory, input/output module, a heating element, electronics, and a processor, all disposed within a common (e.g., monolithic) housing (details not shown in FIG. 1B). Optionally, the vaporizer 105*a* also includes one or more of: sensor(s), additive(s), membrane(s), and indicator(s), also disposed within the common housing.

The mouthpiece can comprise one or more of: ceramic, heat-resistant plastic, anodized aluminum, or any other suitable material. The power supply can include any suitable battery or fuel cell, for example having high-drain characteristics. The precursor reservoir can be in fluid communication with at least one of the mouthpiece, the one or more chambers (e.g., vapor expansion chambers), and the fluidic channels, to facilitate the triggering of carrier heating in response to a user's sucking/drawing on the mouthpiece during use, for example using a pressure sensor. Alternatively, the vaporizer 105*a* can include a mechanical interface (e.g., a button) that the user can actuate to trigger the heating and vaporization of the carrier.

The memory can include any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The input/output module can include one or more of: a push-button control for causing vapor generation, a battery indicator, an electromechanical connector for charging and/or data communication, a light source (e.g., one or more light-emitting diodes), etc. The heating element can include a coil heater, rod-shaped heater, pancake heater, chemical heater, or any other heater that is sized, dimensioned, and constituted of material suitable for heating the carrier material. The electronics can include one or more of: a GPS receiver, an antenna, heater control circuitry, or a transceiver for wireless (e.g., Bluetooth) communication with a command center or other remote compute device (such as a mobile device of a user). The sensor(s) can include one or more of: a pressure sensor, a temperature sensor, a position sensor, an orientation sensor, etc.

The processor can include one or more of: a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The additive(s) can include one or more flavorants. The membrane(s) can include a valved impermeable or semipermeable material, for example comprising a rubber, polyvinyl chloride (PVC), etc. The membrane can be a resealable membrane (e.g., after being pierced by a needle to access the reservoir via the needle). The indicator(s) can include one or more of: an illumination source (e.g., one or more light-emitting diodes), a speaker, a display screen, etc.

In some embodiments, the disposable vaporizer 105*a* is configured such that, when a user sucks, or "draws," on the mouthpiece, the resulting change in pressure within the vaporizer 105*a* triggers heater control circuitry to pass a current through the heating element that is in contact with, or in sufficiently close proximity to, the carrier material or a wick material containing at least a portion of the carrier material, so as to cause the volatilization of a portion of the carrier material. The volatilized carrier material, or vapor, travels toward the mouthpiece via one or more of the expansion chamber(s) and the fluidic channels until it exits the vaporizer for inhalation by the user.

FIG. 1B shows an exploded view of the package 100 configured to hold a capsule 105*b* (also referred to as a cartridge 105*b*) for consumable filling. Most components in the package 100 can be substantially the same as in FIG. 1A, except that the securing structure in FIG. 1B is configured to hold the capsule 105*b*, instead of the vaporizer 105*a*. The capsule 105*b* includes an opening 108*b* to receive the consumable from the filling system.

The depressed region 135 in the middle section 130 is much larger than the capsule 105*b* as illustrated in FIG. 1B. In some embodiments, the dimension of the depressed region 135 can be substantially similar to the dimension of the capsule 105*b* so as to facilitate securing the capsule 105*b*. In some embodiments, the same package 100 can be manufactured in batch, and different securing structures are used depending on whether the vaporizer 105*a* or the capsule 105*b* (or any other type of container) is used.

In some embodiments, the capsule 105*b* can further include a mouthpiece, a precursor reservoir, fluidic channels, one or more chambers, a heating element, membrane(s), input/output module, optionally sensor(s), and optionally additive(s), all disposed within a capsule housing (details not shown in FIG. 1B). The capsule 105*b* can be coupled to a pen section (not shown) when used by a user to consume the consumable filled in the capsule 105*b*. The pen section can include fluidic channels, a power supply, memory, input/output module, electronics, a processor, an input/output module, and optionally indicator(s), all disposed within a pen housing.

In some embodiments, the pen section can also be referred to as a "battery portion." The capsule can be manufactured, shipped and/or sold separately from the pen section, and assembled by a user to form a vaporizer. To assemble the vaporizer, a user may, prior to use (e.g., upon purchase of a new capsule), connect the capsule 105*b* with the pen section of the vaporizer. The capsule 105*b* and the pen portion can be configured to be mechanically and electrically connected, for example by one or more of screw attachment, press-fit attachment, snap-fit attachment, magnetic attachment, or any other suitable connection means.

In some embodiments, the pen section can be reusable, and the capsule 105*b* can be disposable or replaceable. In some embodiments, both the pen section and the capsule 105*b* can be disposable. In some embodiments, both the pen section and the capsule can be reusable, i.e. the capsule 105*b* can be refilled after the consumable within the capsule 105*b* is at least partially consumed.

FIGS. 1A and 1B illustrate the package 100 using the vaporizer 105*a* and the capsule 105*b* for illustrative purposes only. In some embodiments, any other appropriate container can also be disposed into the package 100 for subsequent filling.

Figure 2A:
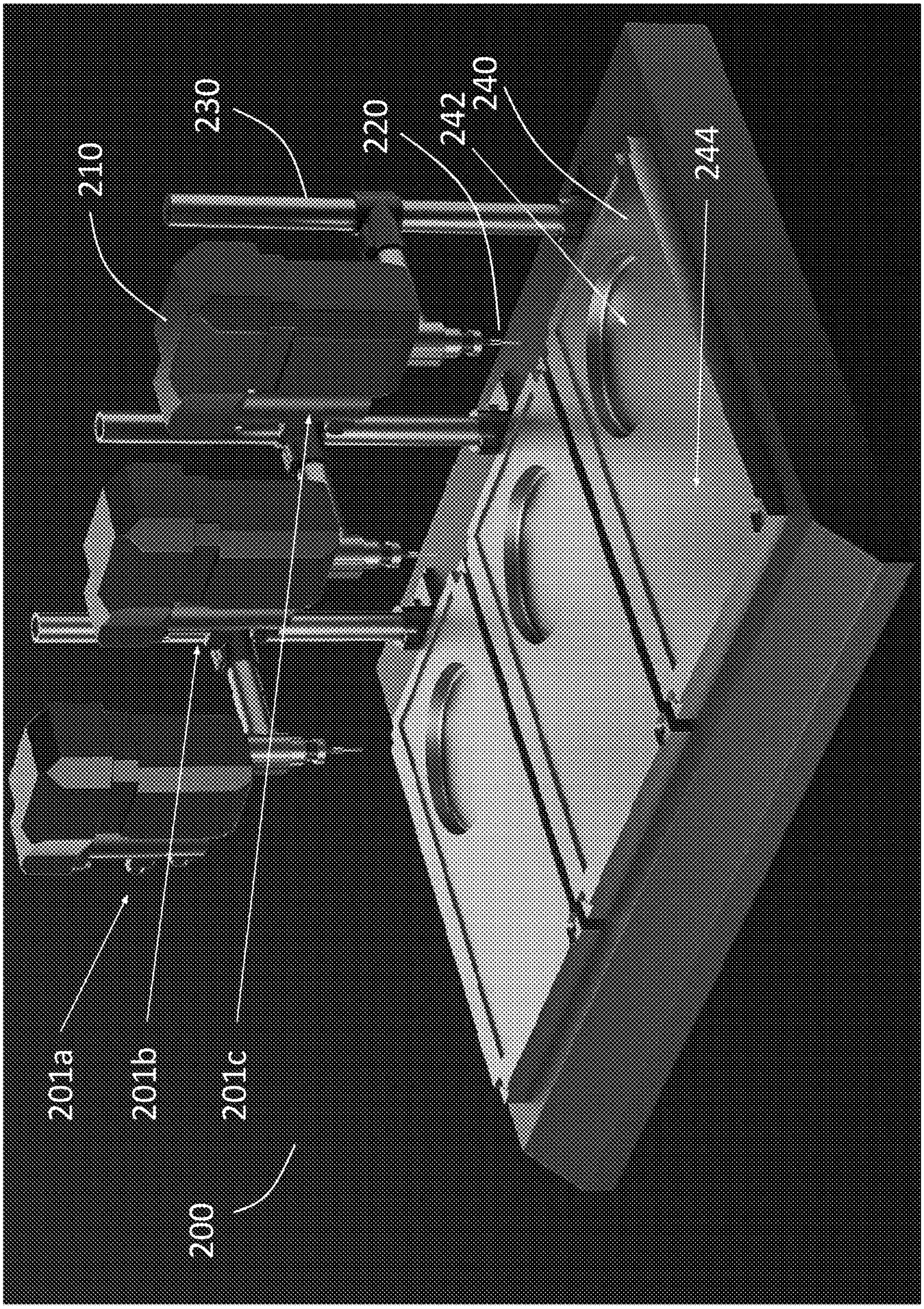
FIGS. 2A-2E illustrate a method of filling a prepackaged container with a consumable using a filler station, according to an embodiment.

FIGS. 2A-2E illustrate a method 200 of filling a prepackaged container with a consumable using a filler station (also referred to as a filling system), according to an embodiment. FIG. 2A shows a perspective view of the filler station, which includes an array of filling devices 201*a*, 201*b*, and 201*c* (collectively referred to as filling devices 201). Three filling devices are shown for illustrative purposes only. In some embodiments, the filler station can include any other number of filling devices (e.g., 1 filling device, 2 filling devices, 4 filling devices, or more). In some embodiments, the filling devices 201 can be arranged into a one-dimensional (1D) array. In some embodiments, the filling devices 201 can be arranged into a two-dimensional (2D) array. In some embodiments, the filling devices 201 can be arranged into any other configurations. In some embodiments, each filling device can be substantially identical to each other. In some embodiments, the filling devices 201 can be different (e.g., configured for filling different consumables).

As illustrated in FIG. 2A, the filling device 201*c* includes a consumable tank 210 (also referred to as a consumable reservoir 210) and a filling tip 220 (also referred to as a filling needle 220) disposed on the consumable tank 210 to dispense the consumable contained in the consumable tank 210. The consumable tank 210 is operably coupled to a post 230 and is movable along the post 230. In some embodiments, the movement of the consumable tank 210 is implemented by a motor (not shown) controlled by a controller (not shown). In some embodiments, any other appropriate vertical translation technique can be used to replace or supplement the post 230.

The filling device 201*c* also includes a base 240 to receive a prepackaged container that can be substantially similar to the package 100 illustrated in FIGS. 1A-1B and described above. The base 240 further defines a depressed region 242 located underneath the filling tip 220 and a flat region 244 located adjacent to the depressed region 242.

Figure 2B:
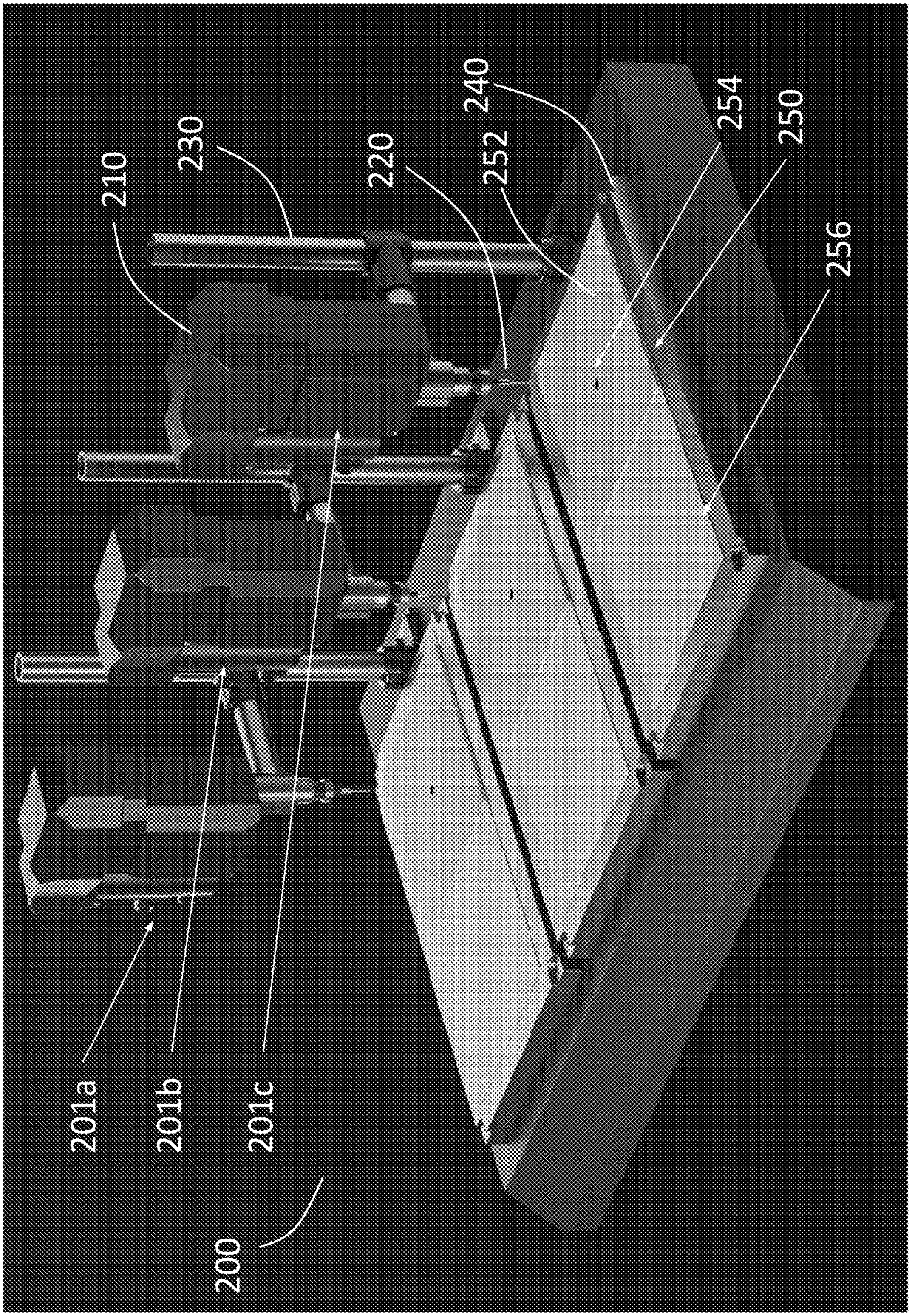

FIG. 2B shows that a prepackaged container 250 is loaded into the filling device 201*c*. The prepackaged container 250 can be substantially identical to the package 100 illustrated in FIGS. 1A-1B and described herein. The depressed region 242 in the base can be configured to receive the middle section (e.g., 130) of the prepackaged container 250 such that the top section 252 of the prepackaged container 252 (similar to the top section 110 in the package 100) is exposed to the filling tip 220. The top section 252 includes a filling aperture 254 to receive the filling tip 220 such that the filling tip 220 can reach into the container disposed within the package for consumable filling. The flat region 244 can be configured to receive the cover 256 of the prepackaged container 250 (similar to the cover 122 in the package 100).

In some embodiments, the prepackaged container 250 can include a protective film (e.g., an elastomeric membrane) that can be used, for example, to prevent dust from entering the package. The protective film can be removed before the prepackaged container 250 is loaded into the filling device 201*c*. In some embodiments, the protective film can be kept on the prepackaged container and the filling tip 220 can pierce through the protective film to reach into the container.

Figure 2C:
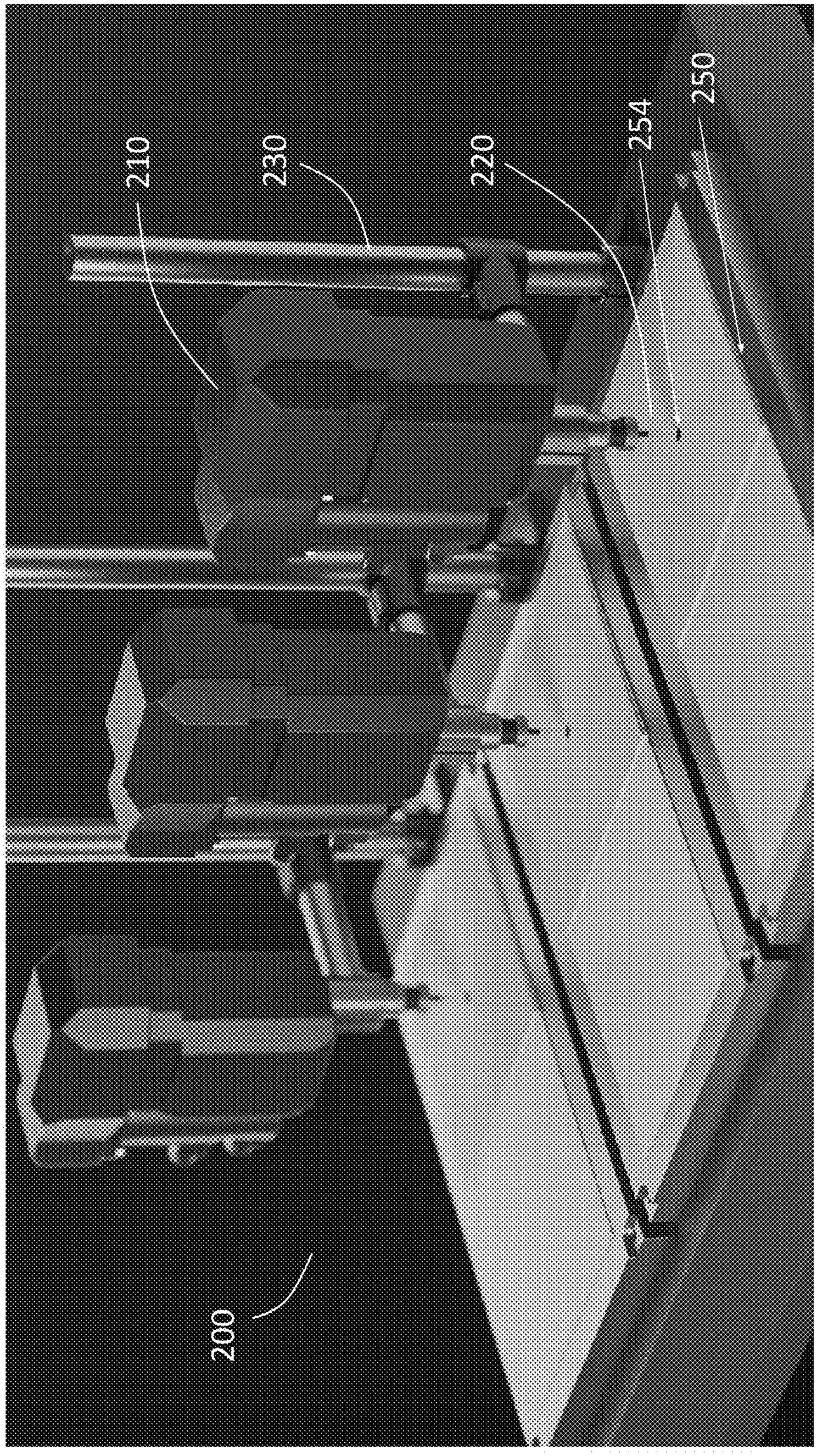

FIG. 2C shows that the filling tip 220 (and the consumable tank 210) is lowered to a position such that the filling tip 220 can reach the container within the package for consumable filling. In some embodiments, once the prepackaged container 250 is secured in the base 240 of the filling device 201*c*, the filling aperture 254 is automatically aligned with the filling tip 220, i.e. moving down the filling tip 220 along the post 230 would cause the filling tip 220 to reach the container. In some embodiments, the filling tip 220 can be configured to have horizontal movements as well. In these instances, the filling tip 220 can be configured to search for the filling aperture 254 that might not be aligned with the filling tip 220.

Figure 2D:
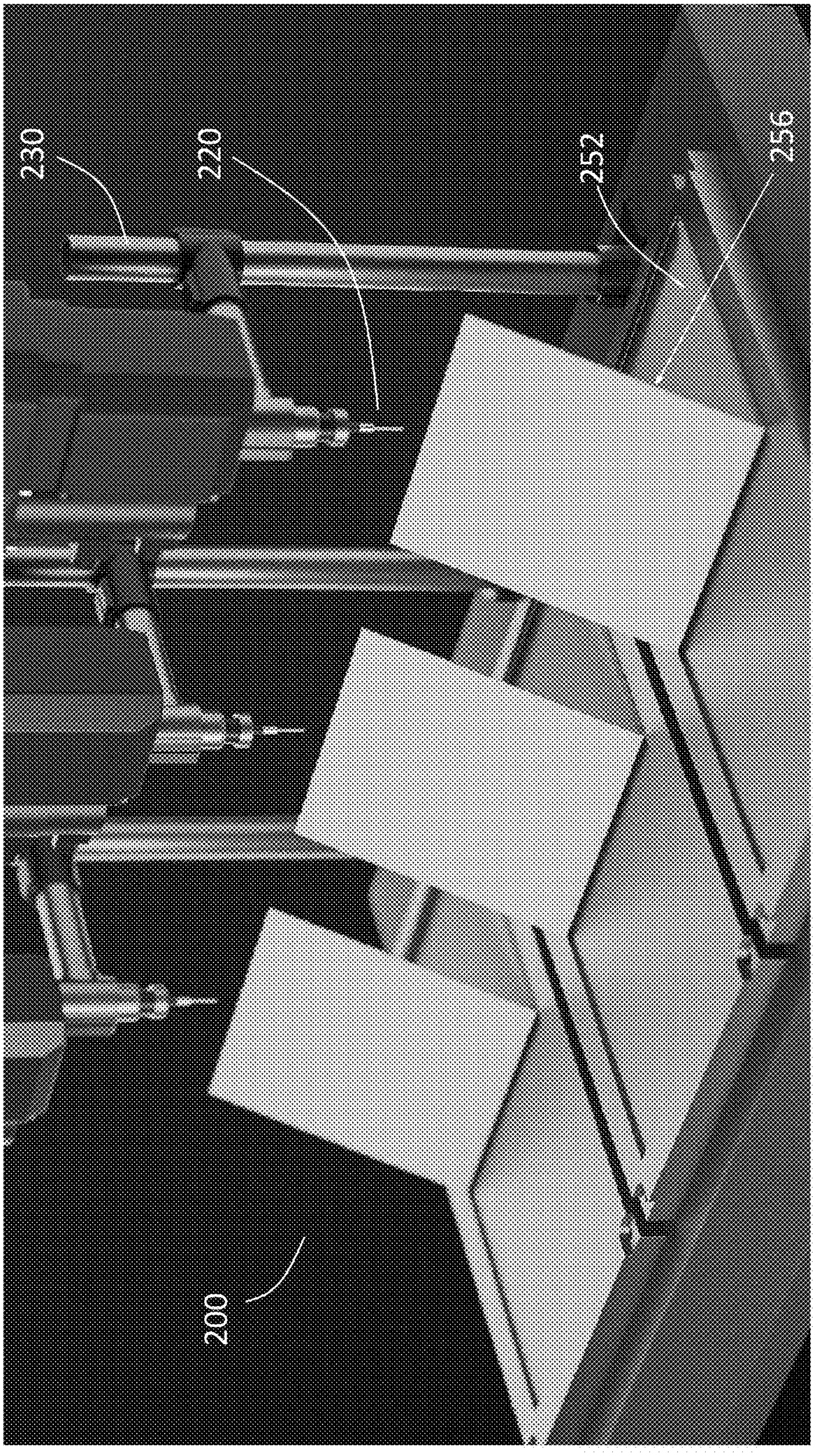
Figure 2E:
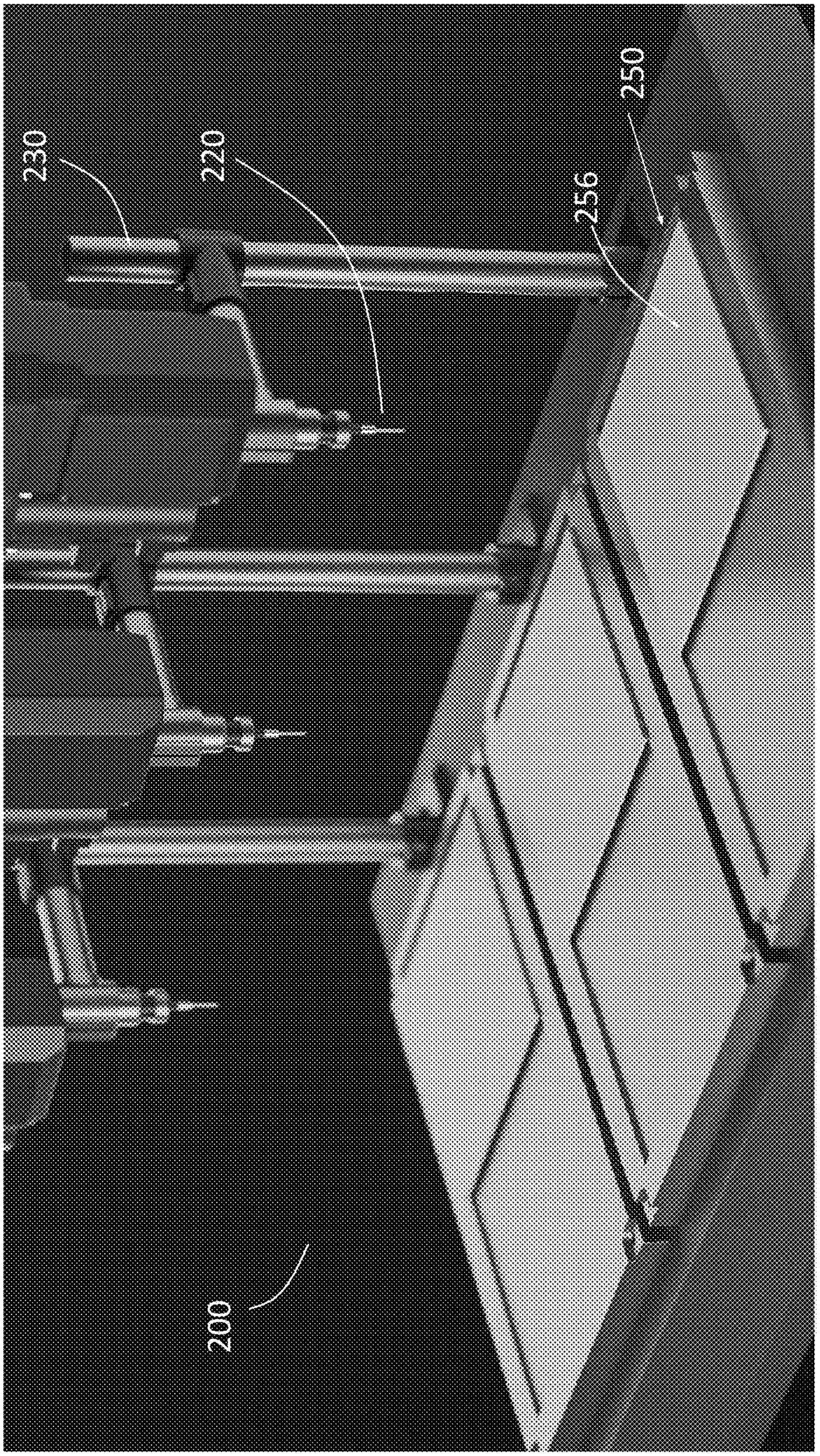

FIGS. 2D and 2E illustrate that the once the container is filled, the filling tip 220 is raised up and the cover 256 of the prepackaged container 250 is folded toward the top section 252 of the prepackaged container 250. In some embodiments, the cover 256 can cover the filling aperture 256 and substantially seal the middle section that contains the container. In some embodiments, the cover 256 can include an adhesive surface so as to be securely coupled to the top section 252 after the completion of the consumable filling.

In some embodiments, the relative orientation of the filling tip 220 and the base 240 can be arranged horizontally. In these instances, the filling tip 220 moves horizontally to reach the filling aperture 254. In these instances, the filling device 201*c* can include a pump to dispense the consumable contained in the consumable tank 210 into the container.

In some embodiments, the filler station includes a reader (e.g., an RFID transceiver, a bar code scanner, etc.) to read information contained in the prepackaged container 250. As describe herein, the prepackaged container 250 can be encoded with various types of information about the container, the consumable to be filled into the container, and/or filling instructions. In some embodiments, each filling device 201*a* to 201*c* includes a reader to read the information encoded in the corresponding prepackaged container loaded into its base. In addition, the information can be retrieved by the filling devices 201 after the prepackaged containers are loaded.

In some embodiments, the information encoded in the prepackaged containers can be read by a central reader (e.g., separate from the filling devices 201). The retrieved information can be stored in a memory and then distributed to each filling device to direct the consumable filling process. For example, the filler station can include a reader to read the information on a prepackaged container and a conveyor system to deliver the prepackaged container to a filling device. The retrieved information (or a control signal based on the retrieved information) is then transmitted to the filling device that receives the prepackaged container to direct the consumable filling.

In some embodiments, the filler station further includes a memory (not shown) operably coupled to a processor (not shown). The memory can store data (e.g., in the form of a database table storing data records) associated with one or more of: carrier formulations, carrier provenance, capsule compatibility, capsules that have been filled at the filler station, filler station maintenance history, filler station maintenance schedule, and fill settings such as carrier dispense pressure, carrier dispense temperature, carrier dispense duration, carrier dispense volume, etc.

The filler station can also include a transceiver operably coupled to the processor and the memory. The transceiver can facilitates communications between the filler station and a server. For example, the filler station may send fill data to the server. Example fill data include, but are not limited to, identifiers of one or more of: capsule type, capsule capacity, carrier type, carrier amount, carrier origin/provenance, carrier constituent concentration(s), fill date/time stamp, fill conditions, etc.

In some embodiments, the prepackaged container 250 is prepared in one place and the method 200 can be performed in a difference place. For example, the prepackaged container 250 can be prepared in a place with low labor cost (or other manufacturing cost), and the filler station can be located within a jurisdiction that has favorable regulations on certain consumables, such as nicotine and cannabis. Alternatively or additionally, the method 200 can be performed near the source of the consumable so as to save transportation cost of the consumable and/or to preserve the freshness of the consumable.

In some embodiments, the package portion of the prepackaged container 250 can be assembled in a first place, the container within the prepackaged container 250 can be manufactured in a second place, and the method 200 can be performed in a third place.

Figure 3A:
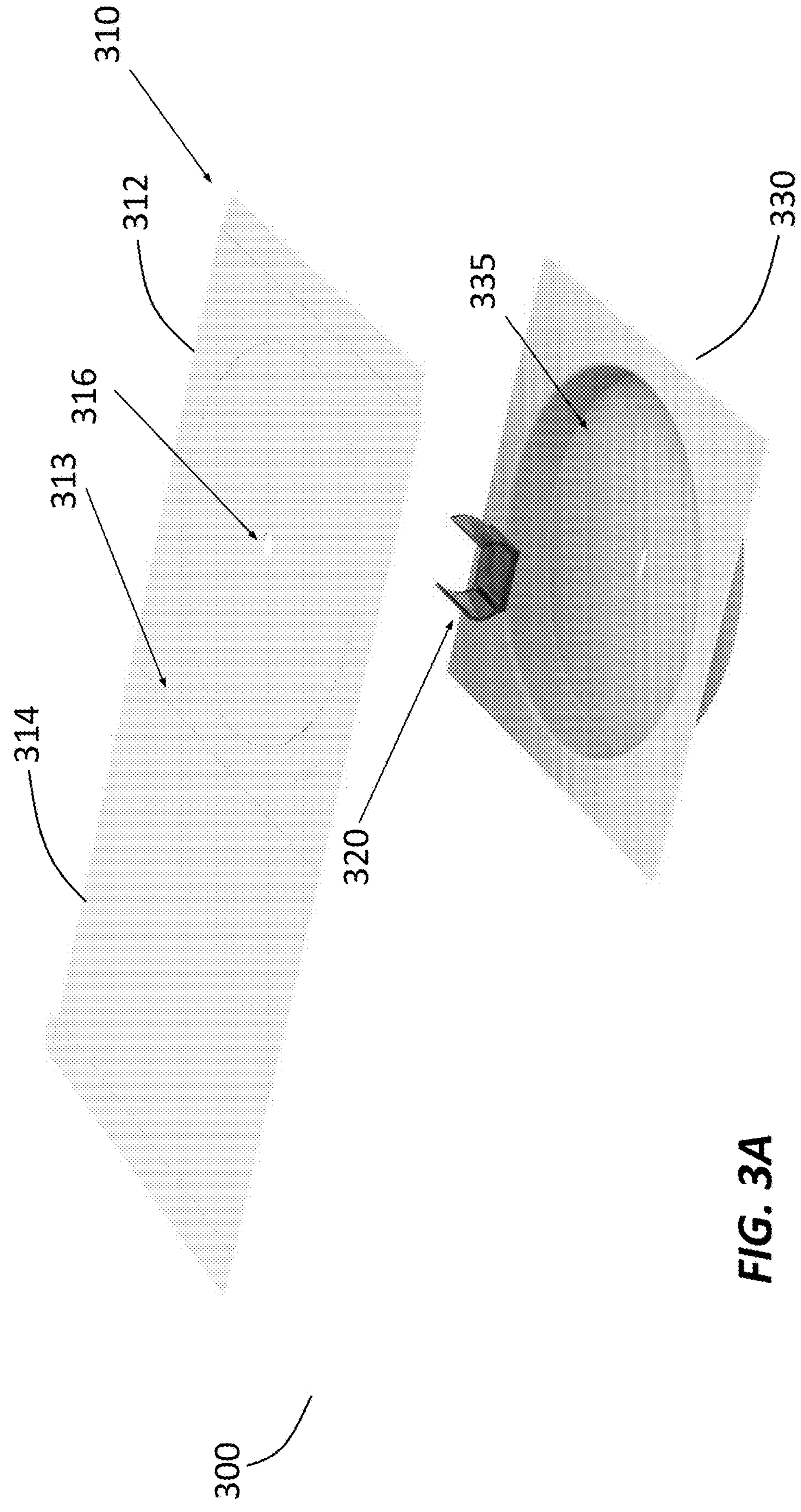
FIGS. 3A-3C show schematics of a package including a mount configured for securing a container for consumable filling, according to an embodiment.
Figure 3C:
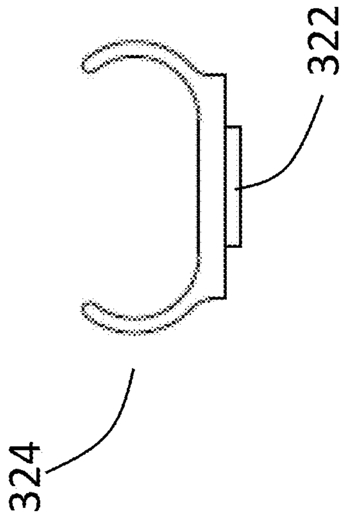
Figure 3B:
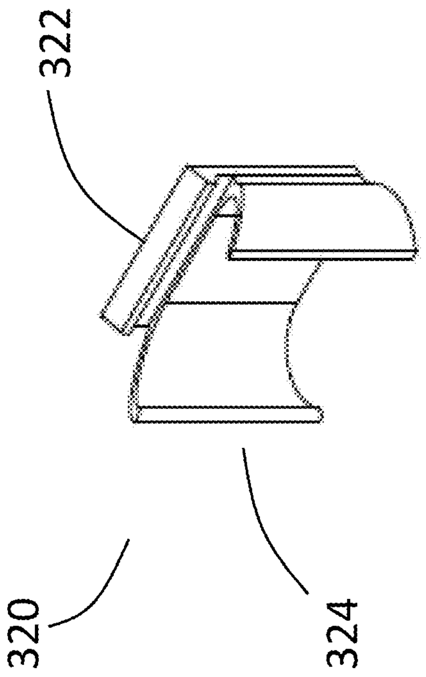

FIGS. 3A-3C show schematics of a package 300 including a mount 320 for securing a container for consumable filling, according to an embodiment. The package 300 includes a top section 310 and a middle section 330. The top section 310 further includes a first portion 312 that has a filling aperture 316 and a second portion 314. The middle section 330 defines a depressed region 335 to contain the mount 320 (and accordingly the container to be included in the package 300). The mount 320 includes a base 322 and a clip 324 to secure the container, such as a vaporizer and/or a capsule described herein.

The first portion 312 of the top section 310 is separated from the second portion 314 of the top section 310 by a folding line, such as a perforated line. After the completion of consumable filling, the second portion 314 can be folded toward the second portion 314 and substantially cover the second portion 314, including the filling aperture 316. In other words, the second portion 314 can be configured as a cover for the package 300 and the container disposed within the package 300.

Figure 4:
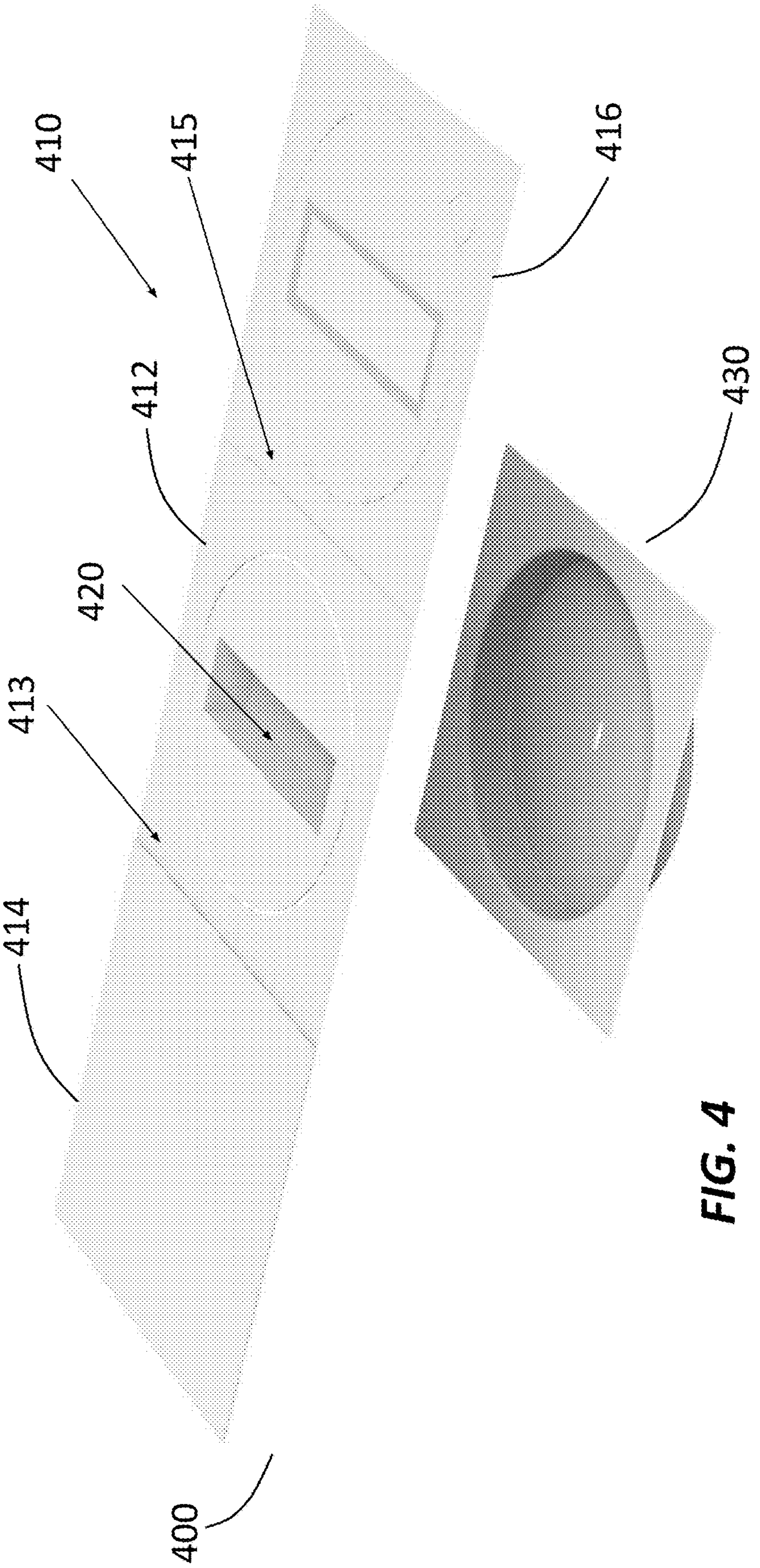
FIG. 4 shows a schematic of a package including a cradle configured for securing a container for consumable filling, according to an embodiment.

FIG. 4 shows a schematic of a package 400 including a cradle 420 for securing a container for consumable filling, according to an embodiment. The package 400 includes a top section 410 and a middle section 430. The top section 410 further includes three sections: a first section 412 disposed between a second section 414 and a third section 416. The first section 412 and the second section 414 is separated by a folding line 413, and the first section 412 and the third section 416 is separated by another folding line 415.

The first section 412 defines the cradle 420 (also referred to as a slot 420) to secure the container. During use, the first section is assembled with the middle section 430. The dimensions of the cradle 420 can be substantially similar to the container so as to secure the container within the cradle 420. In some embodiments, the material defining the cradle 420 can be flexible (e.g., foam) such that the same cradle 420 can be employed to secure different containers. For example, the width and/or length of the cradle 420 can be slightly less than the width and/or length of the container. In this instance, although the cradle 420 has a rectangular shape, containers that are cylindrical or elliptical can also be secured into the cradle.

The third section 416 can be folded toward the first section 412 to substantially cover the first section 412 before the package 400 is filled with the consumable. In other words, the third section 415 can have similar functions as the top section 110 shown in FIGS. 1A-1B and described above. After the container within the package 400 is filled with the consumable, the second section 414 can be folded over to cover the third section 416 and the first section 412 beneath the third section 416. In other words, the second section 414 can have similar functions as the cover 122 shown in FIGS. 1A-1B and described above.

Figure 5A:
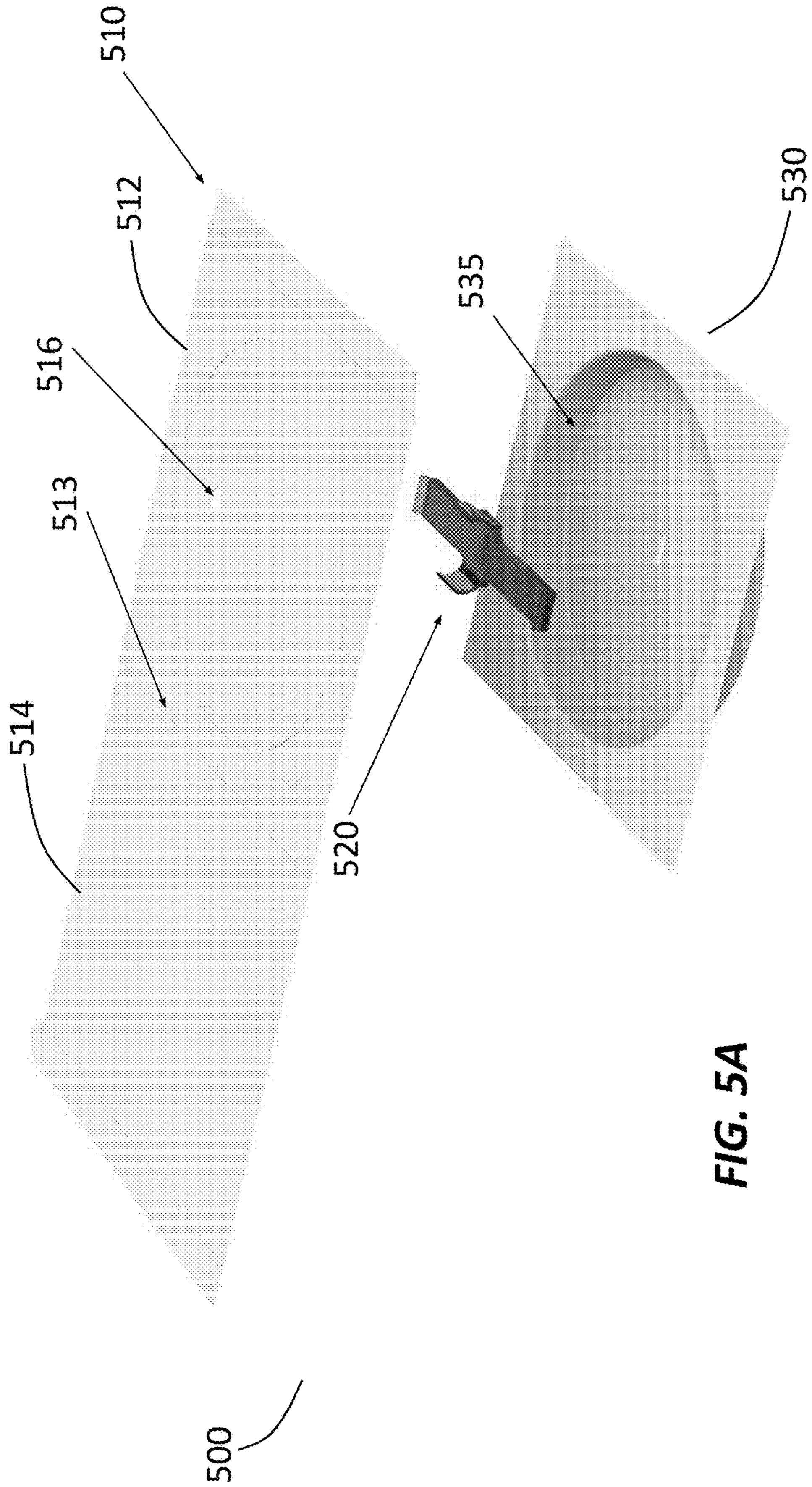
FIGS. 5A-5C show schematics of a package including a mount configured to securing a container for consumable filling, according to an embodiment.
Figure 5C:
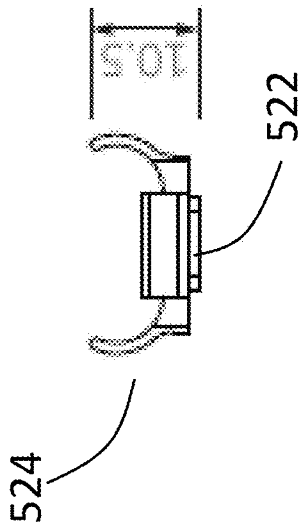
Figure 5B:
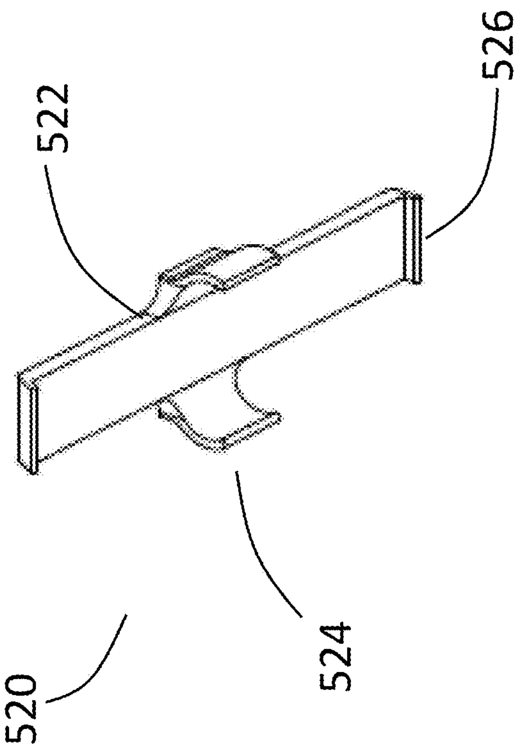

FIGS. 5A-5C show schematics of a package 500 including a mount 520 for securing a container for consumable filling, according to an embodiment. The package 500 includes a top section 510 and a middle section 530. The top section 510 further includes a first portion 512 that has a filling aperture 516 and a second portion 514. The middle section 530 defines a depressed region 535 to contain the mount 520 (and accordingly the container to be included in the package 500). The mount 520 includes a base 522, a first clip section 524 on the width of the mount 522, and a second clip section 526 on the length of the mount 522. Therefore, the mount 520 can be configured to secure a container that has substantially the same lateral dimensions as the mount 520, i.e. the length and width of the container are substantially similar to the length and width of the mount 520.

The first portion 512 of the top section 510 is separated from the second portion 514 of the top section 510 by a folding line, such as a perforated line. After the completion of consumable filling, the second portion 514 can be folded toward the first portion 512 and substantially cover the first portion 512, including the filling aperture 516. In other words, the second portion 514 can be configured as a cover for the package 500 and the container disposed within the package 500.

Figure 6:
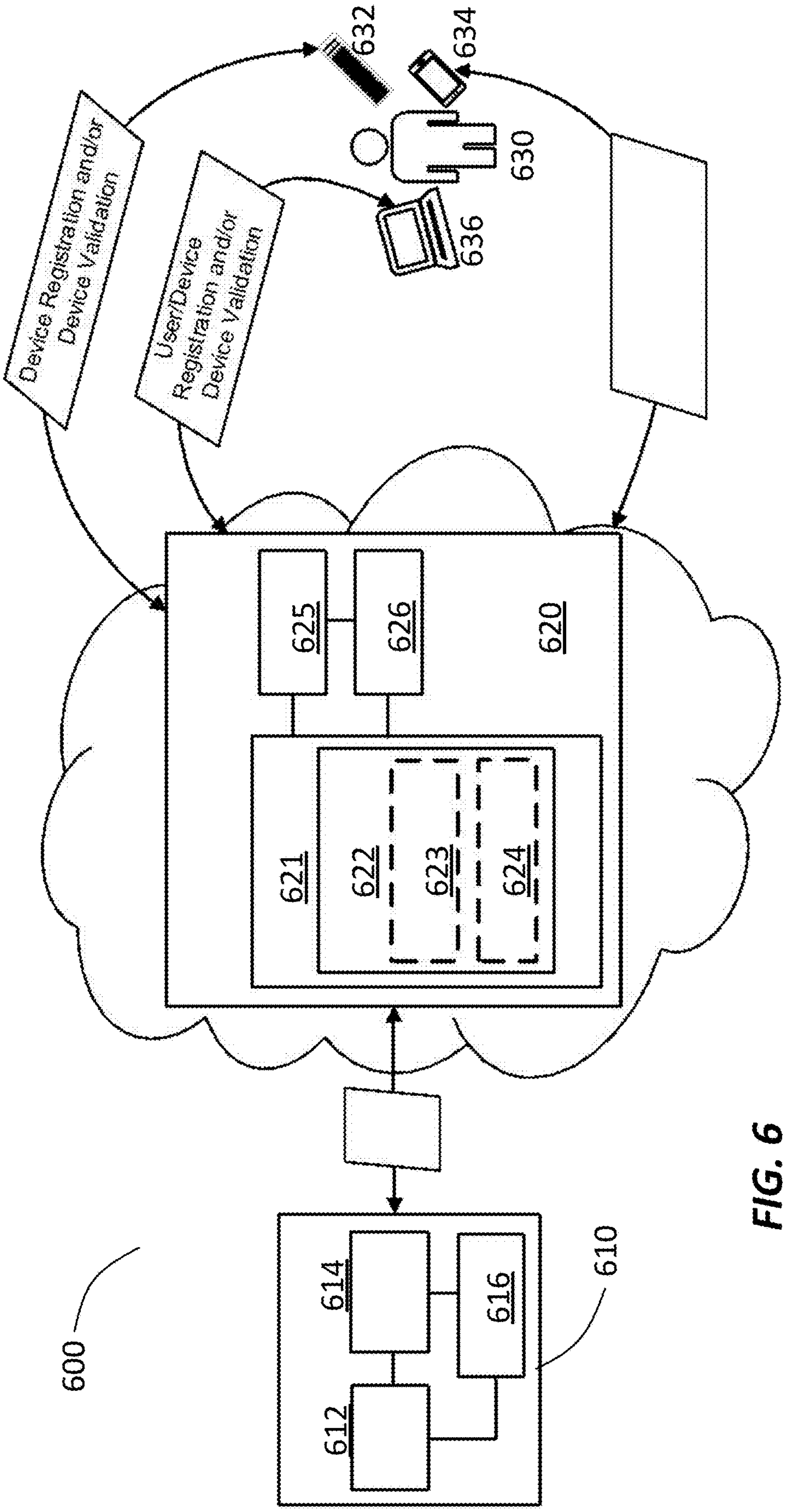
FIG. 6 is an illustration of a system for managing vaporizer security and/or traceability, according to an embodiment.

FIG. 6 is an illustration of a system for managing vaporizer security and/or traceability, in accordance with some embodiments. As shown in FIG. 6, the system 600 includes filler station 610 in communication with a command center 620 (e.g., a cloud-based server) and a user 630. In some embodiments, such communications can be via one or more wireless networks. In some embodiments, wired communications can also be used. The user 630 is associated with a vaporizer 632, a mobile device 634, and/or a compute device 636 (e.g., a laptop or desktop computer).

The filler station 610 can be substantially similar to the filler station illustrated in FIGS. 2A-2E and described above. As illustrated in FIG. 6, the filler station 610 includes a memory 612 operably coupled to a processor 614. The memory 612 can store data (e.g., in the form of a database table storing data records) associated with one or more of: carrier formulations, carrier provenance, capsule compatibility, capsules that have been filled at the filler station 225, filler station maintenance history, filler station maintenance schedule, and fill settings such as carrier dispense pressure, carrier dispense temperature, carrier dispense duration, carrier dispense volume, etc. The filler station 610 also includes a transceiver 616 operably coupled to the processor 614 and the memory 612. The transceiver 616 facilitates communications between the filler station 610 and the command center 620. For example, the filler station 610 may send fill data to the command center. Example fill data include, but are not limited to, identifiers of one or more of: capsule type, capsule capacity, carrier type, carrier amount, carrier origin/provenance, carrier constituent concentration(s), fill date/time stamp, fill conditions, etc.

The command center 620 includes a memory 621 operably coupled to a processor 625, and a transceiver 626 configured to facilitate communications with the filler station 610, the vaporizer 632 of a user, and the mobile device 634 and/or compute device 636 of the user 630. For example, messages related to vapor device registration and/or vapor device validation can be exchanged between the command center 620 and the vaporizer 632. Alternatively or in addition, messages related to user registration, vapor device registration and/or vapor device validation can be exchanged between the command center 620 and the compute device 636 of the user 630. Alternatively or in addition, messages related to user registration, vapor device registration and/or vapor device validation can be exchanged between the command center 620 and the mobile device 634 of the user 630.

The memory 621 stores a software application ("app") 622. In some implementations, an administrator of the command center 620 interacts with the software app 622 via an administrator view of the app, rendered via a graphical user interface (GUI) of a compute device in wireless or wired network communication therewith, and a user interacts with the software app 622 via a user view of the app, rendered via a graphical user interface (GUI) of a compute device of the user in wireless network communication with the command center 620. The app 622 can include one or more software modules, such as a track module 623 and/or a trace module 624.

The track module 623 can include instructions to cause the processor 625 to obtain contemporaneous (e.g., real-time or substantially real-time) location information for one or more vaporizer components (e.g., capsules or vaporizer pens), the vaporizer 632, and/or one or more compute devices (e.g., the mobile device 634 or the compute device 636) of the user 630. Such location can be obtained, for example, by querying one or more of the aforementioned devices (e.g., via one or more associated onboard location sensors of the device(s), such as a global positioning sensor (GPS) receiver). The track module 623 can also include instructions to cause the processor 625 to store the location information and, optionally, transmit the location information to one or more requestors of the wireless network.

The trace module 624 can include instructions to cause the processor 625 to request, store and/or transmit historical data associated with the manufacture and movement (e.g., within the supply chain), of one or more vaporizer components, the vaporizer 632, and/or one or more compute devices (e.g., the mobile device 634 or the compute device 636) of the user 630. In other words, the trace module 624 (optionally in combination with the track module 623) monitors the chain-of-custody of one or more vaporizers to ensure their safety and authenticity. The historical data can include one or more of: carrier ingredients, carrier formulation, nicotine concentration, nicotine plant genetics, nicotine provenance data (e.g., the tobacco plant(s) from which the nicotine was derived, the grow location of the nicotine plant(s), the grow and/or harvesting date of the nicotine plant(s), etc.) cannabinoid concentration(s), cannabinoid provenance data (e.g., the cannabis plant(s) from which the cannabinoid(s) were derived, the grow location of the cannabis plant(s), the grow and/or harvesting date of the cannabis plant(s), the dispensary from which the cannabinoid(s) were obtained, etc.), active ingredient (e.g., drug) concentration, inactive ingredient concentration, and/or the like.

Figure 7:
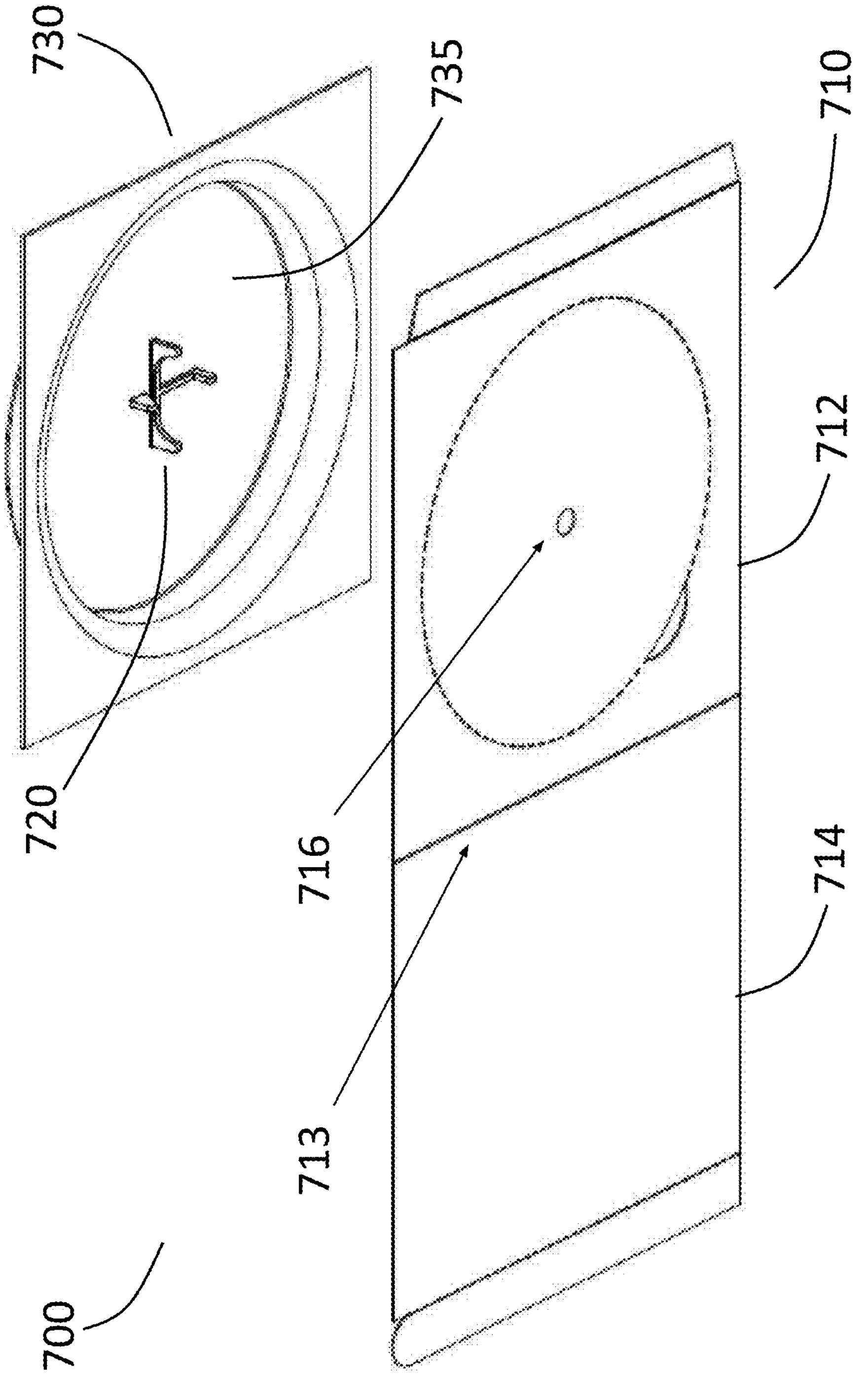
FIG. 7 shows a schematic of a package including a mount for securing a cartridge for consumable filling, according to an embodiment.

FIG. 7 shows schematics of a package 700 including a mount 720 for securing a cartridge for consumable filling, according to an embodiment. In some embodiments, the cartridge that can be contained in the package 700 can be substantially similar to the cartridge 105*b* shown in FIG. 1B and described above. The package 700 includes a top section 710 and a middle section 730. The top section 710 further includes a first portion 712 that has a filling aperture 716 and a second portion 714. The middle section 730 defines a depressed region 735 to contain the mount 720 (and accordingly the cartridge to be included in the package 700). The mount 720 includes four legs to secure the cartridge from four directions. Therefore, the mount 720 can be configured to secure the cartridge (or any other container) that has substantially the same lateral dimensions as the mount 720, i.e. the length and width of the cartridge are substantially similar to the length and width of the mount 720.

The first portion 712 of the top section 710 is separated from the second portion 714 of the top section 710 by a folding line 713, such as a perforated line. After the completion of consumable filling, the second portion 714 can be folded toward the first portion 712 and substantially cover the first portion 712, including the filling aperture 716. In other words, the second portion 714 can be configured as a cover for the package 700 and the cartridge disposed within the package 700.

Figure 8:
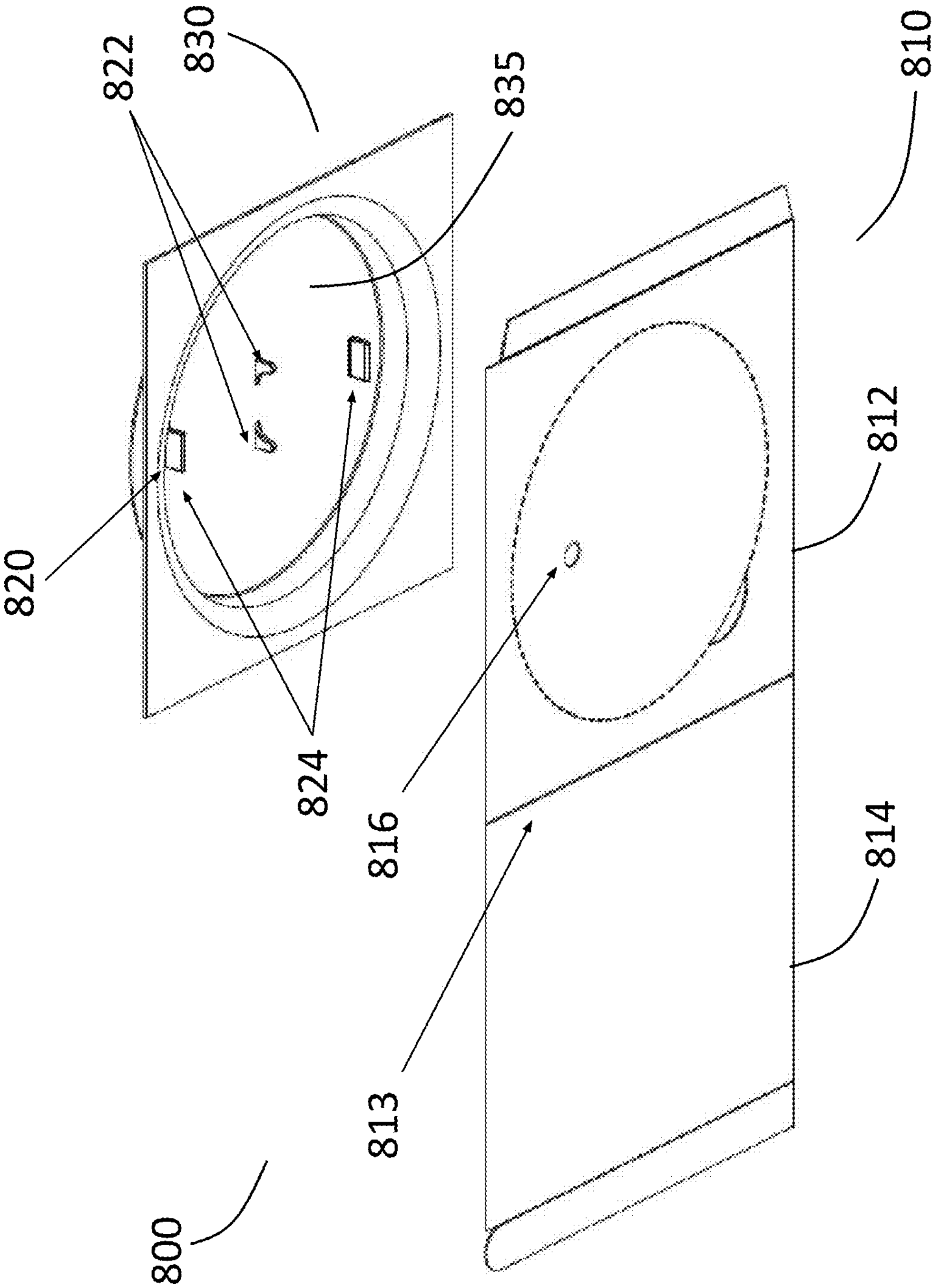
FIG. 8 shows a schematic of a package including a mount for securing a disposable device for consumable filling, according to an embodiment.

FIG. 8 shows schematics of a package 800 including a mount 820 for securing a disposable device for consumable filling, according to an embodiment. In some embodiments, the disposable device that can be contained in the package 800 can be substantially similar to the container 105*a* shown in FIG. 1A and described above. The package 800 includes a top section 810 and a middle section 830. The top section 810 further includes a first portion 812 that has a filling aperture 816 and a second portion 814. The middle section 830 defines a depressed region 835 to contain the mount 820 (and accordingly the disposable device to be included in the package 800). The mount 820 includes a first pair of legs 822 disposed along a first direction and a second pair of legs 824 disposed along a second direction that is perpendicular to the first direction. Therefore, the mount 820 can be configured to secure the disposable (or any other container) that has substantially the same lateral dimensions as the mount 820, i.e. the length and width of the disposable device are substantially similar to the length and width of the mount 820.

The first portion 812 of the top section 810 is separated from the second portion 814 of the top section 810 by a folding line 813, such as a perforated line. After the completion of consumable filling, the second portion 814 can be folded toward the first portion 812 and substantially cover the first portion 812, including the filling aperture 816. In other words, the second portion 814 can be configured as a cover for the package 800 and the disposable device disposed within the package 800.

FIGS. 9A-9H show schematics of a system 900 for consumable filling, according to an embodiment. The system 900 includes a frame 905 to hold/support other components in the system 900. The frame 905 defines a front panel 960 and a base 940 to receive a package 950 for filling or refilling (see, e.g., FIG. 9D). A needle 920 is located within the space defined by the front panel 960 and the base 940. The needle 920 can be moved vertically to reach the package 950 and fill/refill the package 950 via a filling aperture 954 on the package 950. In some embodiments, a motor 970 is included in the system 900 to control the movement of the needle 920. In some embodiments, the filling aperture 954 is covered and/or sealed by a silicone piece before filling/refilling, and the needle 920 can be configured to pierce this silicone piece to reach the container included within the package 950.

Figure 9A:
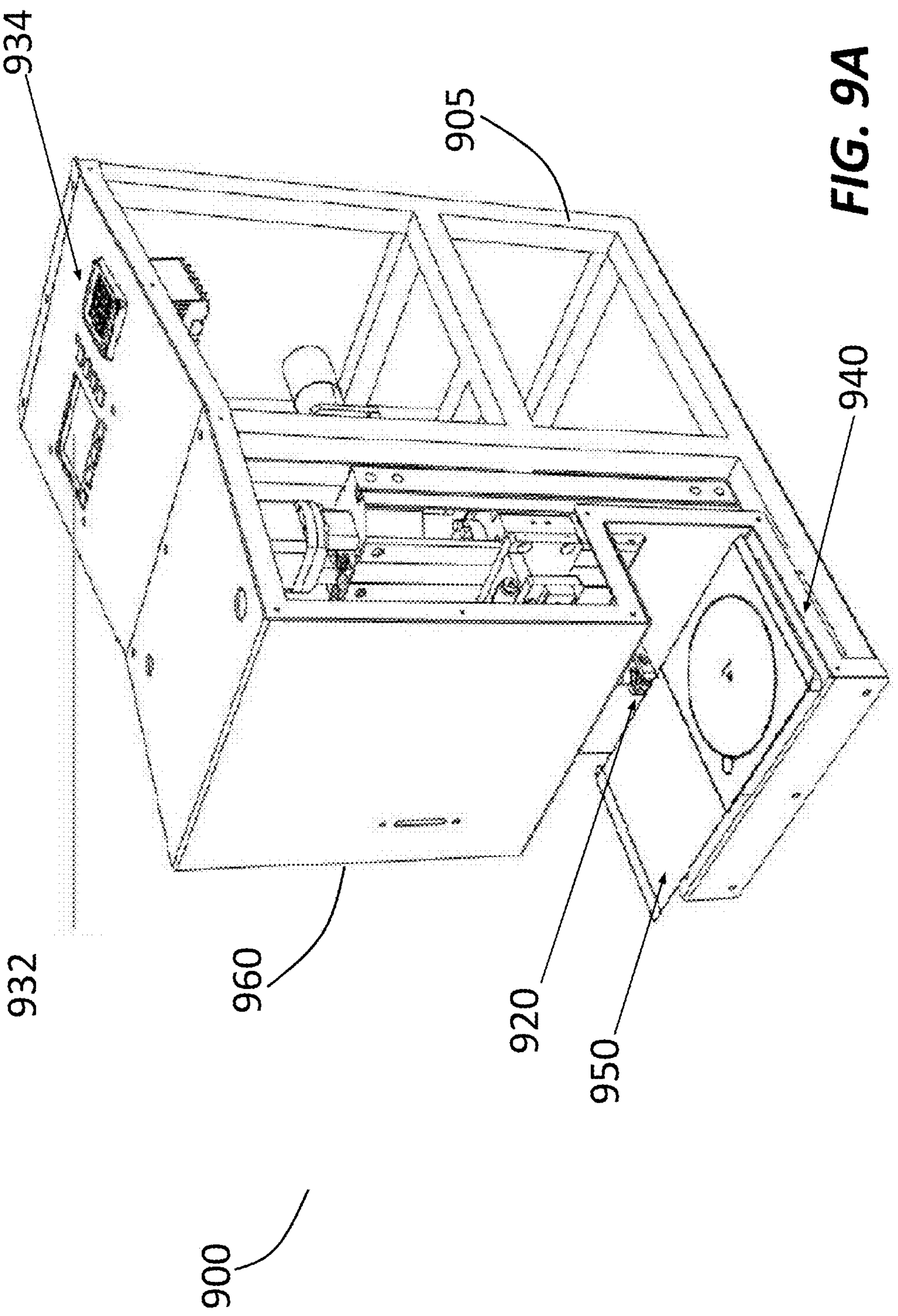
FIGS. 9A-9H show schematics of a system for consumable filling, according to an embodiment.
Figure 9B:
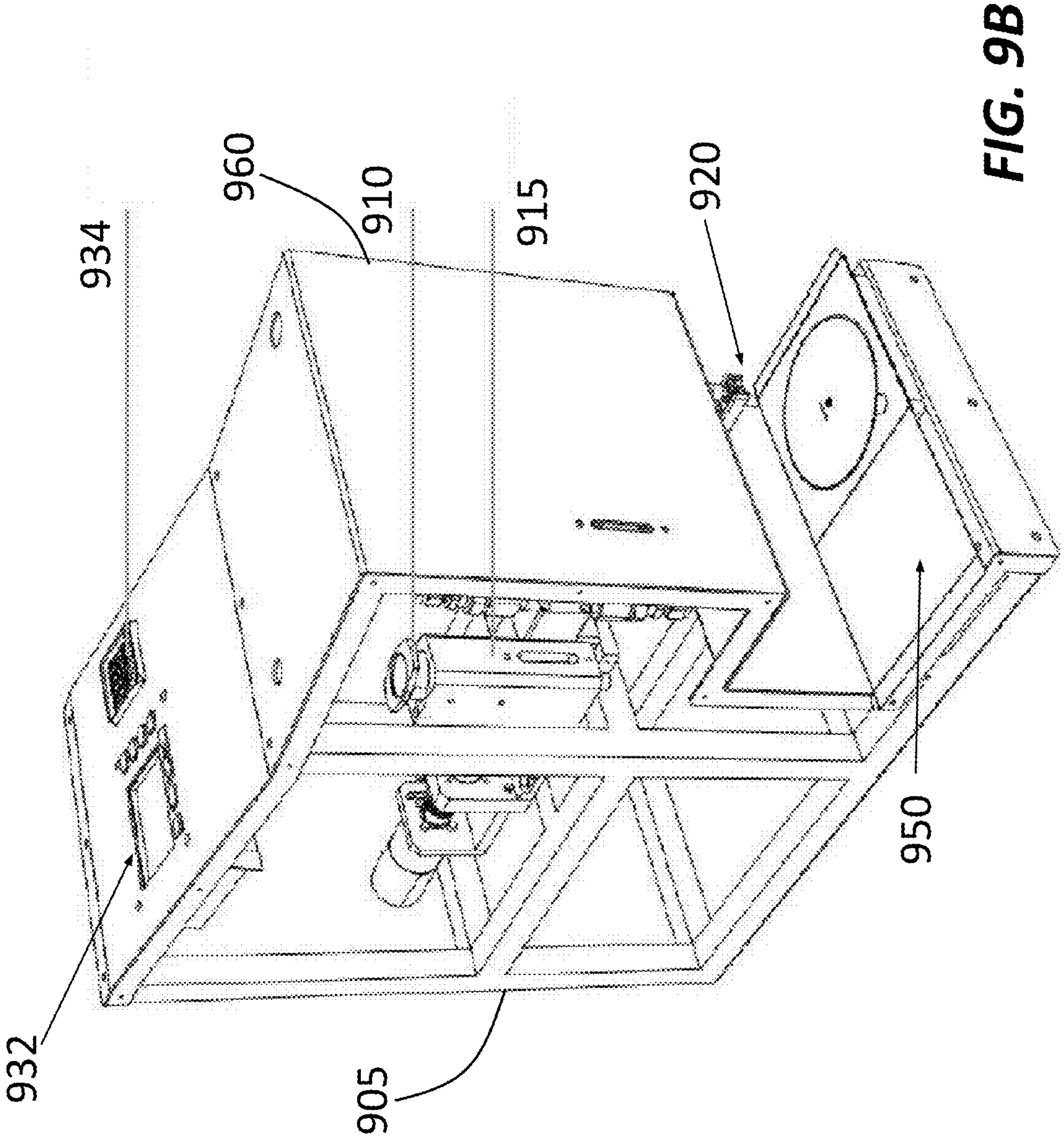
Figure 9C:
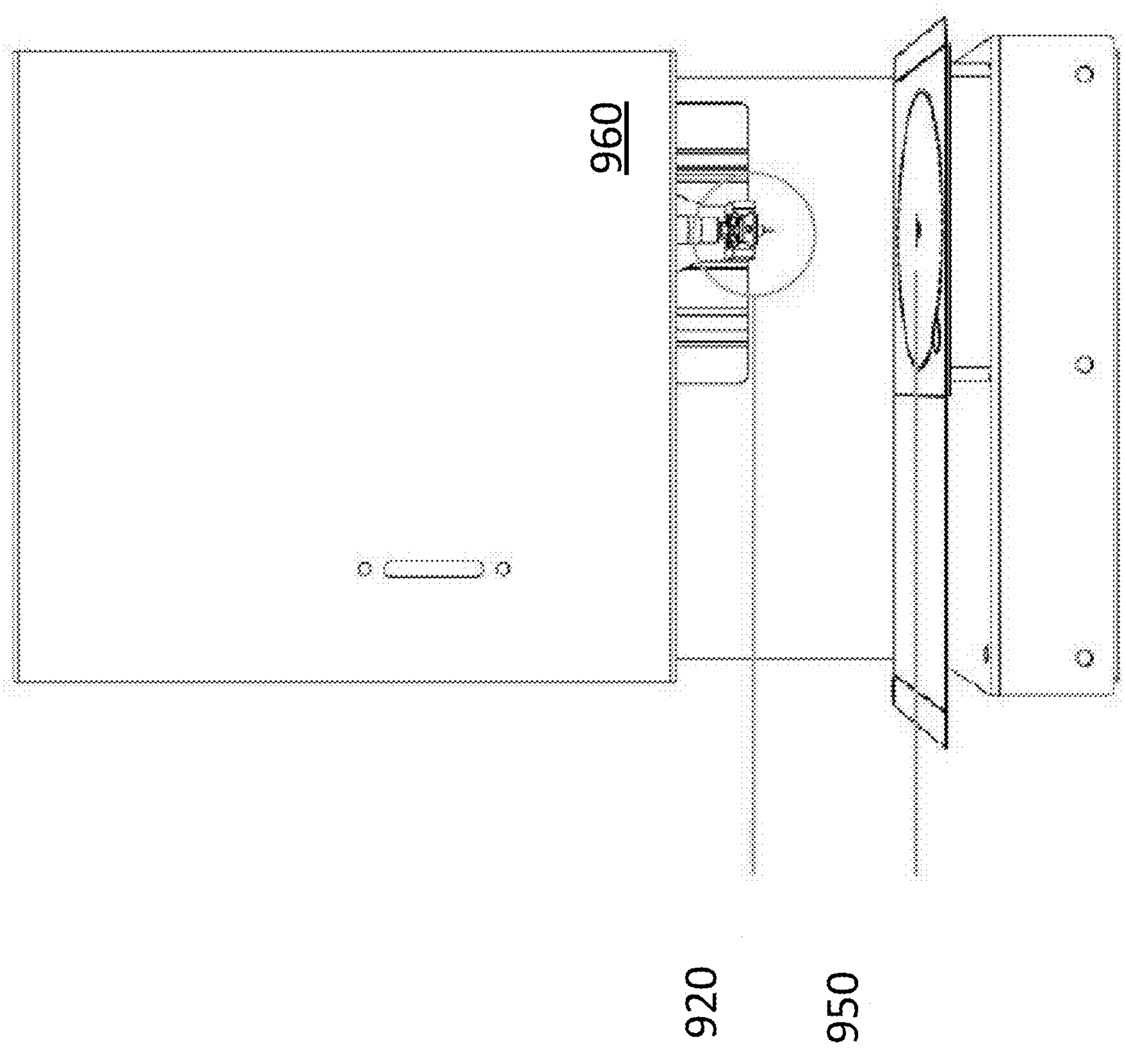
Figure 9D:
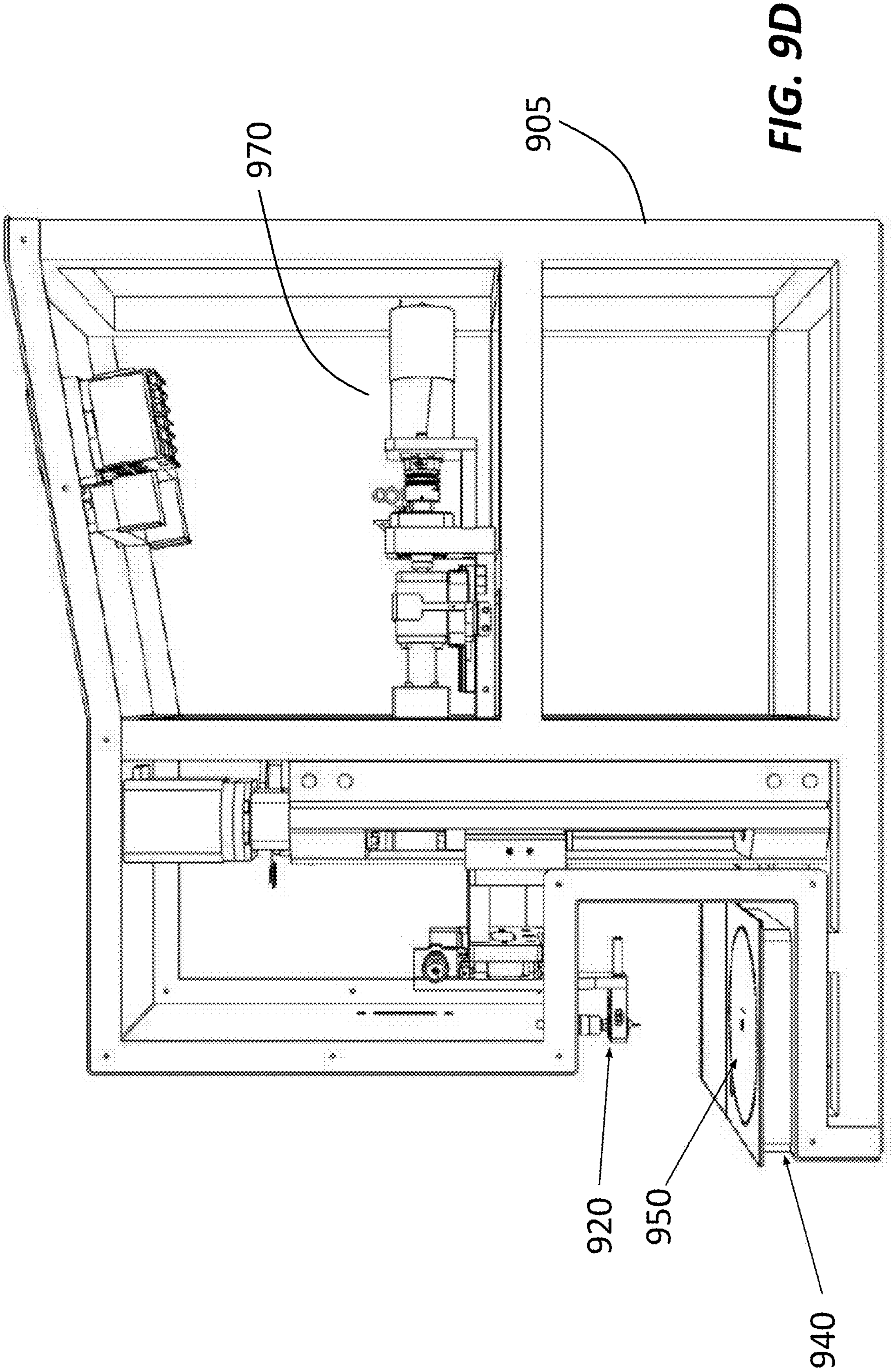
Figure 9F:
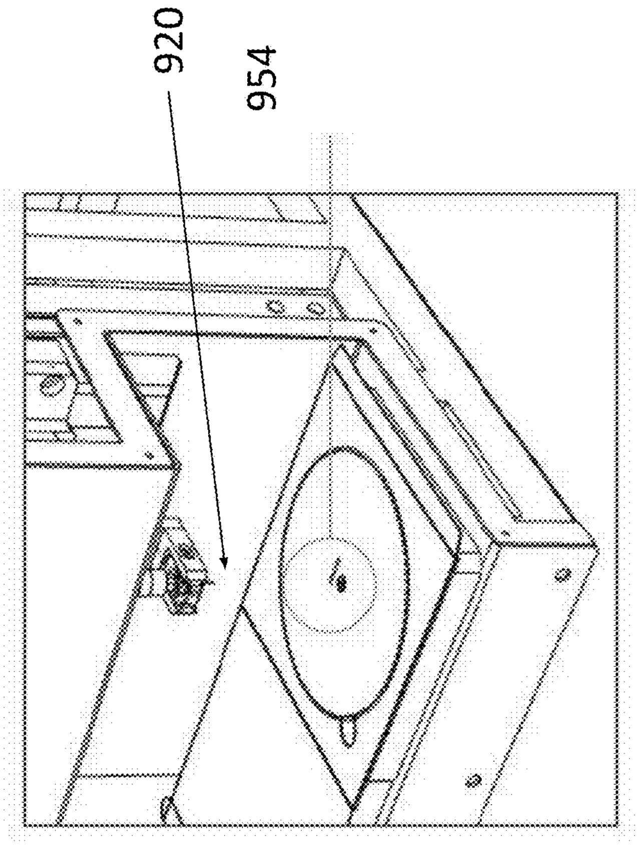
Figure 9E:
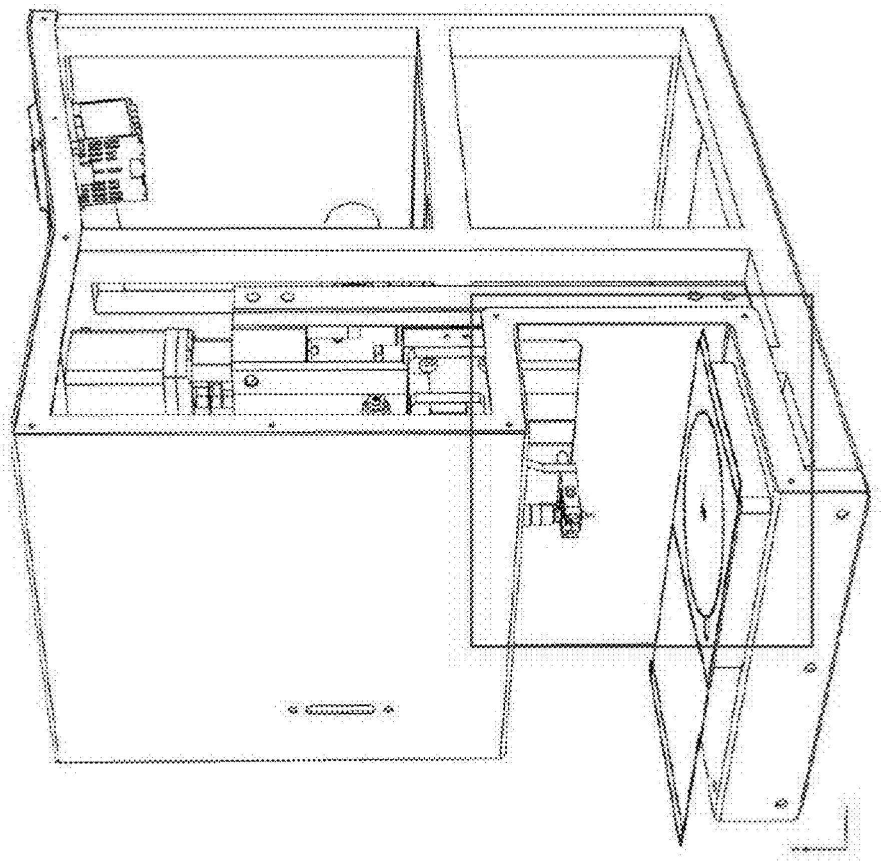
Figure 9H:
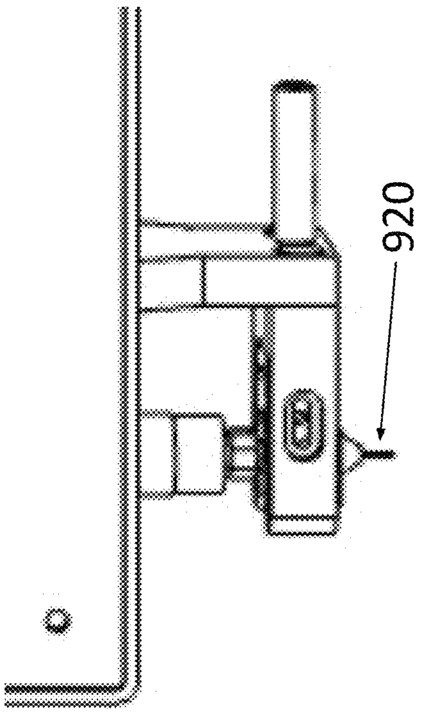
Figure 9G:
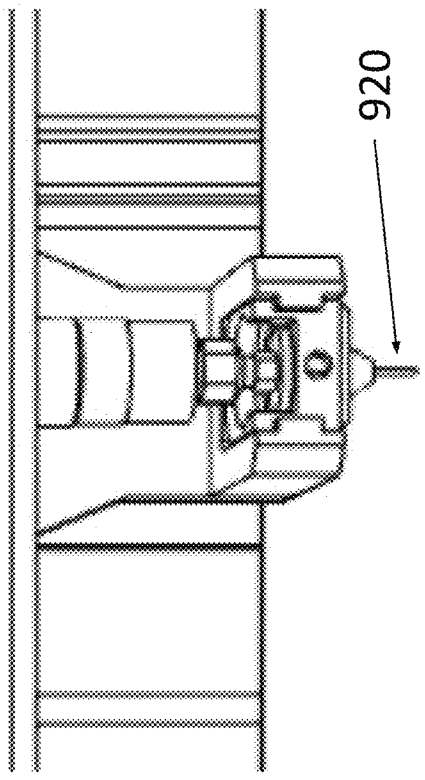

The needle 920 is operably coupled to a consumable container 910 (e.g., an oil container) that is in thermal communication with a heater 915 (see, FIG. 9B). In some embodiments, the heater 915 can include an electrical heater. The system 900 also includes a first control panel 932 to control the consumable conditions and a second panel 934 to control the temperature of the consumable. In some embodiments, the control panels 932 and 934 can receive instructions via buttons. In some embodiments, the control panels 932 and 934 can include a touch screen to receive instructions from the user. In some embodiments, the control panels 932 and 934 can receive instructions via voice commands from the user.

In some embodiments, the control panels 932 and/or 934 can configured to be communicating with a remote controller (not shown in FIGS. 9A-9H). A user can control the operation of the system 900 via the remote controller. In some embodiments, the operation status of the system 900 can be displayed on the first control panel 932.

Figure 10C:
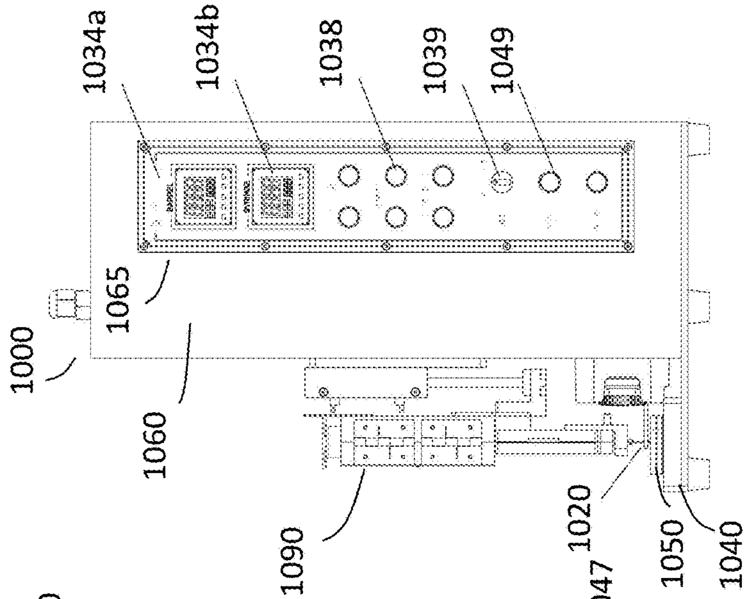
FIGS. 10A-10C show schematics of a rear view, a side view and a front view of an system for consumable filling, according to an embodiment.
Figure 10B:
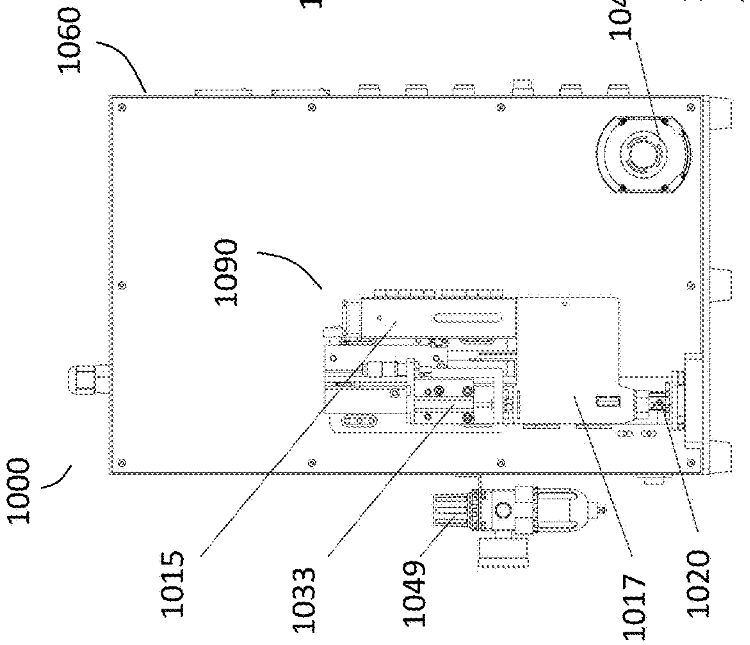
Figure 10A:
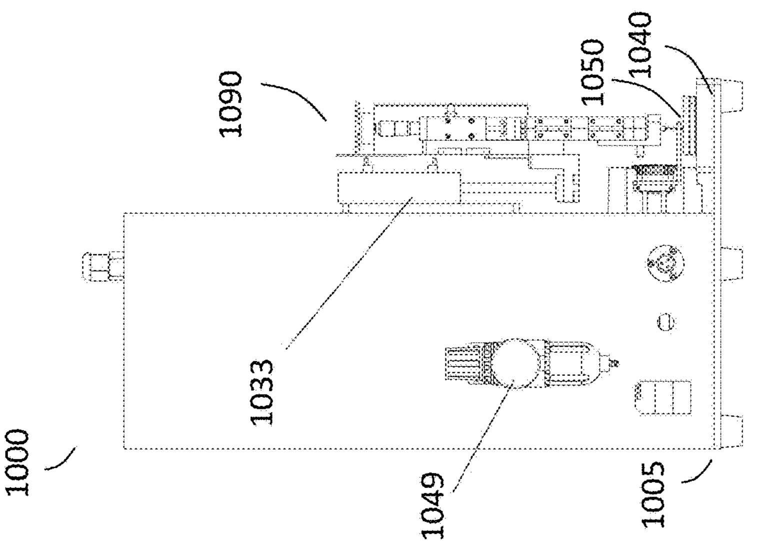

FIGS. 10A-10C show schematics of a rear view, a side view, and a front view, respectively, of an system 1000 for consumable filling, according to an embodiment. The system 1000 can be similar in structure and/or function to the system 900 described above. The system 1000 includes a frame 1005 to hold/support one or more components in the system 1000. The system 1000 can be directed to filling a fillable component with a consumable substance as described in further detail herein. The frame 1005 includes a front panel 1060, a base 1040 to receive a package 1050 for filling or refilling (see, e.g., FIGS. 10B and 10C), and supports a filling assembly 1090 (also referred to herein as a "pump assembly"). The system 1000, as shown in FIG. 10B, includes an emergency button 1047 configured to terminate functioning of the system 1000 and/or freeze the functioning of the system 1000 (e.g., by disrupting power to one or more components of the system 1000). In some embodiments, the system 1000 includes an air regulator 1049 that can be used to regulate air pressure for use in the functioning of one or more components (e.g., motors, actuators, valves, etc.) included in the system 1000.

Figure 11:
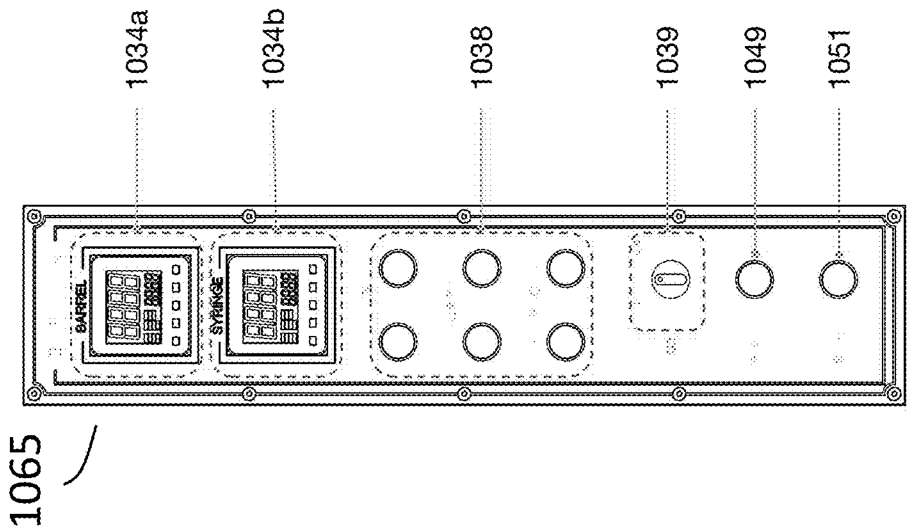
FIG. 11 is a schematic of a control panel on a front panel on the system of FIG. 10C for consumable filling, according to an embodiment.

The front panel 1060 includes a control panel 1065 that can be configured with one or more control components (e.g., buttons, lever, switches, displays, and the like) as shown in FIG. 10C and described in further detail herein. FIG. 11 is a schematic illustration of the control panel 1065 of FIG. 10C, according to some embodiments. For example, in some embodiments the front panel 1065 can include one or more temperature monitor and/or temperature control panels 1034*a* and 1034*b* that are configured to monitor and control the temperature of a consumable substance held in the system 1000 and/or of a heating assembly or element disposed near the consumable substance held in the system 1000. For example, the temperature control panel 1034*a* can be configured to monitor and/or control temperature conditions of consumable substance held in a supply reservoir (described in further detail below) and/or of a heating assembly or element disposed near the supply reservoir of the system 1000. As another example, the temperature control panel 1034*b* can be configured to monitor and/or control temperature conditions of consumable substance held in a filling syringe (described in further detail below) and/or of a heating assembly or element disposed near the filling syringe of the system 1000.

The front panel can further include one or more buttons configured to control one or more components of the system 1000. For example, the control panel 1065 can include buttons 1038 configured to control movement of one or more actuators to effect one or more functions of the system 1000 related to filling a fillable component with a quantity of a consumable substance. For example, in some embodiments, one or more buttons 1038 can include buttons configured to move and/or manipulate a syringe connected to a supply reservoir and/or a consumable substance stored in a syringe head serving as a supply reservoir. The buttons can be configured to control the drawing of a quantity of consumable substance from a supply reservoir and/or the injection of the quantity of consumable substance drawn via the needle 1020 (e.g., by controlling an actuator coupled to a syringe plunger or syringe barrel). In some embodiments, one or more buttons 1038 can include buttons configured to control the movement of one or more holders of one or more packages (e.g., package 1050 which can be substantially similar in structure and/or function to any of the packages disclosed above such as 700, 800, etc.) including a fillable component (e.g., a vaporizer or a vaporizer capsule, or the like) (e.g., by controlling one or more actuators coupled to the one or more holders). In some embodiments, the one or more buttons 1038 can include buttons configured to control the movement of one or more portions of a filling syringe (described in further detail herein), for example, to dispense the quantity of consumable substance into a fillable component. In some embodiments, the one or more buttons 1038 can include buttons configured to control the movement of one or more fixtures configured to hold a package on the base 1050 while the fillable component in the package 1050 is being filled via the needle 1020.

The front panel 1065, as shown in FIG. 11, can further include one or more levers 1039 configured to switch the system 1000 between a manual mode where the system 1000 is operated manually and an automatic mode where the system is programmatically automated, using a processor and a memory coupled to the processor and storing instructions readable by the processor, to perform a stored sequence of functions. The front panel 1065, as shown in FIG. 11, further includes a reset button 1049 configured to reset one or more states and/or functions of the system 1000, and a start button 1051 configured to begin a sequence of functions (e.g., a stored sequence of programmed functions) upon being manually operated.

Figure 12B:
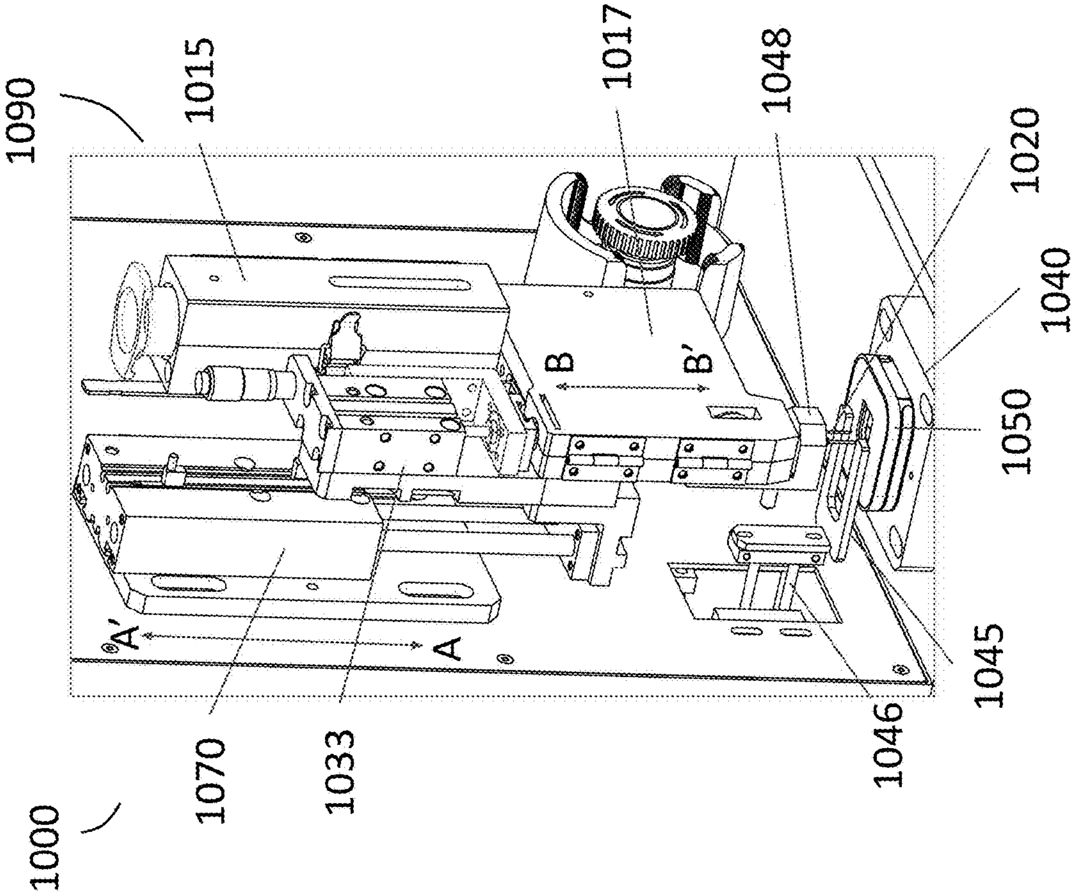
FIGS. 12A and 12B are schematics of the system of FIGS. 10A-10C, from a perspective side view and the perspective side view magnified to show portions of the system, according to an embodiment.
Figure 12A:
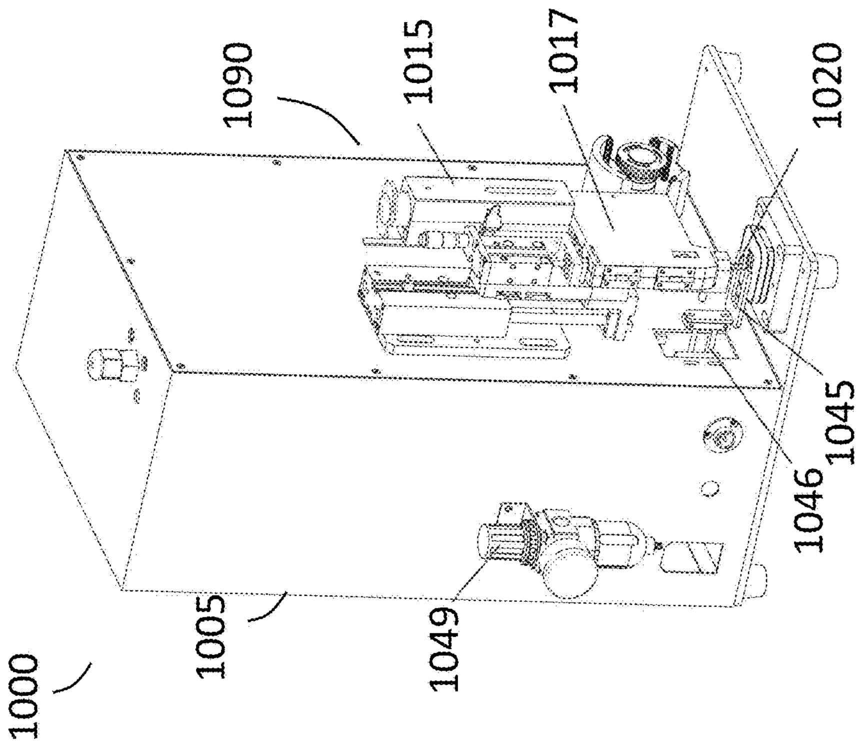

The base 1040 is mounted on the frame 1005 of the system 1000 and is configured to support the package (e.g., package 1050) before, during and after filling a fillable component included in the package via the insertion of the needle 1020. In some embodiments, as shown in FIGS. 12A and 12B, the system 1000 includes a retaining device 1045 configured to maintain a position of the package 1050 relative to the base (e.g., hold the package 1050 in position on the base 1040 and prevent upward movement during eventual removal of a needle from the package 1050) while being filled. The retaining device 1045 can be actuated by a motor 1046 to transition between an initial position and a retaining position relative to the package 1050. For example, the motor 1046 can be configured to vertically raise and lower the retaining device 1045 such that the retaining device 1045 is in a raised position during placement of the package 1050 on the base 1040 and removal of the package 1050 from the base 1040. When the package 1050 is on the base 1050, the motor 1046 can lower the retaining device 1045 to contact and clamp the package 1050 against the base 1040. In some embodiments, rather than moving the retaining device 1045 vertically up and down, the motor 1046 can be configured to horizontally advance and retract the retaining device 1045 relative to the package 1050 such that the retaining device 1045 can immobilize the package 1050 during and after the filling of consumable substance in a fillable component of the package 1050. As shown in FIG. 12B, the retaining device 1045 can have two extension members that are configured to contact the package 1050 in two locations (e.g., on either side of an opening configured to receive a needle). In some embodiments, the retaining device 1045 can be U-shaped.

Figure 12C:
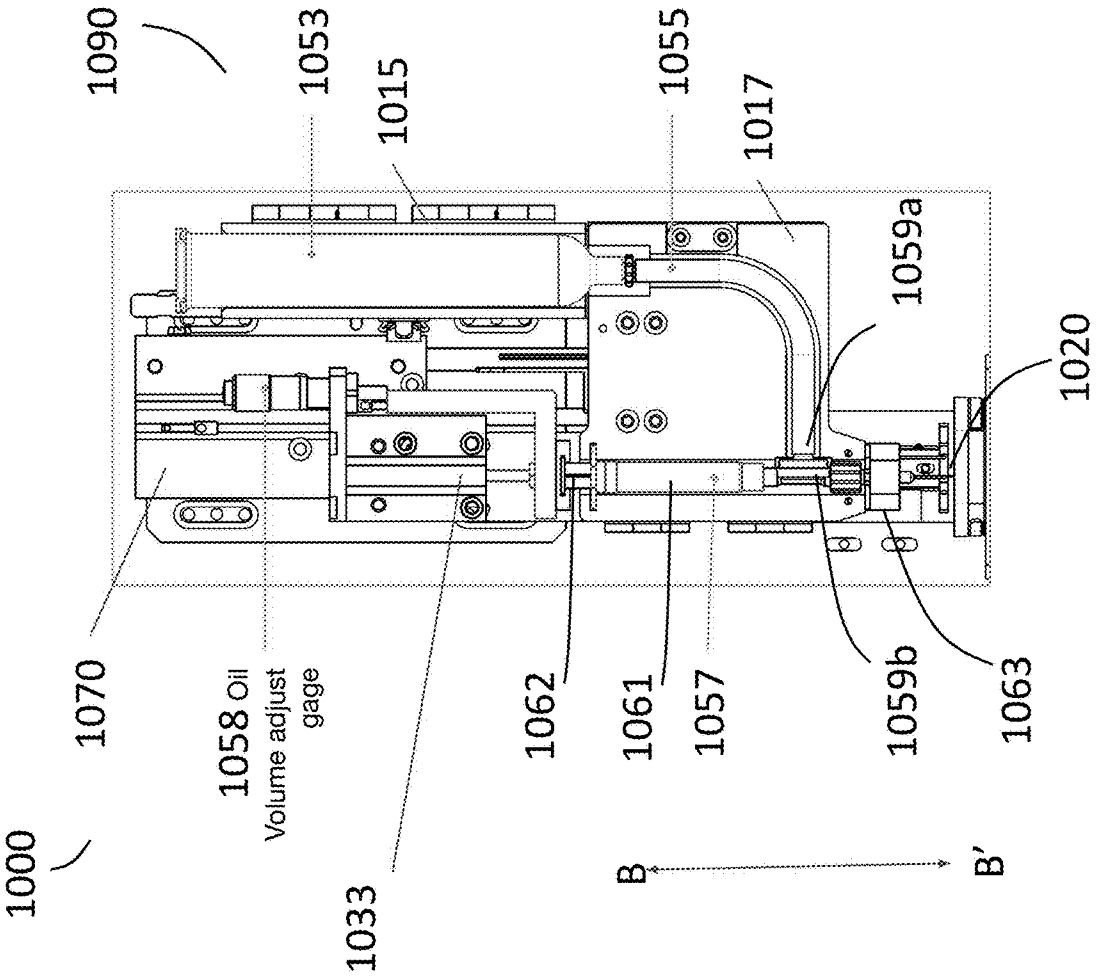
FIG. 12C is a schematic of a filling assembly of the system of FIG. 12A-12B, according to an embodiment.

The frame 1005 of the system 1000 supports the filling system 1090 that can be operated to fill the fillable component in the package with consumable substance. FIG. 12A is a schematic of a perspective side view pf the system 1000 showing the filling assembly 1090 which is shown in magnified view in FIG. 12B. FIG. 12C is a schematic of a sectioned side view of the filling assembly 1090 showing a portion of the internal components of the filling assembly 1090 shown in FIGS. 12A and 12B.

As shown in FIGS. 12A and 12B, the filling assembly 1090 can be mounted on a linear actuator 1070 such that actuating the linear actuator 1070 in the direction indicated by the arrow head A in FIG. 12B moves the filling assembly 1090 from a first position, where the needle 1020 is spaced from and not in contact with a package 1050 held on the base 1040, to a second position where the tip of the needle 1020 is positioned within a reservoir of a fillable component included in the package 1050 (e.g., within a reservoir of a vaporizer or a reservoir of a vaporizer capsule), having pierced through a membrane included in the package 1050. Actuating the linear actuator 1070 in the direction indicated by the arrow head A' in FIG. 12B can retract the filling assembly 1090 from the second position where the tip of the needle 1020 is positioned within a reservoir of a fillable component included in the package 1050, to the first position, where the needle 1020 is spaced from and not in contact with the package 1050. The linear actuator 1070 can be any suitable actuator using any suitable means of activation (e.g., servo motors, pneumatic actuators, etc.)

As shown in FIGS. 12A, 12B, and 12C, the filling system 1090 includes a supply reservoir 1053 (also referred to as a barrel, or a syringe head, herein), a filling syringe 1057, a tube 1055 fluidly coupling an interior of the supply reservoir 1053 with an interior of the filling syringe 1057, and a needle 1020 in fluidic communication with the filling syringe 1057. The needle 1020 can be coupled to (e.g., held by or mounted to) a needle holder 1063. In some embodiments, the filling assembly 1090 includes one or more check valves configured to gate the flow and/or a direction of flow of consumable substance from the supply reservoir 1053 to the filling syringe 1057 via the tube 1055, and/or to gate the flow and/or direction of flow of consumable substance between the filling syringe 1057 to the needle 1020. The supply reservoir 1053 can be of any suitable capacity (e.g., 350 cc).

The filling assembly 1090 includes a first heating element 1015 configured to heat the consumable substance stored in the supply reservoir 1053 to a predetermined first temperature. The filling assembly 1090, in some embodiments, further includes a second heating element 1017 configured to heat, to a predetermined second temperature, the consumable substance drawn into the barrel 1061 of the filling syringe 1057. In some embodiments, the second heating element 1017 can be configured to heat both the contents of the barrel 1061 and the tube 1055. In some instances, the first and/or second predetermined temperatures can be based on one or more temperature sensitive properties of the consumable substances (e.g., viscosity, flow rate, etc.).

In some embodiments, the filling syringe 1057 includes a tip (not shown) fluidically coupled to the needle 1020, a barrel 1061 and a plunger 1062 insertable into the interior of the barrel. As shown in FIGS. 12A-12C, the plunger 1062 is coupled to the linear actuator 1033. The linear actuator 1033 is configured such that actuating the linear actuator 1033 in the direction indicated by the arrow head B in FIGS. 12B and 12C can draw and/or retract the plunger 1062 from a first position, where the tip of the plunger 1062 is closer to the tip of the filling syringe 1057, to a second position where the tip of the plunger is farther away from the tip of the filling syringe 1057. Actuating the linear actuator 1033 in the direction indicated by the arrow head B' can advance the plunger 1062 from the second position where the tip of the plunger is farther away from the tip of the filling syringe 1057, to the first position, where the tip of the plunger 1062 is closer to the tip of the filling syringe 1057. The linear actuator 1033 can be any suitable actuator using any suitable means of activation (e.g., servo motors, pneumatic actuators, etc.) The linear actuator 1033 and the plunger 1062 can be configured such that movement of the plunger 1062 from the first position to the second position in the direction B can induce a drop in pressure in the interior of the barrel 1061 that is in fluidic communication with the supply reservoir 1053 via the tube 1055. The drop in pressure can induce a pressure differential that causes a flow of consumable substance from the supply reservoir 1053 to the interior of the barrel 1061 of the filling syringe 1057 via the tube 1055 and via the check valve 1059*a*. During such a flow one or more check valves may be included in the filling assembly 1090 to gate the flow direction (e.g., one or more check valves configured to prevent back flow into the supply reservoir 1053, to prevent flow into the needle 1020, etc.). As shown, in some embodiments, the filling assembly 1090 can include a first check valve 1059*a* to gate the direction of flow of fluids between the tube 1055 and the filling syringe.

The plunger 1062 engages with the interior walls of the barrel 1061 to form a fluid-tight seal. The linear actuator 1033 and the plunger 1062 can be further configured such that movement of the plunger 1062 from the second position to the first position in the direction B' can induce a positive increase in pressure in the interior of the barrel 1061 that is in fluidic communication with a lumen of the needle 1020 via the tip of the filling syringe (not shown). The increase in pressure within the barrel 1061 can induce a pressure differential that causes an extrusion and/or a flow of consumable substance from the barrel 1061 to the tip of the needle and therefrom (e.g., into the reservoir of a fillable component of a package) via the needle 1020 and via the check valve 1059*b*. During the flow of consumable substance from the interior of the barrel 1061 to the needle 1020 the check valve 1059*a* can prevent back flow into the tube 1055.

The needle 1020 mounted to the needle holder 1063 can be substantially similar to filling needle 220 and/or needle 920 described previously. The needle 1020 can be moved (e.g., along with the filling assembly 1090) between the first position to the second positon of the needle 1020 by actuating the linear actuator 1070 in the direction indicated by the arrow head A to reach the package 1050 and fill/refill the package 1050 via a filling aperture 1054 on the package 1050. In some embodiments, the filling aperture 1054 is covered and/or sealed by a resealable membrane (e.g., an elastomeric membrane such as a silicone membrane) before filling/refilling, and the needle 1020 and/or the movement of the actuator 1070 can be configured to pierce this membrane without permanently deforming the membrane to reach the reservoir of the fillable component included within the package 1050.

In some embodiments, the filling system described herein can be configured to receive, validate, fill, and/or quality check one or more packages including fillable components in a semi-automated and/or a fully automated manner. FIGS. 13A-13D are schematics showing images of an example filling system 1100 (also referred to herein as "Automated Filling Machine") from a right side view, front view, left side view and a top view respectively, with the walls of the system 1100 made partially transparent to show the components housed within.

Figure 13A:
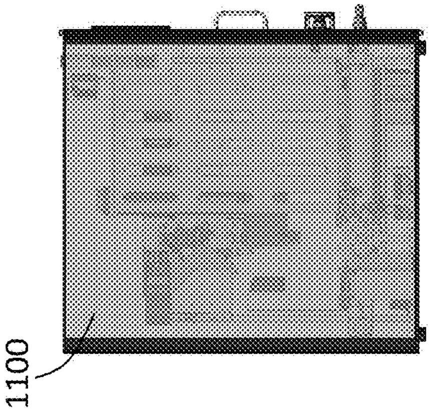
FIGS. 13A-13D are schematics showing images of an system for consumable filling, according to an embodiment, taken from a left side view, front view, right side view, a top view, respectively, with walls of the system made semi-transparent to show components in the interior of the system.
Figure 13B:
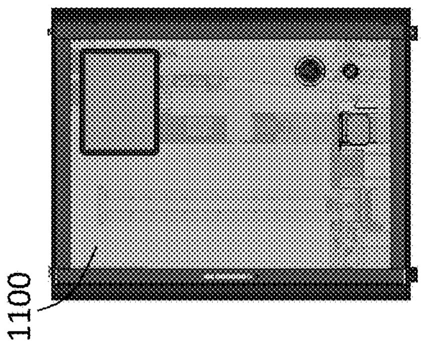
Figure 13C:
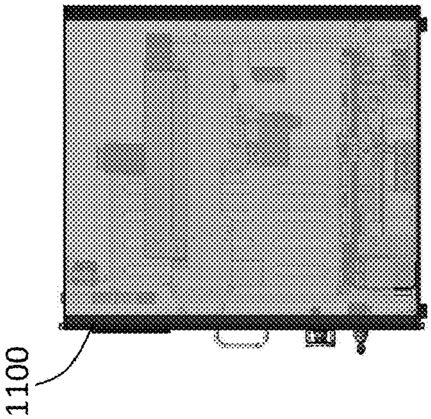
Figure 13D:
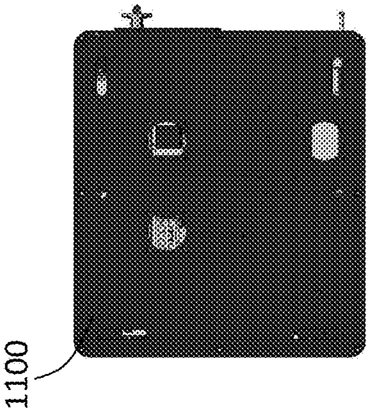
Figure 13E:
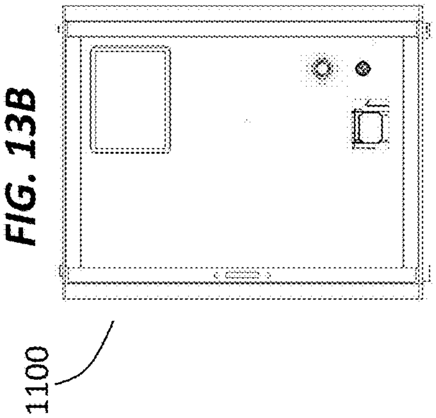
FIGS. 13E and 13F are schematics showing line drawings outlining the system of FIGS. 13A-13D, from a front view and a side view respectively.
Figure 13F:
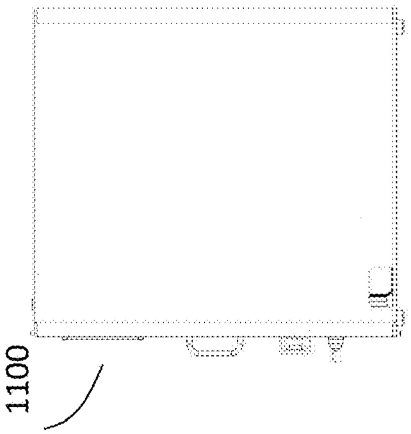

FIGS. 13E and 13F are line drawings showing a front view and a side view of the system 1100 according to an embodiment. FIGS. 14A-14D are schematics showing line drawings of sectional views of the system, outlining one or more components of the system 1100, as seen from a right side view, front view, left side view, and a top view, respectively. FIG. 15A is a schematic illustrating a perspective left side view of an interior of the filling system 1100, according to an embodiment. FIGS. 15B, 15C, and 15D are schematics illustrating a first additional perspective views of the left side, a second perspective view of the left side, and a perspective front view of the interior of the filling system 1100 of FIG. 15A, respectively, according to an embodiment. The filling system 1100 can be substantially similar in structure and/or function to the filling system 900 and/or 1000 described above. For example the system 1100 can include a frame 1105 (also referred to as a housing), a filling assembly 1190, an emergency stop button 1147, a control panel 1165 including one or more temperature control panels (e.g. temperature control panel). These may be substantially similar in structure and/or function to the frame 1005, the filling assembly 1090, the emergency stop button 1047, the control panel 1065 and/or the temperature control panels 1034*a*, 1034*b* described above. The system 1100 can additionally include components and/or properties configured for one or more stations directed to one or more functions (e.g., automated functions) of the system 1100.

In some embodiments, the one or more functions of the system 1100 can include reading an identifier associated with a package, filling consumable substance into a fillable component included in the package, measuring an amount of consumable substance filled into a package, writing an ID label onto the package, and/or determining one or more quality control properties associated with a filled package, as described in further detail herein.

Figure 16B:
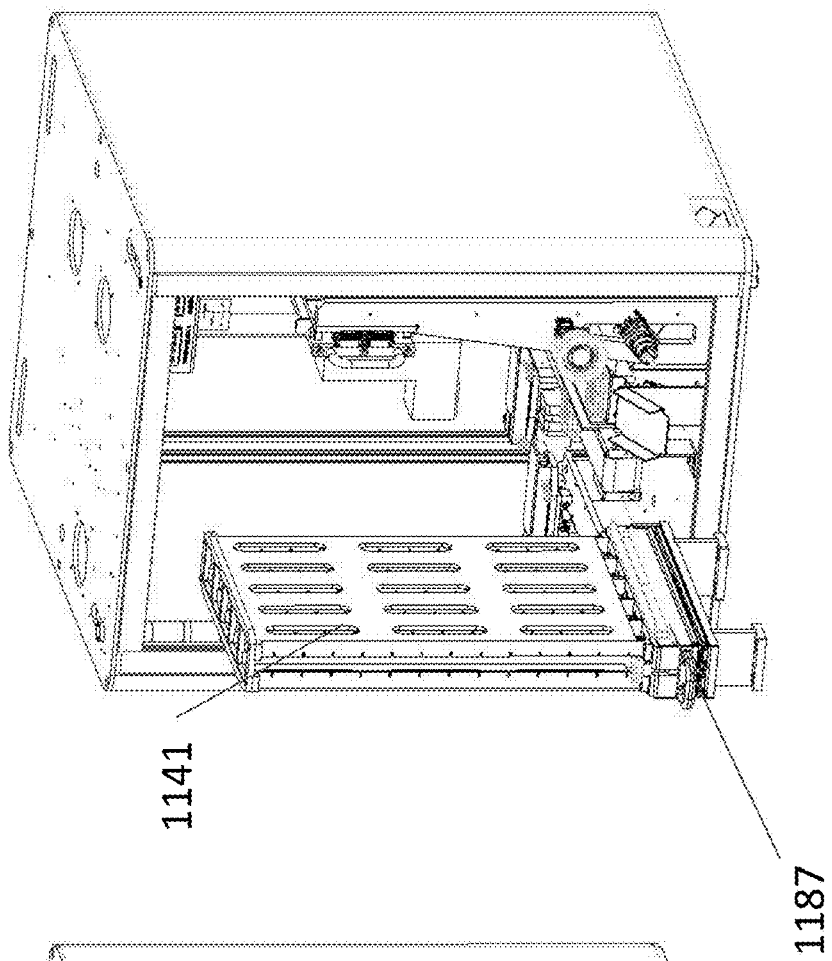
FIGS. 16A, 16B, 16C are schematics of the system of FIG. 15, according to an embodiment. The schematics show a magazine in a locked position, in an open position and in an open position during a loading operation, respectively.
Figure 16A:
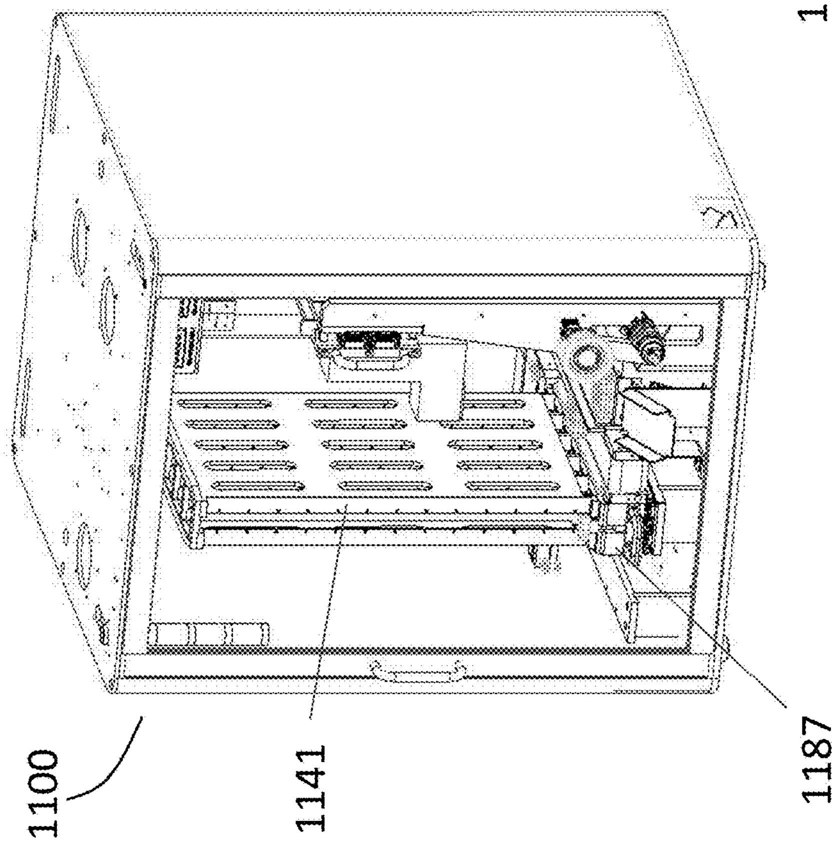
Figure 16C:
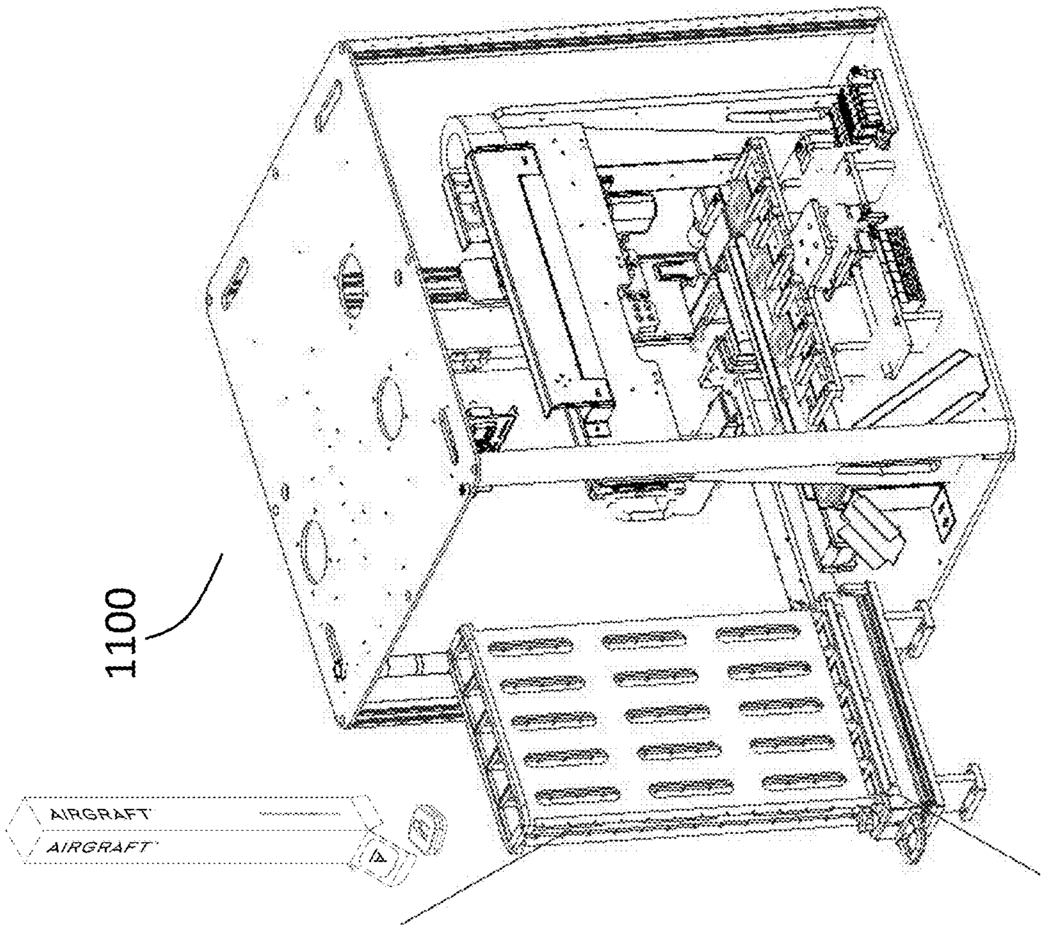

The system 1100 can include a magazine 1141 configured to be loaded with a set of empty packages (e.g., package 1150) and to release each package of the set of empty packages in a sequential manner such that each package (e.g., packages 1150*a*, 1150*b* . . . 1150*e*) may be presented at each station of the one or more stations for each of the one or more functions to be carried out. In some embodiments, the magazine 1141 can include a slide mount 1187 that can be mounted on a slidable rail such that the magazine can be slid out to be loaded with a set of packages with empty fillable components that can be filled using the system 1100. FIGS. 16A and 16B are schematics of a perspective view of the system 1100 showing the magazine 1141 in a first position locked inside the frame 1005 and a second position after being slid out of the frame 1005 for loading with packages 1150, respectively. The magazine 1141 when slid out can be loaded with packages with empty fillable components as shown in FIG. 16C.

Figure 17D:
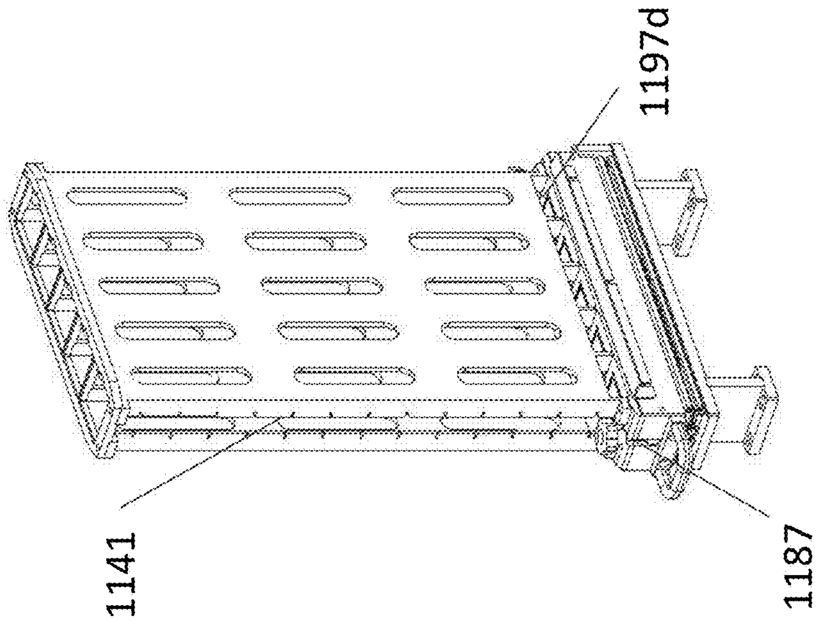
FIGS. 17A-17D are schematics illustrating a magazine configured to be used with the system of FIG. 15, shown from a top view, side view, front view, and a perspective side view.
Figure 17A:
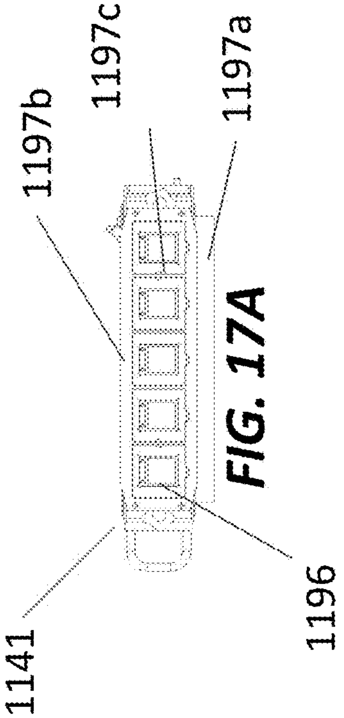
Figure 17C:
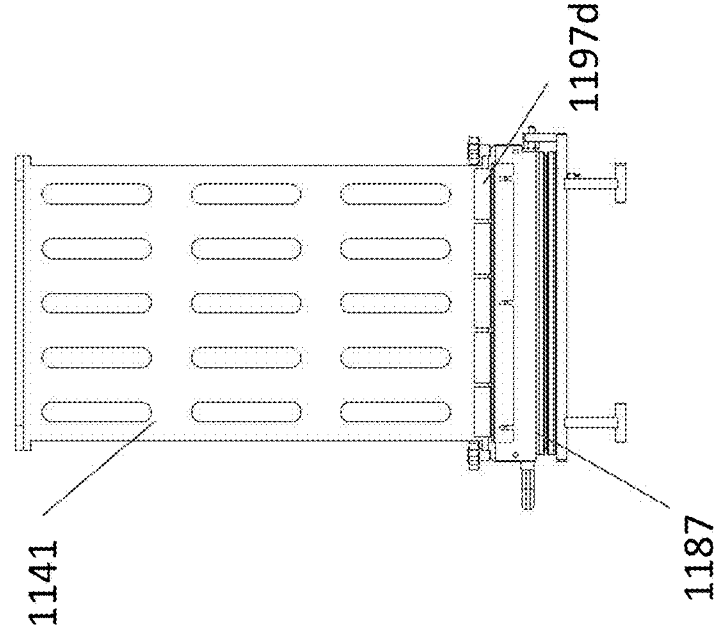
Figure 17B:
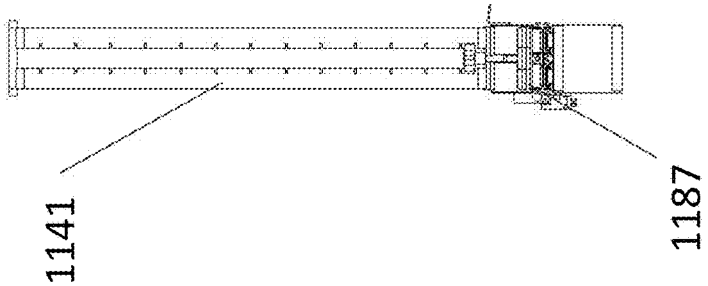

FIGS. 17A-17D are schematics of the magazine 1141 from a top view, side view, front view and a perspective side view respectively. The magazine 1141 can define a number of slots 1196 (e.g., five slots) configured to receive stacks of packages 1150 arranged in columns. The slots 1196 can be defined by a front housing portion 1197*a*, a back housing portion 1197*b*, and a number of dividers 1197*c* coupling the front housing portion 1197*a* to the back housing portion 1197*b*, with the slots 1196 disposed between the dividers 1197*c*, as illustrated in FIG. 17A. The magazine 1141 can define an opening 1197*d* in the front and back housing portion at the base of each slot such that the bottommost package 1150 in each column or tower of packages 1150 in each slot can be accessed via the opening 1197*d*.

Figure 14D:
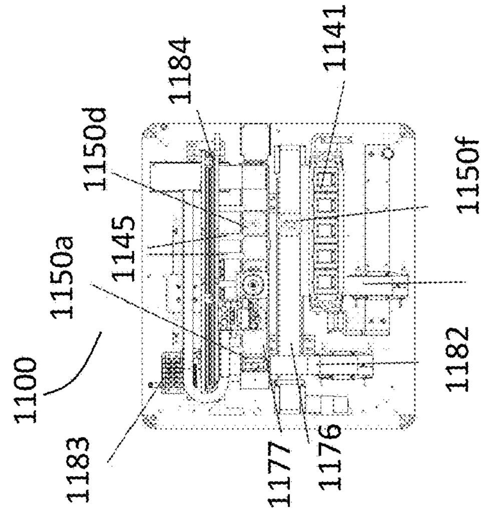
FIG. 14A-14D are schematics showing line drawings outlining the system of FIGS. 13A-13D for consumable filling, according to an embodiment, viewed from a left side view, front view, right side view, a top view, respectively.
Figure 14C:
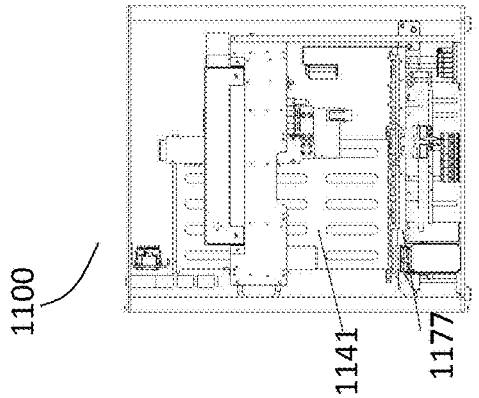
Figure 14B:
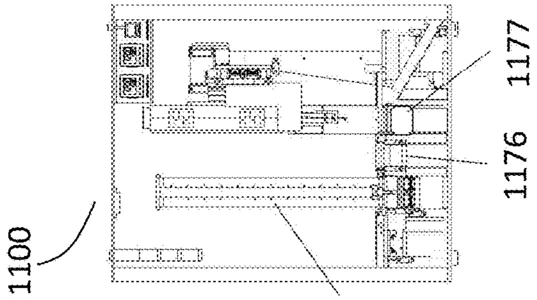
Figure 14A:
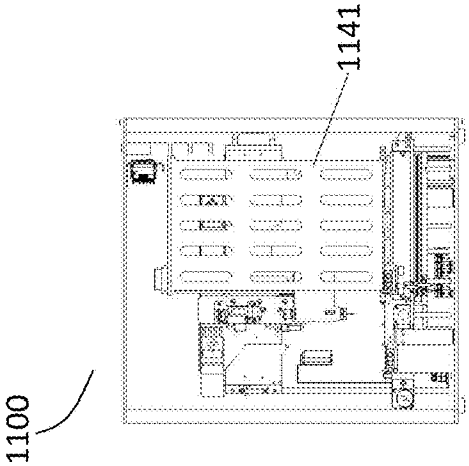
Figure 15A:
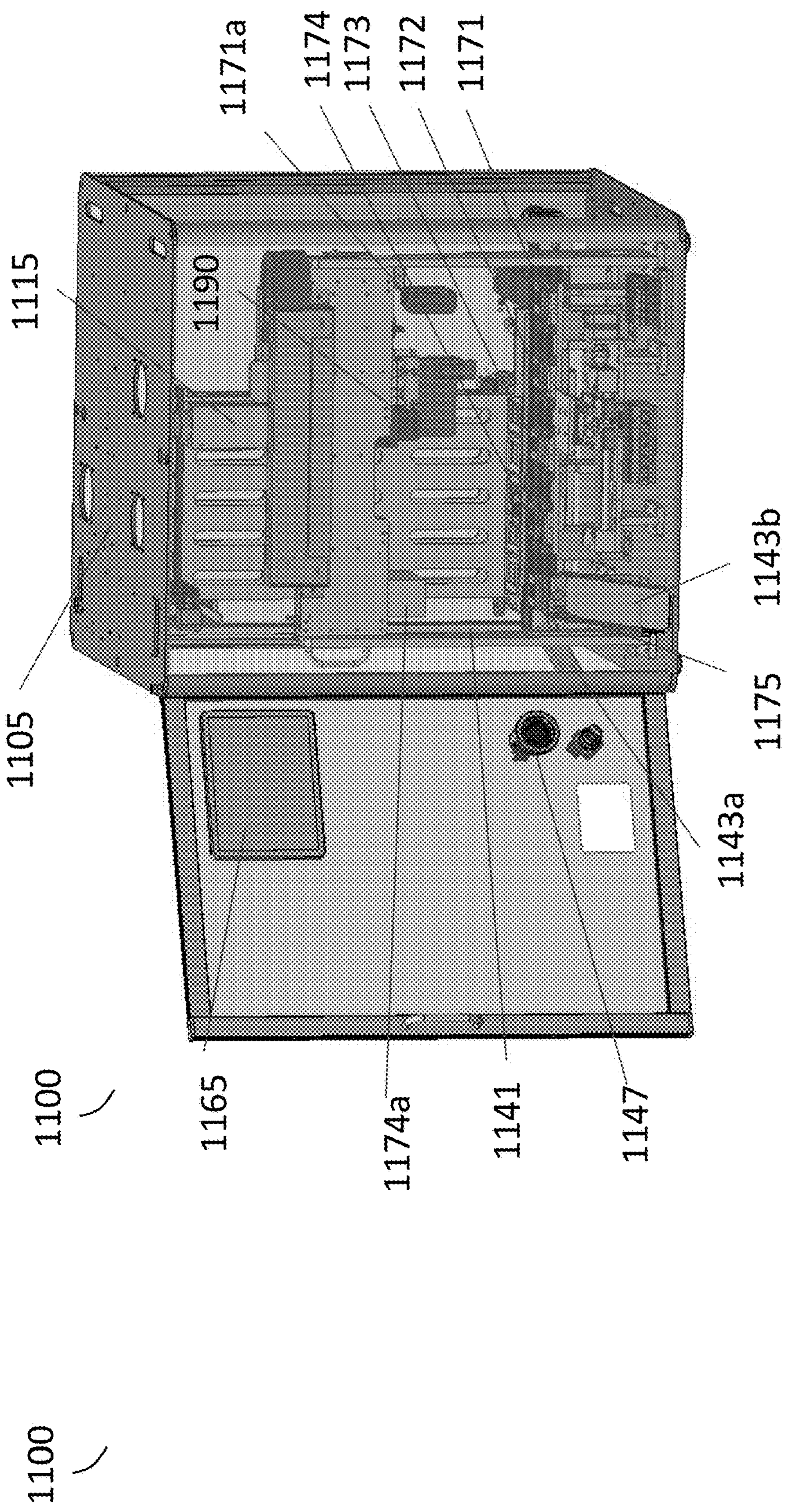
FIG. 15A is a perspective side view of the system of FIGS. 14A-14D, with the walls shown as semi-transparent to show a portion of the interior, according to an embodiment.
Figure 15B:
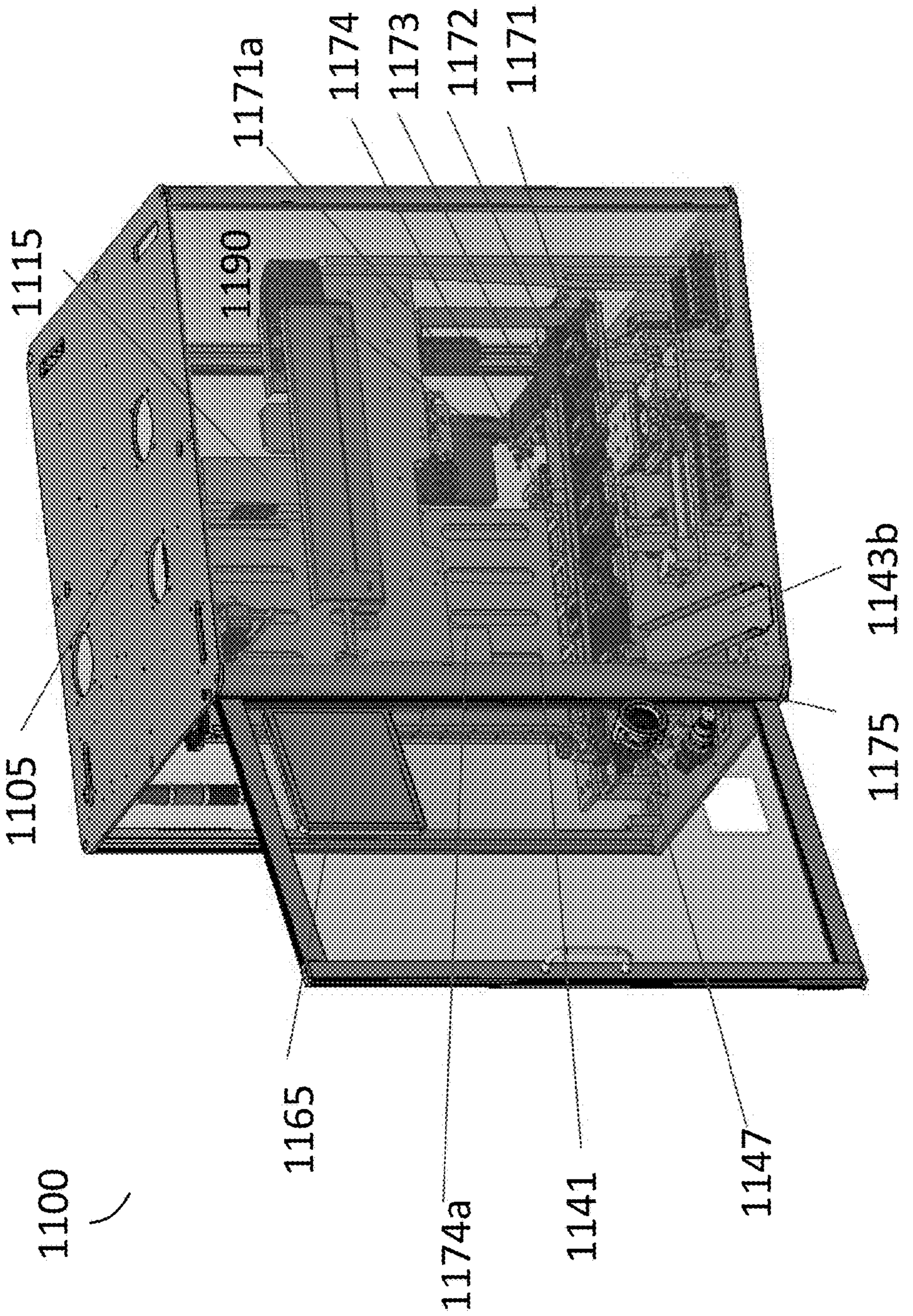
FIGS. 15B, 15C, and 15D are schematics illustrating a perspective top view, another perspective top view, and a perspective front view of the filling system of FIG. 15A.
Figure 15C:
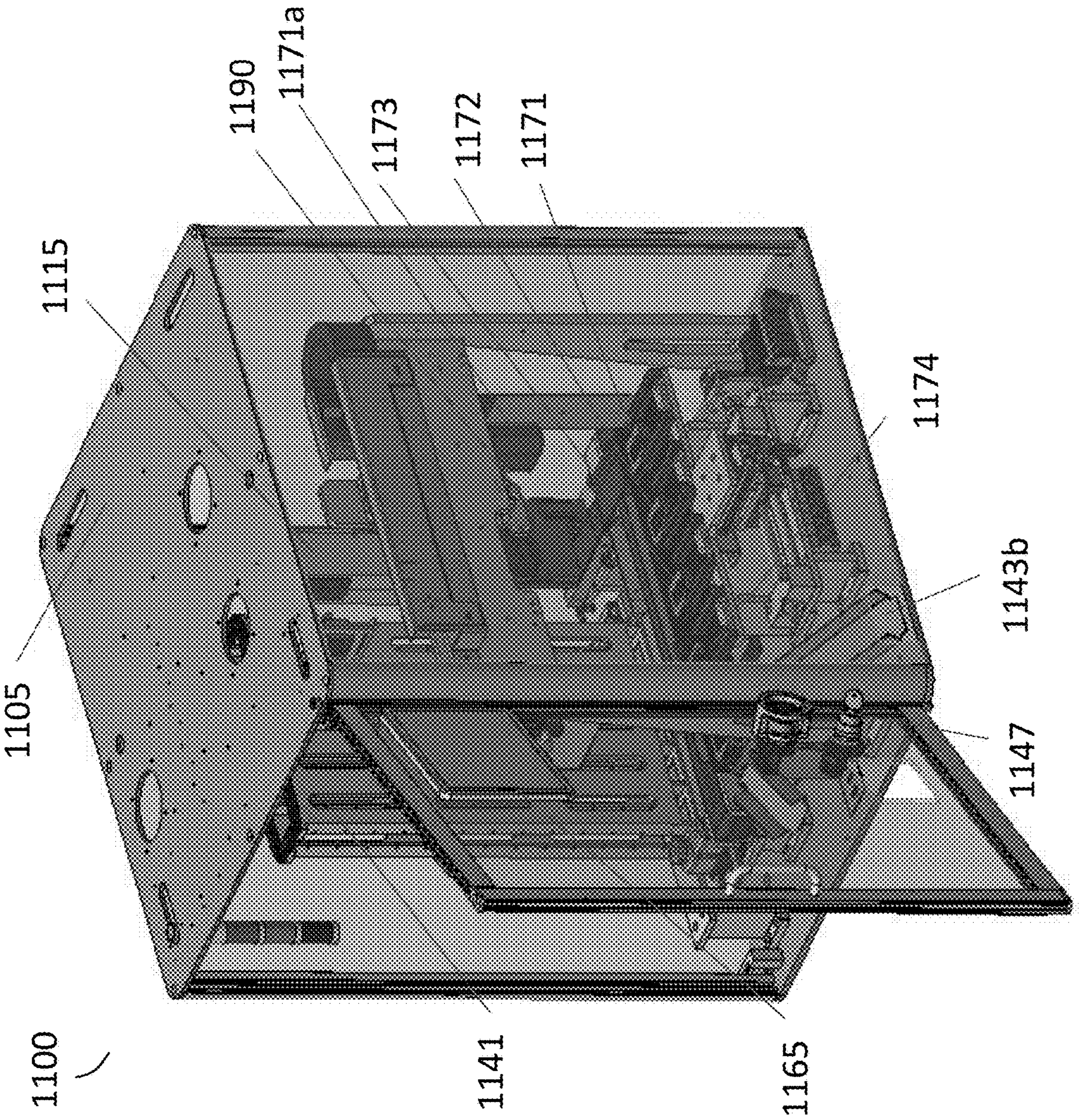
Figure 15D:
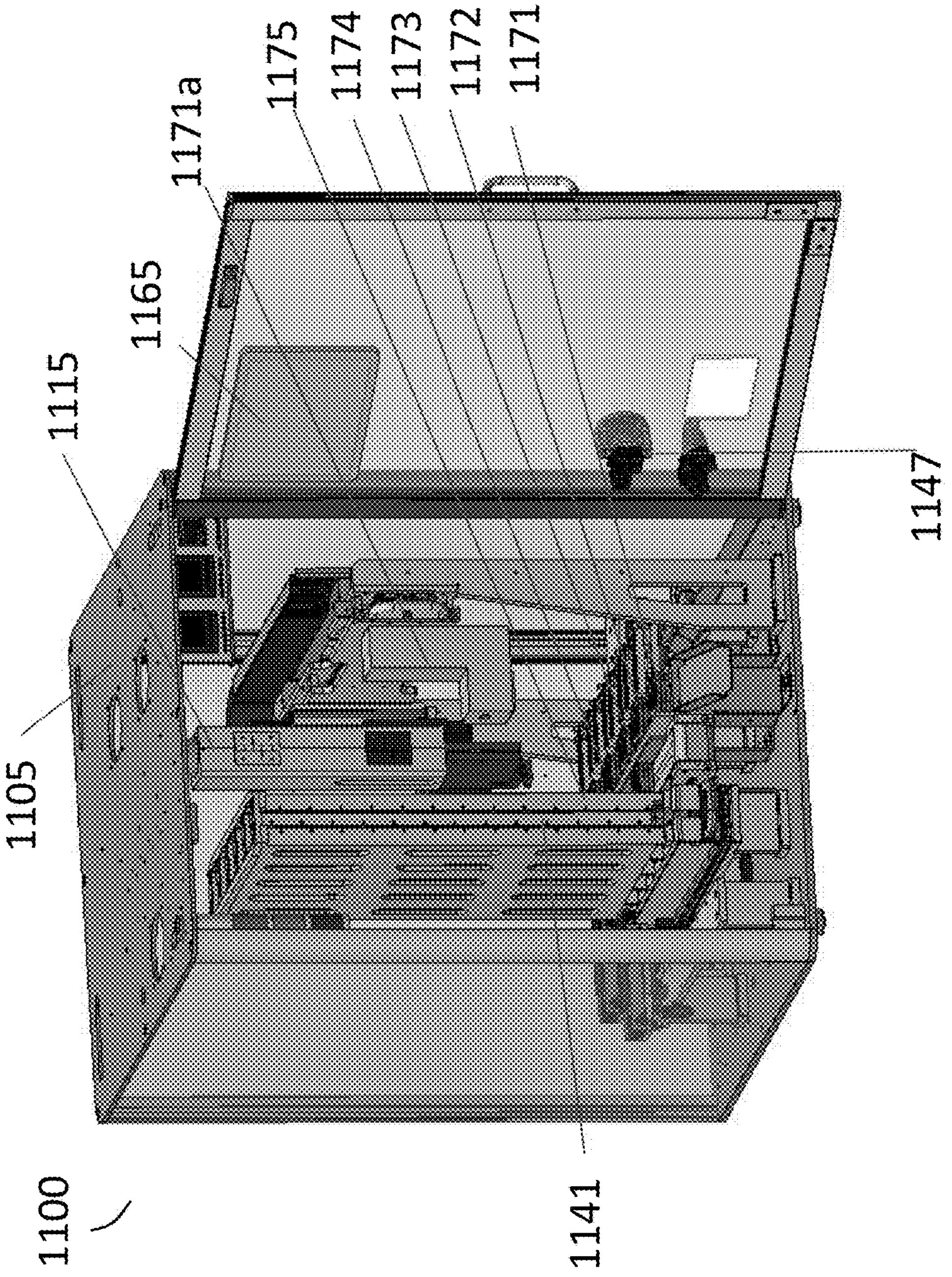
Figure 18B:
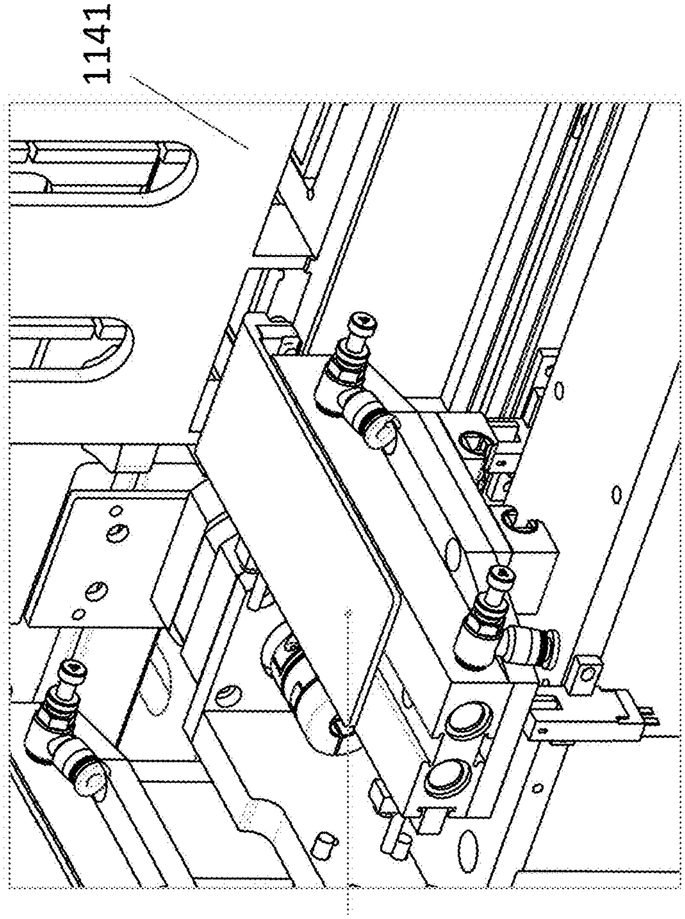
FIG. 18B is an enlarged view of the portion 18B outlined in FIG. 18A to show an actuator coupled to move the magazine, according to an embodiment.
Figure 18A:
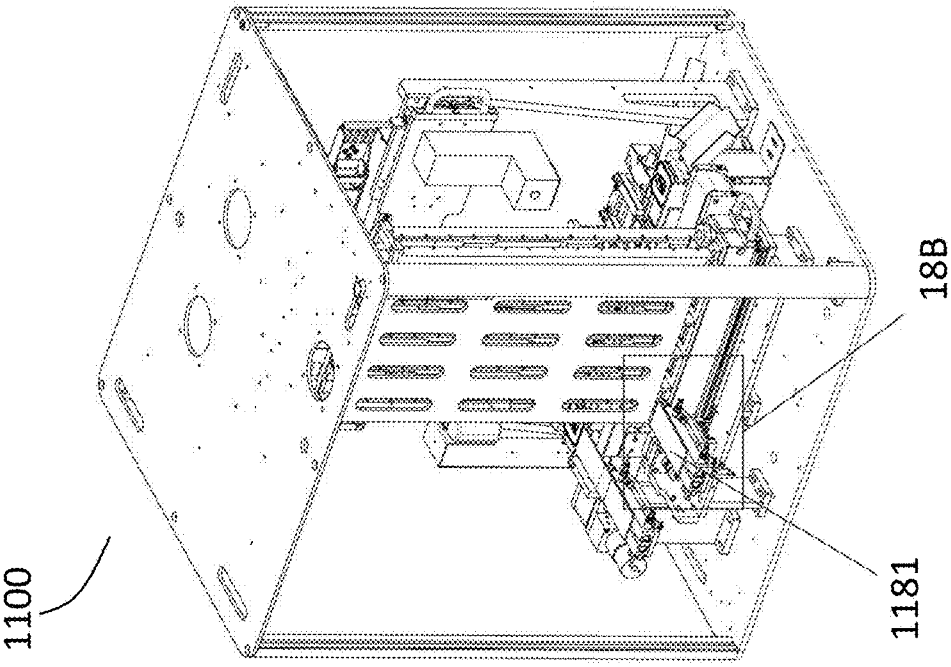
FIG. 18A is a schematic illustrating a perspective rear view of the system of FIG. 15

The system can include an actuator 1181 configured to translate each package from the magazine 1141 onto a movable conveyor belt 1176, shown in FIGS. 14B and 14D. FIGS. 18A and 18B show a perspective rear view of the system 1100 (magnified in FIG. 18B) showing the actuator 1181 that can be actuated to eject and release a series of packages, sequentially, from the magazine 1141 and onto the conveyor belt 1176. For example, the actuator 1181 can include a pusher member that can be advance through the opening 1197*d* at the base of each slot of the magazine 1141 to push the bottommost package 1150 from the magazine 1141 onto the conveyor belt 1176. The pusher member can then be retracted such that any packages 1150 previously stacked on top of the bottommost package 1150 will drop, with a new package 1150 becoming the bottommost package 1150. The actuator 1181 can repeat the motion to push each package 1150 from the stacked column of packages 1150 onto the conveyor belt 1176, and then horizontally translate to perform the same unloading operation on an adjacent stacked column of packages 1150 in another slot of the magazine 1141.

The conveyor belt 1176 can be configured to receive each released package (e.g., package 1150*f* shown for example in FIG. 14D and FIG. 19B) and convey the package in a suitable direction (e.g., the direction indicated by the arrow E in FIG. 20) to a position on the belt (e.g., a left edge shown in FIG. 14D, a top edge shown in FIGS. 19B and 20) where a second actuator 1182 can be actuated to move (e.g., push) the package from the conveyor belt 1176 to a platform 1177.

In some embodiments, the platform 1177 can be a motorized stage. The actuator 1182 is shown in an actuated position in FIG. 19B such that a package 1150*a* was moved from the conveyor belt 1176 to the platform 1177 into the station 1171.

Figure 19B:
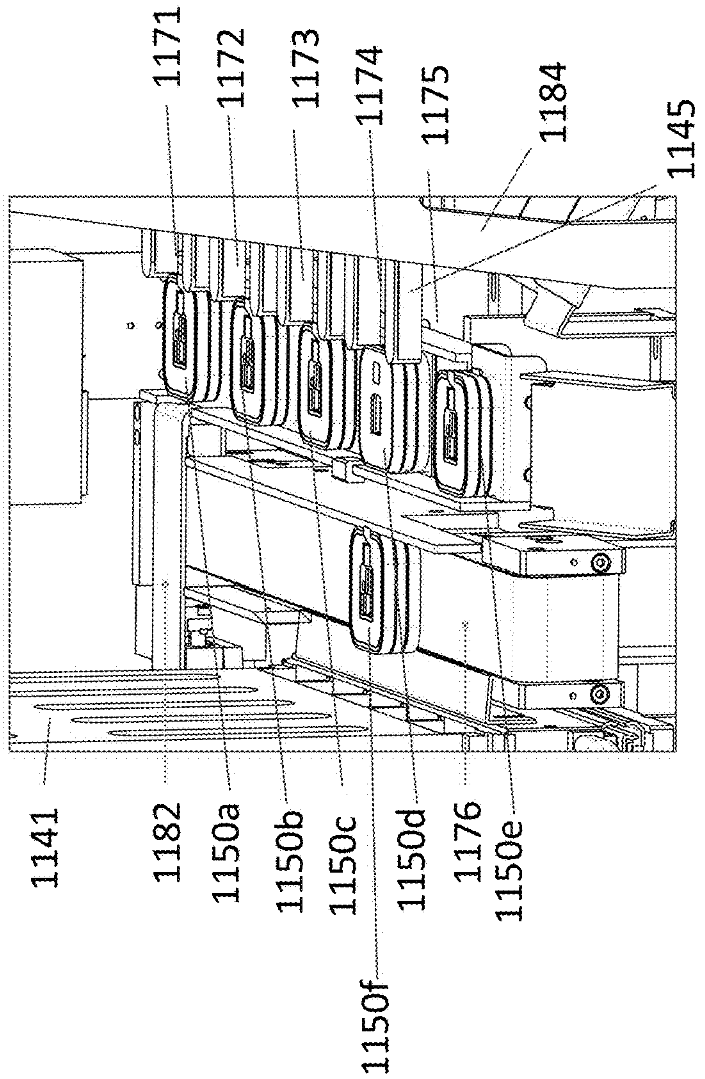
FIG. 19B is an enlarged view of the portion 19B outlined in FIG. 19A to show one or more mechanisms to release and convey packages to one or more stations of the system, according to an embodiment.
Figure 19A:
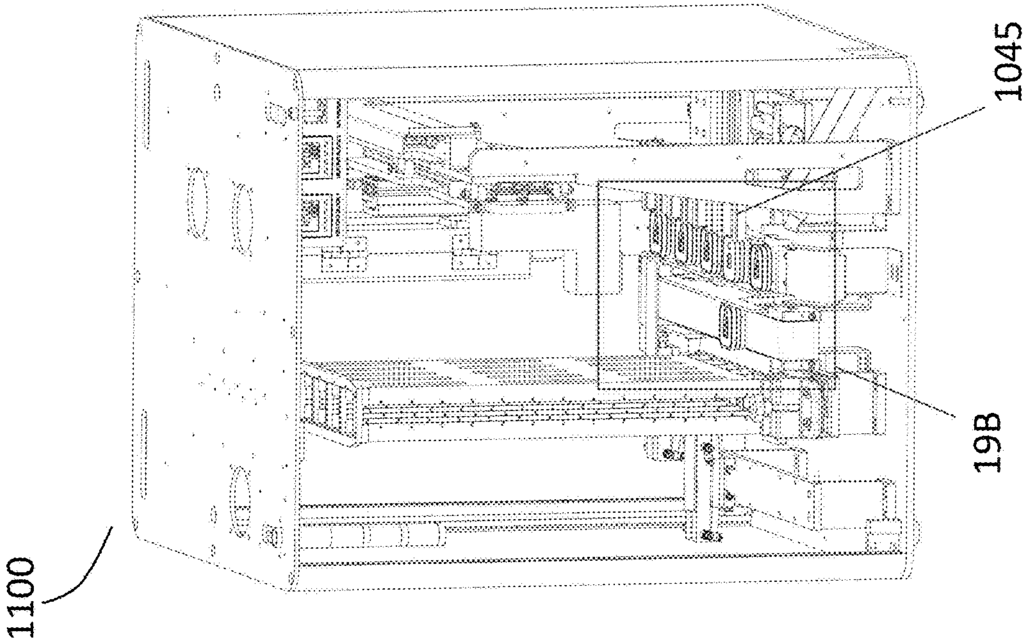
FIG. 19A is a schematic illustrating a perspective front view of the system of FIG. 15
Figure 20:
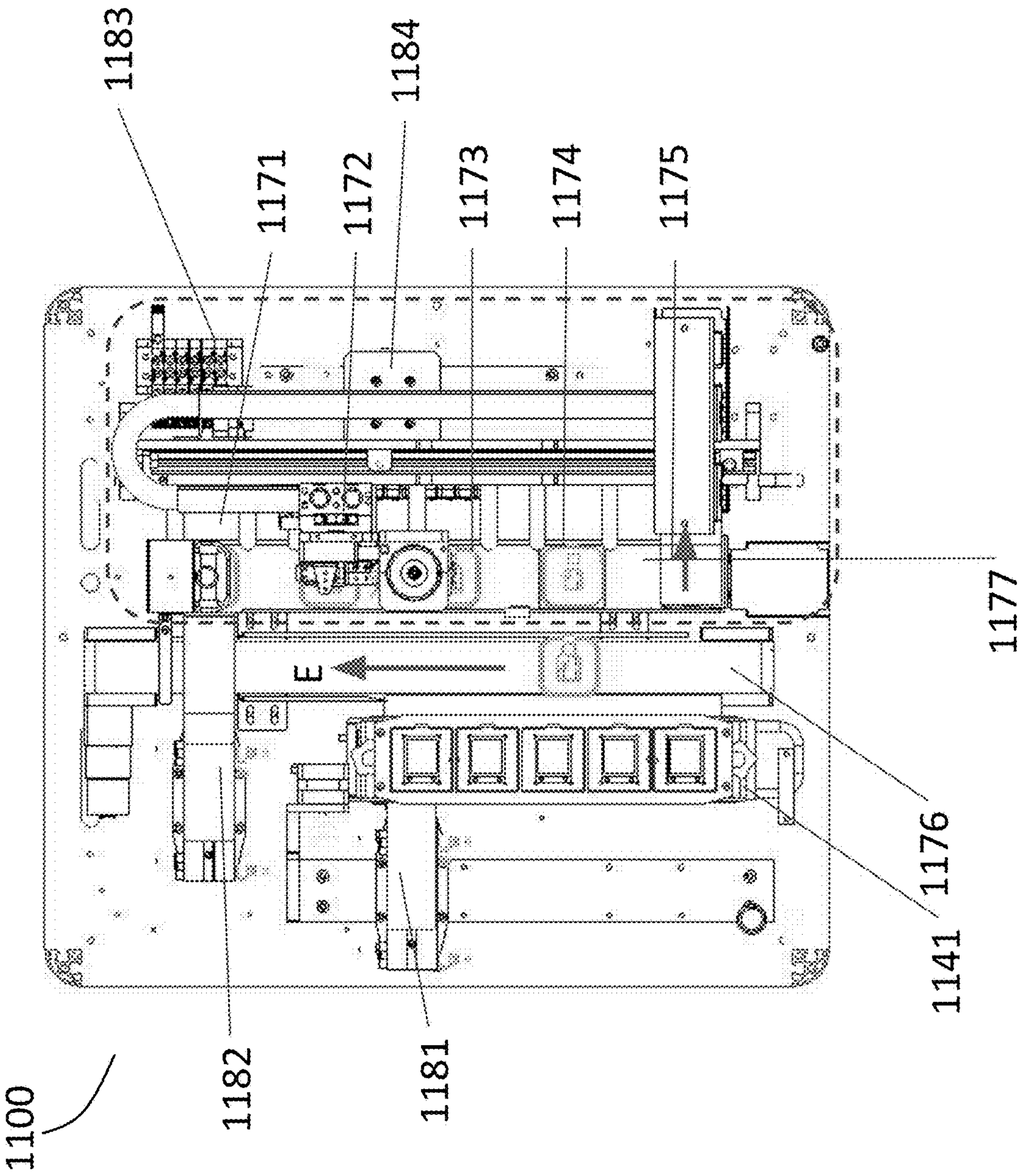
FIG. 20 is a schematic of a top view of the system of FIG. 15 according to an embodiment.

In some embodiments, each package can be positioned at each station on the platform 1177 via holders 1145 on a movable arm 1184. For example, as shown in FIG. 19B, package 1150*a* is positioned at station 1171, 1150*b* at station 1172, package 1150*c* at station 1173, and so on, using holders 1145. In some embodiments, the holders 1145 can be mounted on a movable arm 1184 moved using one or more actuators 1183 (e.g., pneumatic solenoid air valves as shown in FIG. 20 for example), such that the holders 1145 can be used to slide over the platform 1177 and retain each package at each station on the platform 1177. After the completion of a function at a station (e.g., after completion of a reading of an identifier of a package, completion of filling, and so on) the movable arm 1184 can be translated in a direction opposite arrow E such that each package can be advanced to the next station, retracted from over the platform 1177 and moved back to receive the next package in the sequence of packages released from the magazine 1141 and delivered from the conveyor belt 1176 by the actuator 1182.

Figure 21:
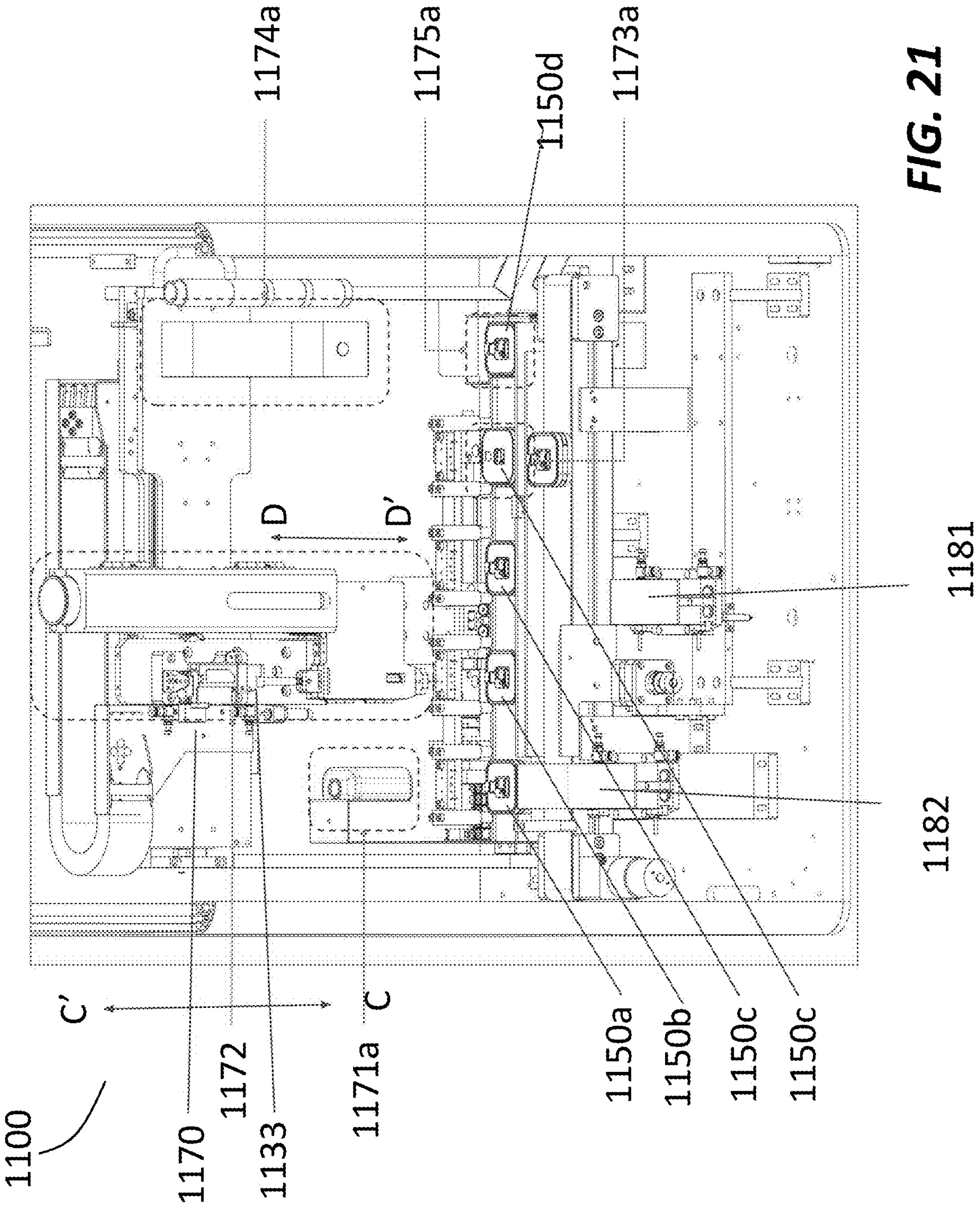
FIG. 21 is a schematic of a perspective side view of the system of FIG. 15, with the magazine removed, to show the stations, according to an embodiment.
Figure 22B:
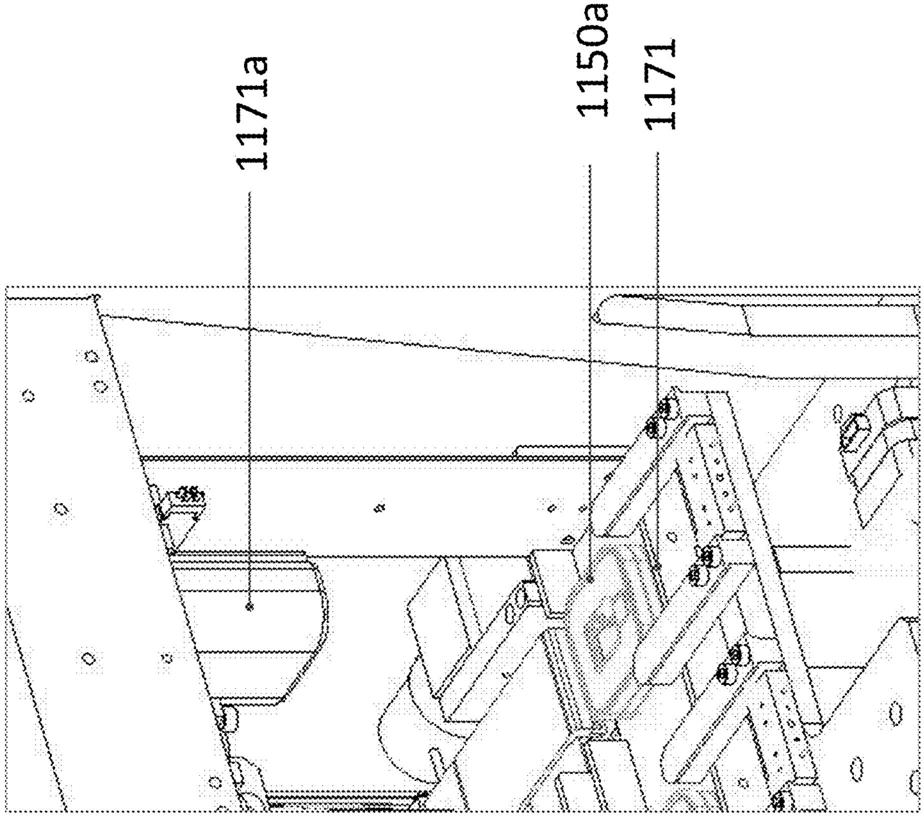
FIG. 22B is an enlarged view of the portion 22B outlined in FIG. 22A to show a reading station, according to an embodiment.
Figure 22A:
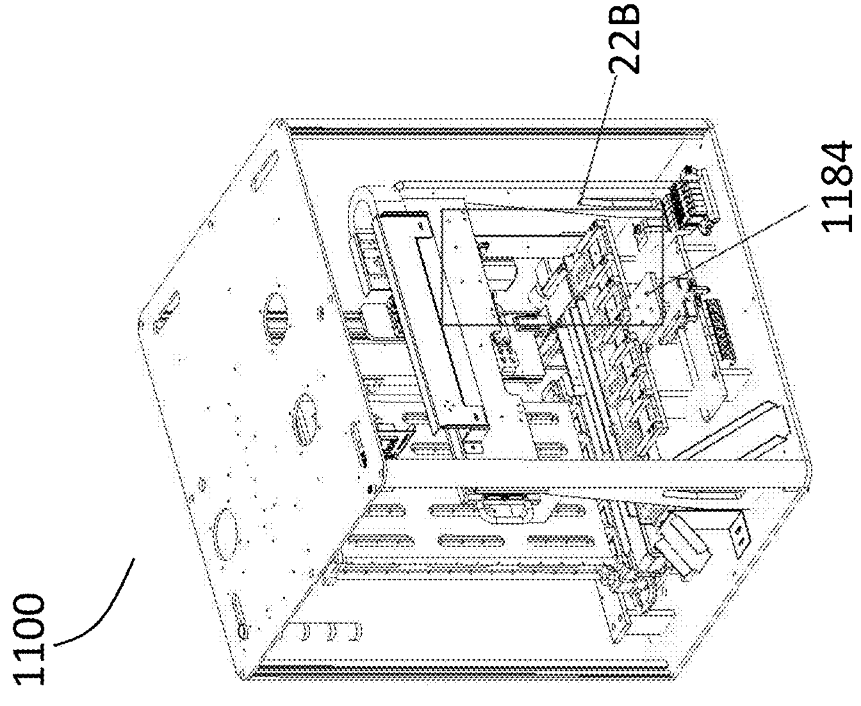
FIG. 22A is a schematic illustrating a perspective side view of the system of FIG. 15
Figure 23B:
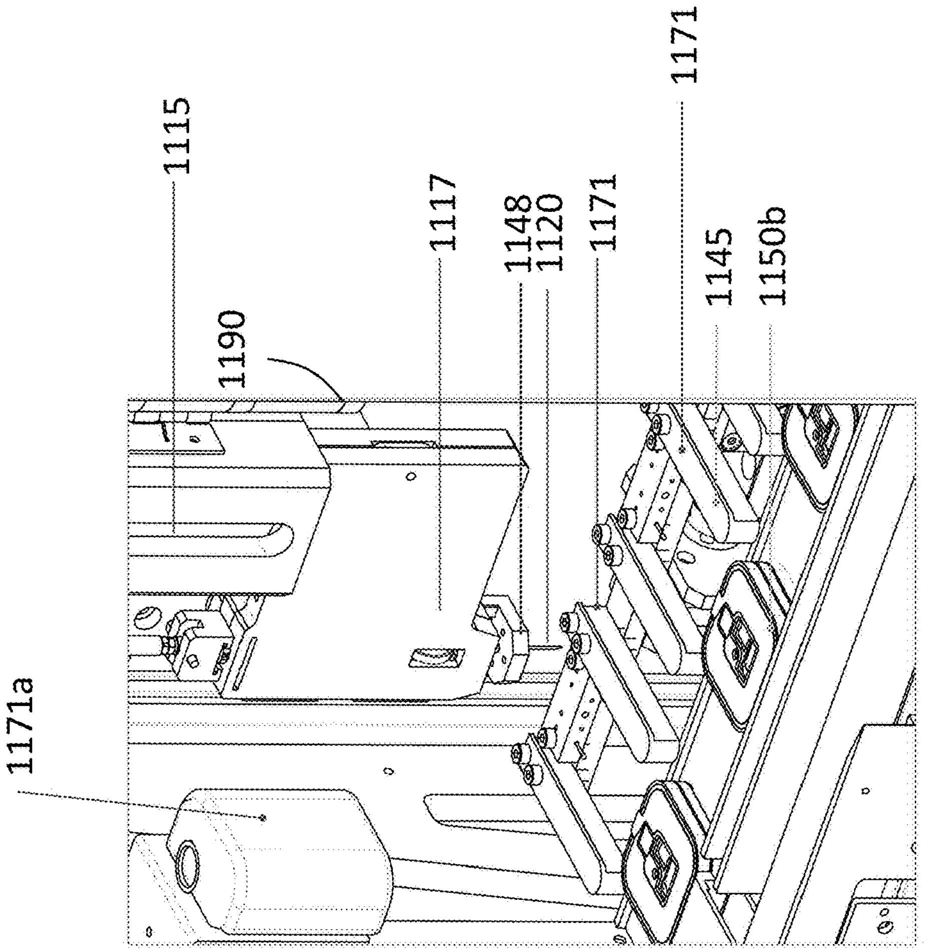
FIG. 23B is an enlarged view of a portion of FIG. 23A to show a reading station and a filling station, according to an embodiment.
Figure 23A:
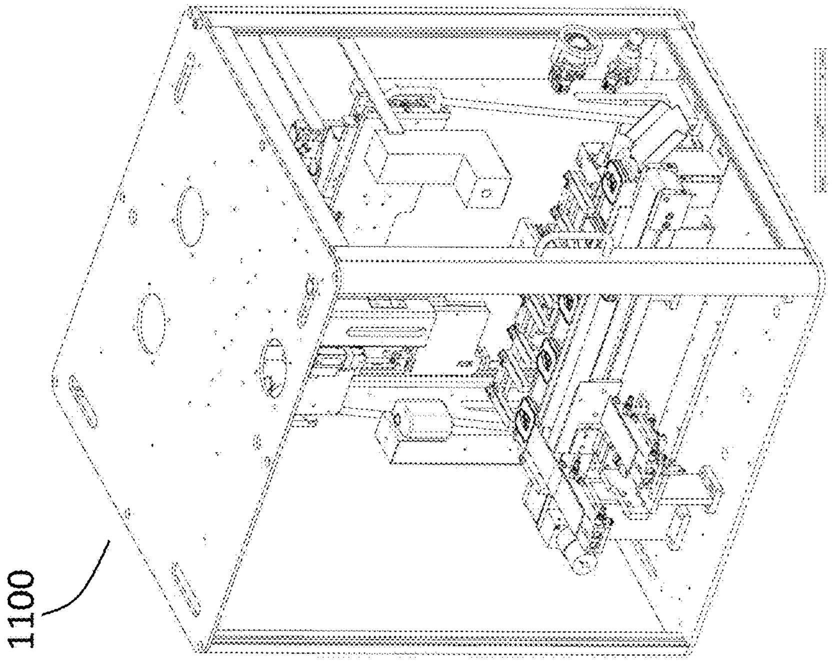
FIG. 23A is a schematic illustrating a perspective side view of the system of FIG. 15, with the magazine removed.

In some embodiments, the platform 1177 of the system 1100 can be configured to include each of the one or more stations of the system 1100 shown in FIG. 15. In some embodiments, the system 1100 can include a reading station 1171 (also referred to as a reading assembly or an identifier reading assembly), a filling station 1172 (also referred to as a filling assembly), a marking station 1173 (also referred to as a marking assembly), a weighing station 1174 (also referred to as a weighing assembly), and/or a sorting station 1175 (also referred to as a weighing assembly), as shown in a top view in FIG. 20 and in perspective side view in FIG. 21.

The reading station 1171, for example shown in FIGS. 20, 21, 22A and 22B, 23A, 23B, can include a reading assembly (also referred to as an identifier reading assembly) that includes a reading device 1171*a* that can be configured to read an identifier associated with a package. The reading device 1171*a* can be any suitable device that can read, using or based on any suitable reading technology including optical, audiological, frequency dependent, cryptographic methods dependent, wireless communication dependent (e.g., Bluetooth®) and/or the like, a identifier of any suitable type including a QR code, a bar code, a ID number label, an RF ID, an identifier read using near-field communication (NFC), and/or the like attached or associated with a package. The identifier can be associated with a package at a manufacturer of the package and the identifier can provide information related to an authenticity of the package. The reading device 1171 can send the read identifier to a processor coupled to the system 1100 where the identifier can be checked for authenticity. In some embodiments, the checking for authenticity can be done locally (i.e. by one or more processors locally coupled to the system 1100) and in some embodiments the checking can be done remotely via one or more processors remotely coupled to the system 1100 (e.g., via a cloud based connection).

Figure 24B:
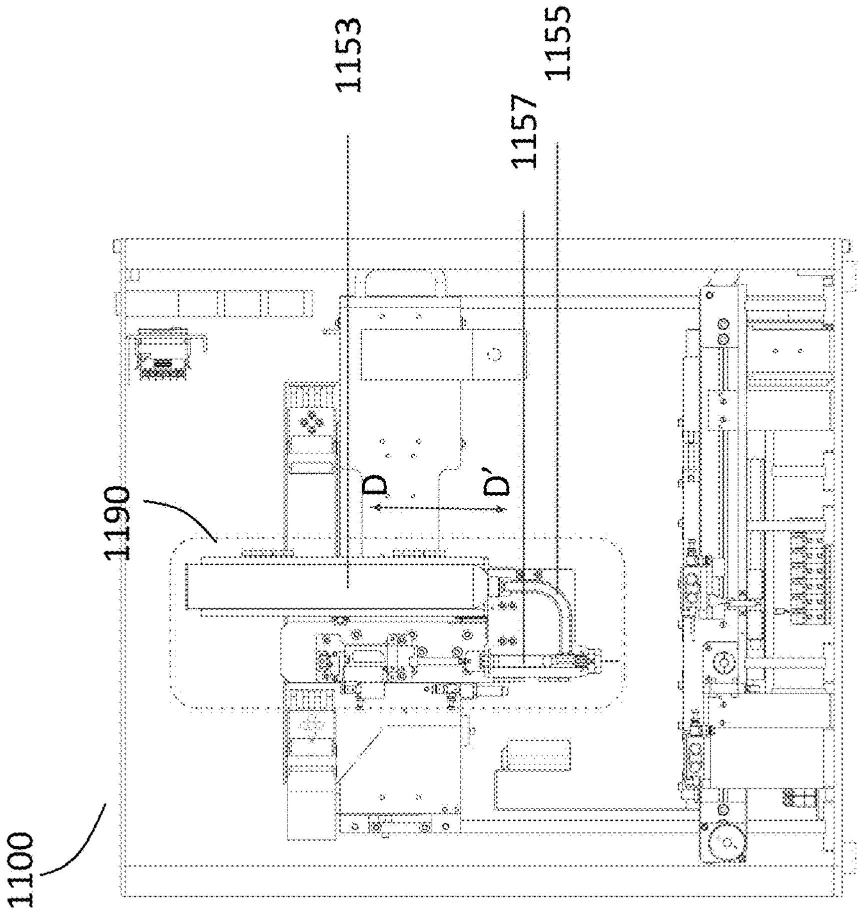
FIGS. 24A and 24B are schematics illustrating a side view of the system of FIG. 15, with the magazine removed, to show components of a filling assembly at a filling station, according to an embodiment.
Figure 24A:
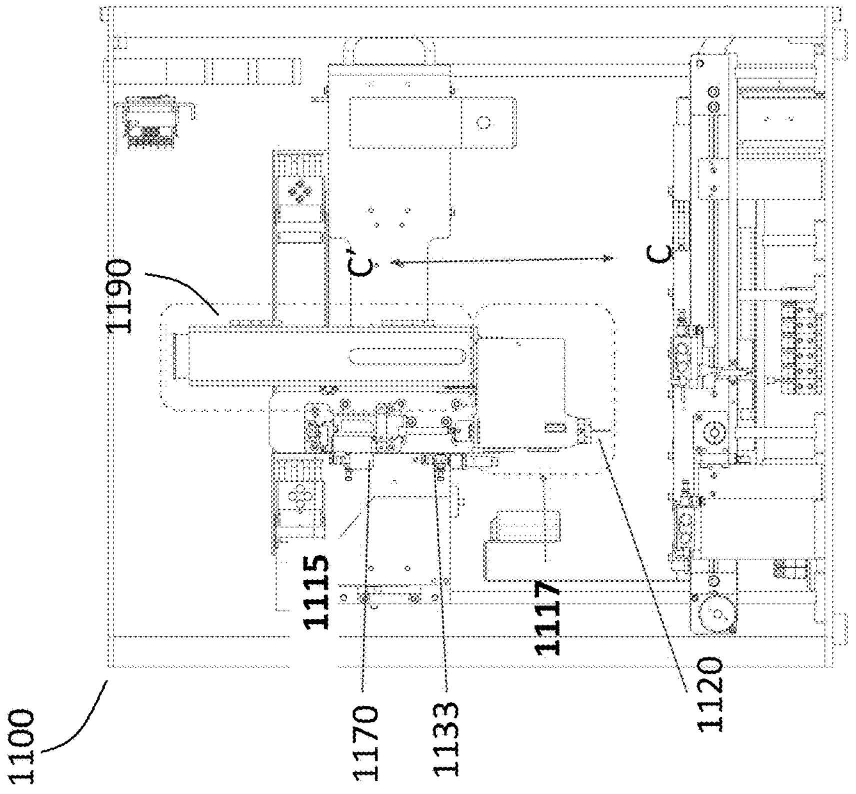

The filling station 1172 can include a filling assembly 1190 configured to fill a fillable component included in a package. The filling assembly 1190, for example shown in FIGS. 20, 21, 23A, 23B, 24A, 24B, and 25, can be substantially similar in structure and/or function to the filling assembly 1090 described previously. For example, the filling assembly 1190 can include a needle 1120, a needle holder 1163, a linear actuator 1170 upon which the filling assembly 1190 is mounted and which can be actuated to move the needle 1120 in and out of a first and/or second position, a supply reservoir 1153, a heating element 1115 to heat the consumable substance store in the supply reservoir 1153, a filling syringe 1157 including a barrel 1161 and a plunger 1162, a tube 1155 connecting the filling syringe 1157 to the supply reservoir 1153, an actuator 1133 coupled to the filling syringe 1157 such that activating the actuator 1133 can move the plunger 1162 between a first and a second position to advance and/or retract the plunger 1162 to inject and/or dispense the contents of the barrel 1161 via the needle 1120, and so on. In some embodiments, as shown, the filling assembly 1190 can be mounted on the linear actuator 1170 such that activating the linear actuator 1170 in the direction indicated by the arrow head C in FIG. 24A can move the filling assembly 1190 from a first position, where the needle 1120 is spaced from and not in contact with a package 1150*b* held at the station 1172 on the platform 1177, to a second position where the tip of the needle 1120 is positioned within a reservoir of a fillable component included in the package 1150*b* (e.g., within a reservoir of a vaporizer or a reservoir of a vaporizer capsule) having pierced through a membrane included in the package 1150*b*. Activating the linear actuator 1170 in the direction indicated by the arrow head C' in FIGS. 21 and 24A can retract the filling assembly 1190 from the second position where the tip of the needle 1120 is positioned within a reservoir of a fillable component included in the package 1050*b*, to the first position, where the needle 1120 is away and not in contact with the package 1150*b*. The linear actuator 1170 can be any suitable actuator using any suitable means of activation (e.g., servomotors, pneumatic actuators, etc.).

Figure 25:
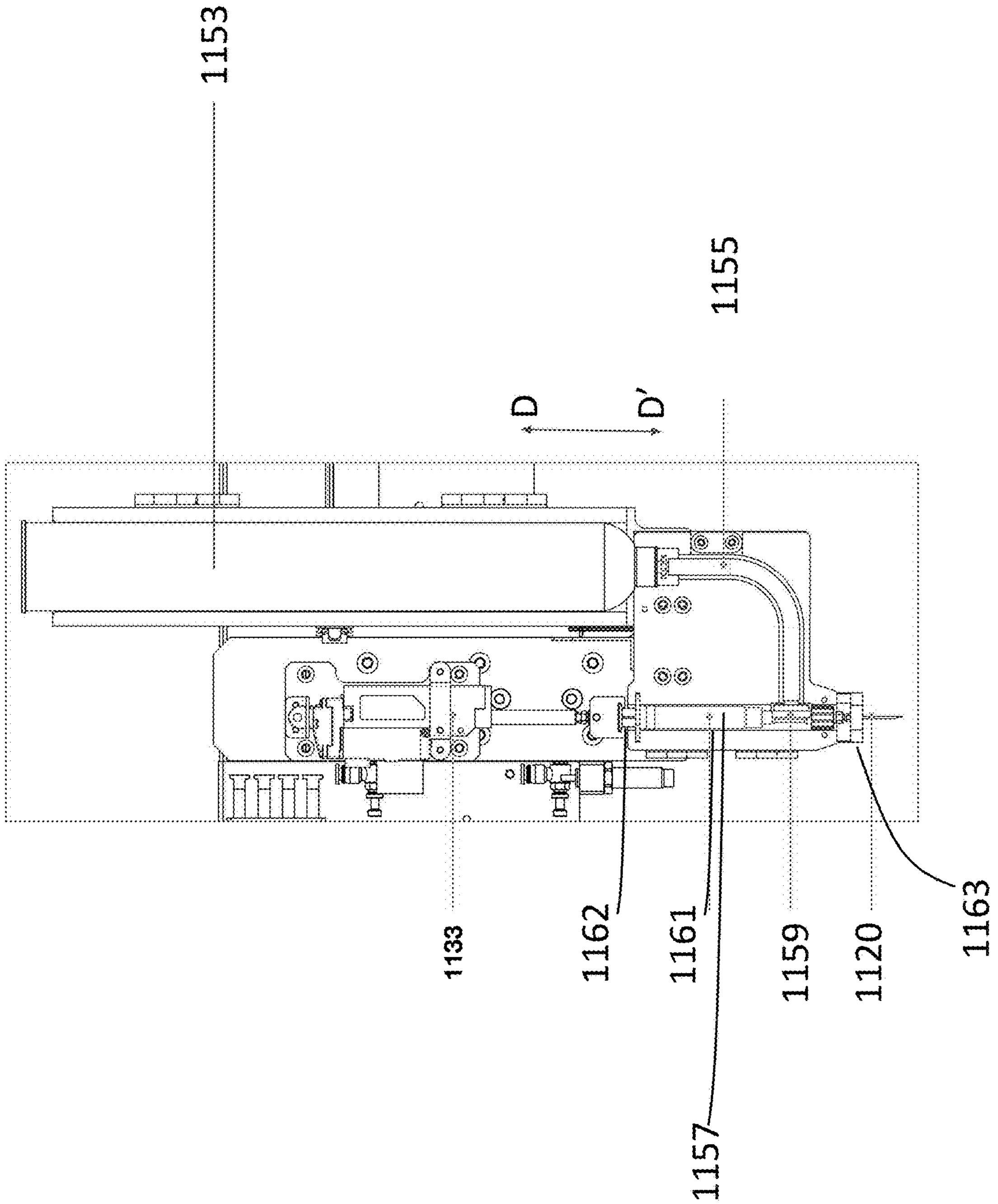
FIG. 25 is a schematic of a filling assembly according to an embodiment.

As shown in for example FIG. 25, the filling system 1190 includes a supply reservoir 1153 (also referred to as a barrel, or a syringe head, herein), a filling syringe 1157, a tube 1155 fluidically coupling an interior of the supply reservoir with an interior of the filling syringe, and a needle 1120 in fluidic communication with the filling syringe 1157 held by a needle holder 1163. In some embodiments, the filling assembly 1190 includes one or more check valves configured to gate the flow and/or a direction of flow of consumable substance from the supply reservoir 1153 to the filling syringe 1157 via the tube 1155, and/or to gate the flow and/or direction of flow of consumable substance between the filling syringe 1157 to the needle 1120. The supply reservoir 1153 can be of any suitable capacity (e.g., 350 cc).

The first heating element 1115 can be configured to heat the consumable substance stored in the supply reservoir 1153 to a predetermined first temperature. The heating element 1115 can be or include any suitable heating device configured to heat a fluid to a predefined temperature. For example, the heating element 1115 can include an aluminum heating block electrically coupled (e.g., wired) to a resistance coil. The coil and/or the heating block can be supplied with a current sufficient to raise the temperature of the heating block to a predefined level. In some embodiments, the heating element 1115 can be included in or form an enclosure surrounding at least a portion of the supply reservoir 1153 such that the consumable substance stored in the supply reservoir 1153 can be heated by the heating element 1115. The filling assembly 1190, in some embodiments, further includes a second heating element 1117 configured to heat, to a predetermined second temperature, the consumable substance drawn into the barrel 1161 of the filling syringe 1157. The second heating element 1117 can be substantially similar to the first heating element 1115. For example, the second heating element 1117 can be any suitable heating device configured to heat a fluid to a predefined temperature. In some embodiments, the heating element 1117 can be included in or form an enclosure surrounding at least a portion of the barrel 1161 such that the consumable substance stored in the barrel 1161 can be heated by the heating element 1117. In some instances, the first and/or second predetermined temperatures can be based on one or more temperature sensitive properties of the consumable substances (e.g., viscosity, flow rate, etc.).

In some embodiments, the filling syringe 1157 includes a tip (not shown) fluidically coupled to the needle 1120, a barrel 1161 and a plunger 1162 insertable into the interior of the barrel. As shown in FIG. 25, the plunger 1162 is coupled to the linear actuator 1133 which is configured such that activating the linear actuator 1133 in the direction indicated by the arrow head D in FIGS. 24B and 25 can draw and/or retract the plunger 1162 from a first position, where the tip of the plunger 1162 is closer to the tip of the filling syringe 1157, to a second position where the tip of the plunger is farther away from the tip of the filling syringe 1157. Activating the linear actuator 1133 in the direction indicated by the arrow head D' can advance the plunger 1162 from the second position where the tip of the plunger is farther away from the tip of the filling syringe 1157, to the first position, where the tip of the plunger 1162 is closer to the tip of the filling syringe 1157. The linear actuator 1133 can be any suitable actuator using any suitable means of activation (e.g., servomotors, pneumatic actuators, etc.). The linear actuator 1133 and the plunger 1062 can be configured such that movement of the plunger 1162 from the first position to the second position in the direction D can induce a drop in pressure in the interior of the barrel 1161 that in fluidic communication with the supply reservoir 1153 via the tube 1155. The drop in pressure can induce a pressure differential that causes a flow of consumable substance from the supply reservoir 1153 to the interior of the barrel 1161 of the filling syringe 1057 via the tube 1055 and via the check valve 1159. During such a flow one or more check valve may be included in the filling assembly 1190 to gate the flow direction (e.g., one or more check valves configured to prevent back flow into the supply reservoir 1153, to prevent flow into the needle 1120, etc.). As shown, in some embodiments, the filling assembly 1190 can include a check valve 1159 (which can be a first check valve) to gate the direction of flow of fluids between the tube 1155 and the filling syringe.

The plunger 1162 engages with the interior walls of the barrel 1161 to form a fluid-tight seal. The linear actuator 1133 and the plunger 1162 can be further configured such that movement of the plunger 1162 from the second position to the first position in the direction D' can induce a positive increase in pressure in the interior of the barrel 1161 that is in fluidic communication with a lumen of the needle 1120 via the tip of the filling syringe (not shown). The increase in pressure within the barrel 1161 can induce a pressure differential that causes an extrusion and/or a flow of consumable substance from the barrel 1161 to the tip of the needle and therefrom (e.g., into the reservoir of a fillable component of a package) via the needle 1120 and via the check valve 1159 (which can be a second check valve). During the flow of consumable substance from the interior of the barrel 1161 to the needle 1120, the check valve 1159 can prevent back flow into the tube 1155.

In some embodiments, the filling syringe 1157 in combination with the linear actuator 1133 can be configured to draw a predefined quantity of consumable substance (e.g., 100 mg, 250 mg, 500 mg, 1000 mg, and/or the like, including any increments within the range of values). In some embodiments, the linear actuator 1133 and the plunger 1162 can be configured to draw the predefined quantity of consumable substance and deliver the predefined quantity via the lumen of the needle 1120. For example, linear actuator 1133 can be configured to translate the plunger 1162 by a specified distance to achieve a specific pressure differential and/or a specific volume with a lower pressure defined within the barrel 1161 of the filling syringe 1157, based on the predefined quantity of consumable substance to be drawn and/or delivered.

The needle 1120 can be substantially similar to filling needle 220, 920, and/or 1020 described previously). The needle 1120 can be moved (e.g., along with the filling assembly 1190) between the first position to the second positon by activating the linear actuator 1170 in the direction indicated by the arrow head C to reach the package 1050 for filling/refilling the package 1150 via a filling aperture 1154 on the package 1150*b*. In some embodiments, the linear actuator 1170 can be configured to move the filling assembly 1190 up and down relative to the package 1150. For example, the linear actuator 1170 can move the syringe 1057, supply reservoir 1153, and needle 1120 up and down simultaneously (e.g., due to the barrel 1161, supply reservoir 1153, and needle 1120 being coupled and stationary relative to one another). In some embodiments, an actuator can be configured to control the movement of the needle 1120 independently of a remaining portion of the filling assembly (e.g., independently of the syringe 1057 and/or supply reservoir 1153). In some embodiments, the filling aperture 1154 of a fillable component of a package 1150*b* is covered and/or sealed by a resealable membrane (e.g., an elastomeric membrane such as a silicone membrane) before filling/refilling, and the needle 1120 and/or the movement of the actuator 1170 can be configured to pierce this membrane without damaging the membrane to reach the reservoir of the fillable component included within the package 1150*b*.

Figure 26:
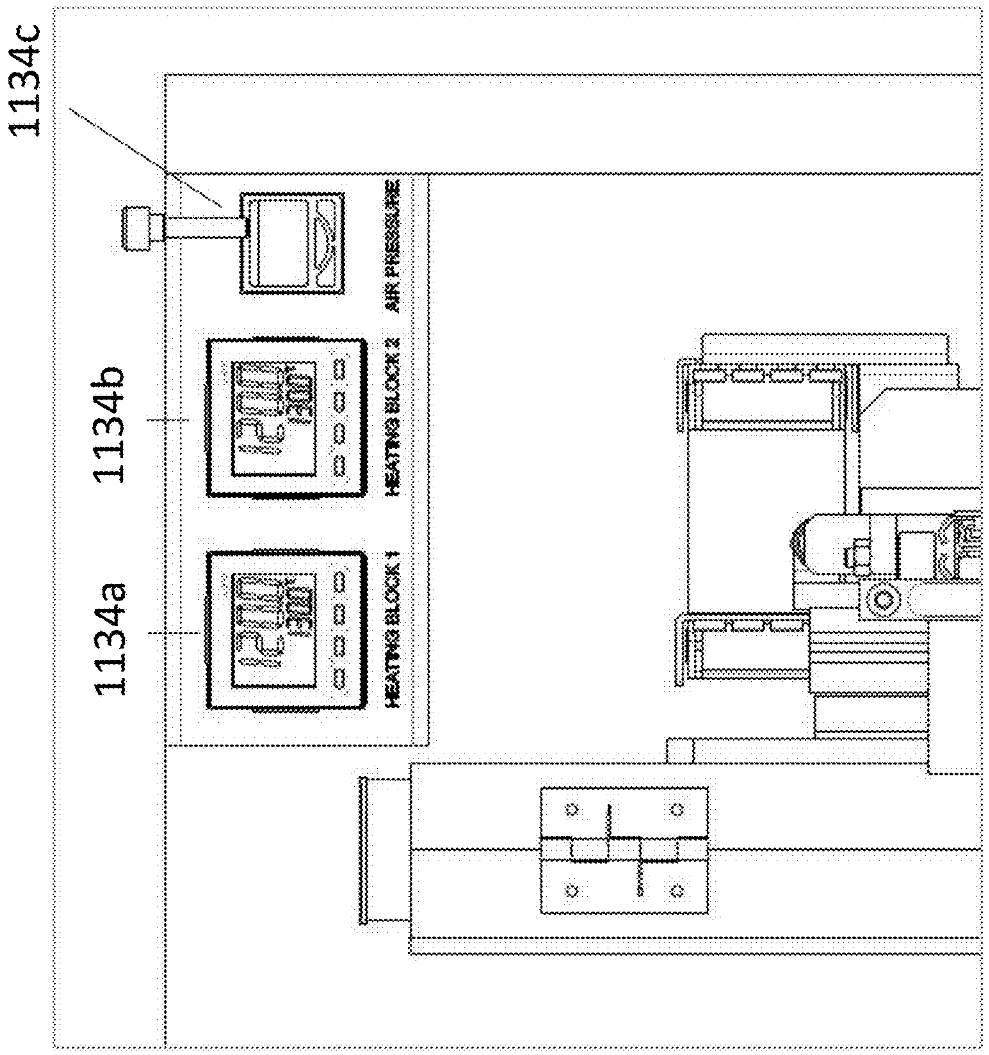
FIG. 26 is a schematic of a front panel of the system of FIG. 15 according to an embodiment.

In some embodiments, the system 1100 can include temperature control panels 1134*a* and 1134*b* shown in FIG. 26, and in some embodiments, include an air pressure monitor and/or regulator 1134*c*. The temperature control panels can be configured to adjust and/or set predetermined temperature settings for the first and/or the second heating elements 1117 and 1115.

Figure 27B:
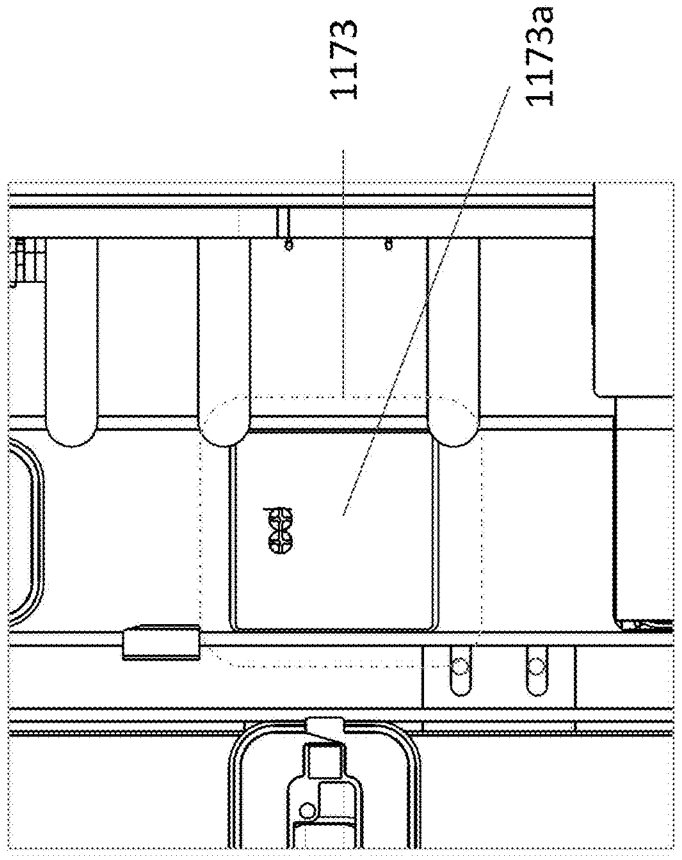
FIG. 27B is an enlarged view of the portion 27B outlined in FIG. 27A, to show a weighing station, according to an embodiment.
Figure 27A:
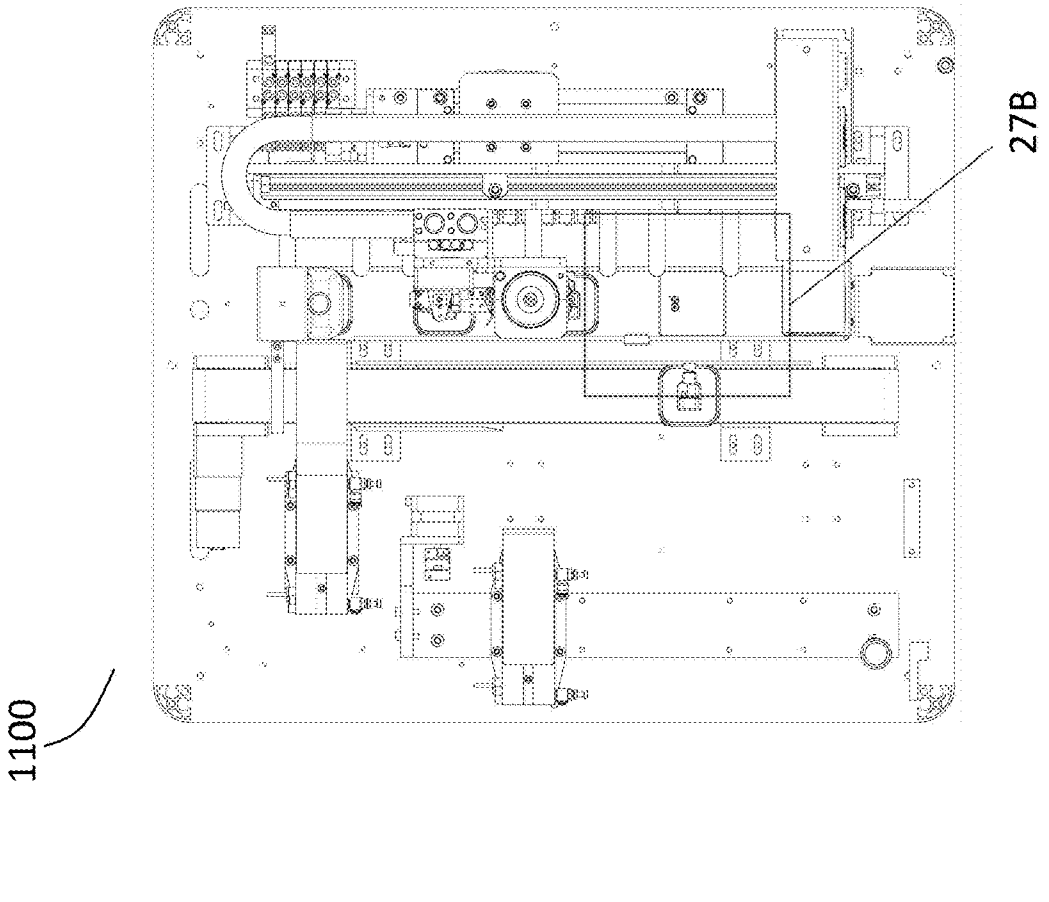
FIG. 27A is a schematic illustrating a top view of the system of FIG. 15.
Figure 28B:
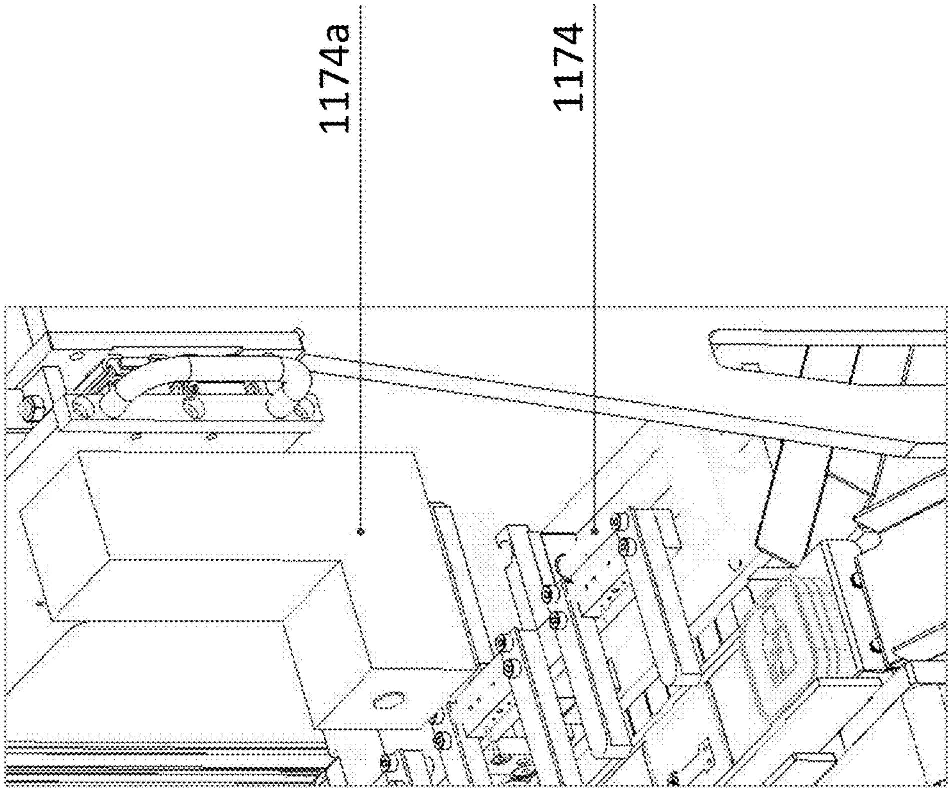
FIG. 28B is an enlarged view of the portion 28B outlined in FIG. 28A to show a marking station, according to an embodiment.
Figure 28A:
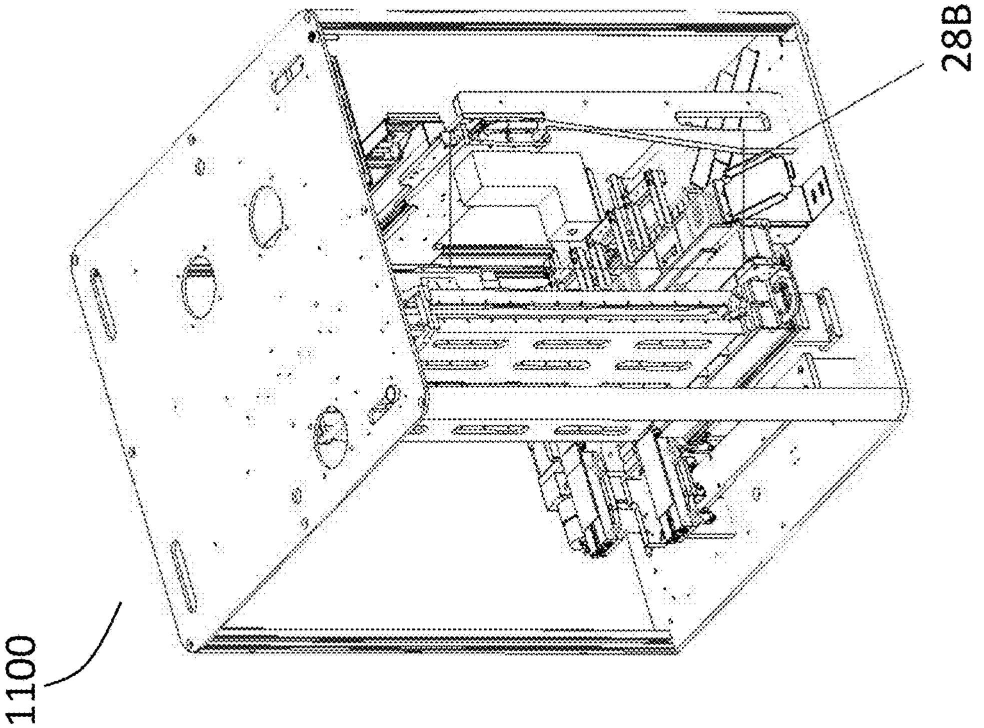
FIG. 28A is a schematic illustrating a perspective front view of the system of FIG. 15.

The system 1100 includes a weighing station 1173 shown in FIGS. 27A and 27B, that a package is passed through after filling, in some instances. The movable arm 1184 can move and position a package 1150*c* at the weighing station 1173. The weighing station 1173 can include a load cell 1173*a* configured to precisely weigh the package 1150*c*. In some embodiments, the weighing station 1173 can be configured to determine using the load cell 1173*a* a weight of the package 1150*c* after the package 1150*c* has been filled with a quantity of consumable substance. Based on the weight of the package 1150*c* measured by the load cell, the weighing station 1173 (and/or a controller of the system 1100 in communication with the weighing station 1173) can determine whether the volume of the quantity of consumable substance supplied to the package 1150*c* during the filling stage is within a predetermined range. For example, the weighing station 1173 can be configured to determine whether the weight of the package 1150*c* is within a predetermined range or above a threshold weight. If so, the weighing station 1173 can determine that the package 1150*c* passes the quality check. If the weight of the package 1150*c* is outside of a predetermined range or below a threshold weight, the weighing station 1173 can determine that the package 1150*c* fails the quality check.

In some embodiments, the system 1100 includes a marking station 1174 that can include a marking device 1174*a* (for example, a laser marker). Marking can be carried out using any suitable technology such as laser etching or the like. The marking device 1174*a* can be configured to mark the package 1150*d* with a second identifier. The second identifier can be, for example, a branding mark and/or an identification associated with the substance filled in the reservoir of the package. In some embodiments, the second identifier can be used to validate and/or authenticate the package before use by a user. In some embodiments, a package 1150 can be marked by the marking device 1174*a* after being filled and weighed. In some embodiments, a package 1150 can be marked by the marking device 1174*a* after being filled and prior to being weighed. In some embodiments, a package 1150 can be marked by the marking device 1174*a* prior to being filled. In some embodiments, the marking station 1184 can be optional and not included in the system 1100.

The functions of reading at the reading station 1171, filling at the filling station 1172, weighing at the weighing station 1173 and marking at the marking station 1174 are described as being performed on a set of packages in an example sequence herein. In some embodiments, the operational steps described with respect to the stations (e.g., reading station 1171, filling station 1172, weighing station 1173, and/or marking station 1174) can be performed in any suitable order sequentially or simultaneously. In some embodiments, any or all of the different functions or steps can be performed simultaneously or in parallel on different packages. For example, a package 1150 can be moved (e.g., via the holder 1145 described below and/or a conveyor assembly) from one station to the next station for the operation of each station relative to the package 1150. While a first package 1150 is being acted upon by a first station (e.g., the reading station 1171), a second package 1150 can be acted upon by a second station (e.g., the filling station) based, at least in part, on the results of a previous station relative to the second package 1150 (e.g., based on the results of optically reading an identifier of the second package 1150).

Figure 29B:
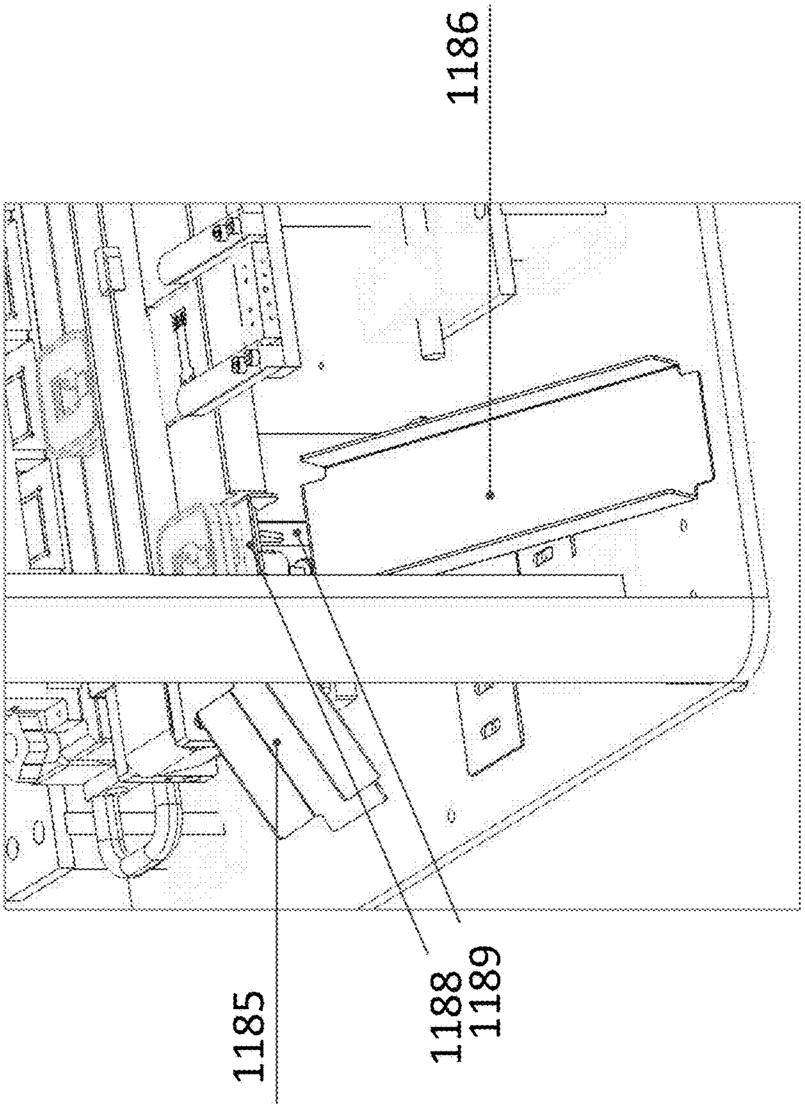
FIG. 29B is an enlarged view of the portion 29B outlined in FIG. 29A, to show a sorting station, according to an embodiment.
Figure 29A:
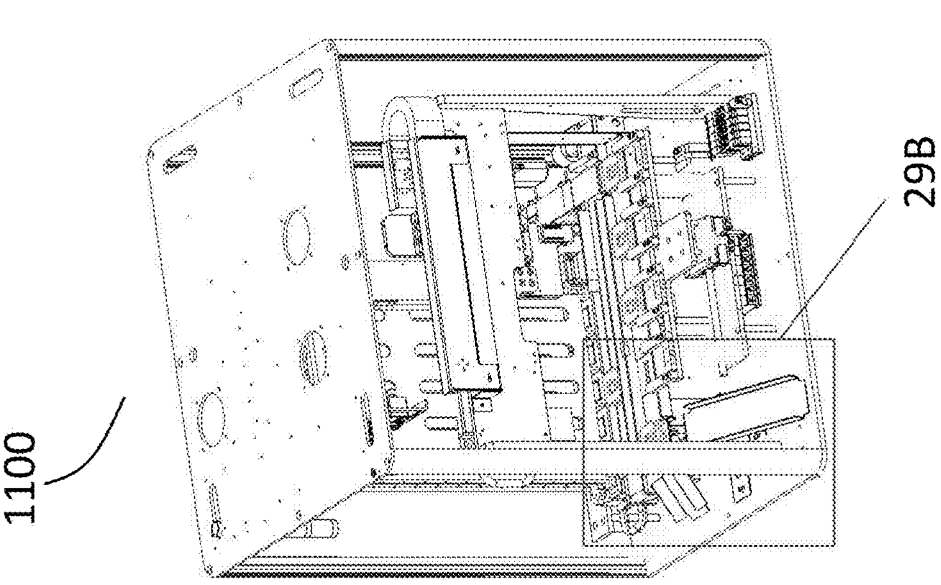
FIG. 29A is a schematic illustrating a perspective side view of the system of FIG. 15.

The system 1100 includes the sorting station 1175 shown in FIGS. 29A and 29B, where the station can be configured to determine if one or more quality control properties of the filled and marked package is satisfactory and, based on the determination, sort the packages into a fail set and a pass set. If the package 1150 is considered satisfactory (e.g., having a weight measured by the load cell 1173*a* within a threshold range), the package 1150 can be moved to a pass chute 1185 (e.g., via a holder 1145 translating toward the pass chute 1185 and pushing the package 1150 into the pass chute 1185). If the package 1150 is considered to have failed the quality check (e.g., having a weight measured by the load cell 1173*a* outside of a threshold range), however the package can be moved to the fail chute 1186. For example, a platform 1188 disposed adjacent an end of the platform 1177 can be mounted on an actuator 1189 (e.g., a goniometer, a tilt stage, and/or the like) configured to tilt the platform 1188 (e.g., tilt in one or more axes) such that any package 1150 disposed on the platform 1177 during the tilt will slide down the fail chute 1186. Containers can be disposed underneath the end of each of the pass chute 1185 and the fail chute 1186 to collects packages 1150 that have traveled down each of the chutes.

In some embodiments, the system 1100 (e.g., the reading station 1171 in addition or alternatively to an optical scanner, the filling station 1172, or a separate portion of the system) can include a chip connector (not shown) configured to access a tracking component (e.g., a tracking chip) which may be or include an integrated circuit (e.g., Application-Specific Integrated Circuits (ASICs)) of a fillable component disposed within the package 1150. The tracking component can include, for example, a memory and/or a processor and can include, for example, two chip connectors configured to be coupled to (e.g., via contact) by a device configured to read and/or write to the tracking component. For example, the chip connector can include an actuator configured to actuate the chip connector such that the chip connector advances through an opening in the package 1150 to contact the chip connectors. The opening can be an opening aligned with the chip connectors and can be a separate opening from an opening in the package 1150 aligned for access of the needle 1120 with the membrane of the fillable component. The chip connector can be coupled to a processor configured to read the tracking component via the chip connector to determine information related to, for example, the authenticity of the pod or filling information. In some embodiments, the processor can be configured to write information to the tracking component via the chip connector related to operation of the fillable component, the programming or formatting of the tracking component, and/or the consumable substance delivered to the reservoir of the fillable component. Such reading and writing can occur before, during, or after filling the reservoir of the fillable component (e.g., while the fillable component is being filled at the filling station 1172 or when at any of the other stations described herein). In some embodiments, rather than including a chip connector, the fillable component can be configured to communicate wirelessly (i.e., without requiring a physical connection) with a processor of the system 1100 such that the information can be transmitted from the fillable component to the processor and/or vice versa. In some embodiments, the system 1100 can be configured to attach a tracking component, such as an integrated circuit (IC) or a wireless tag (e.g., RFID) to the fillable component such that the tracking component can be read by a device of a user (e.g., a vaporizer pen or another system). In some embodiments, a tracking component can be coupled to and/or read from the package 1150, rather than the fillable component disposed within or coupled to the package 1150.

Figure 33:
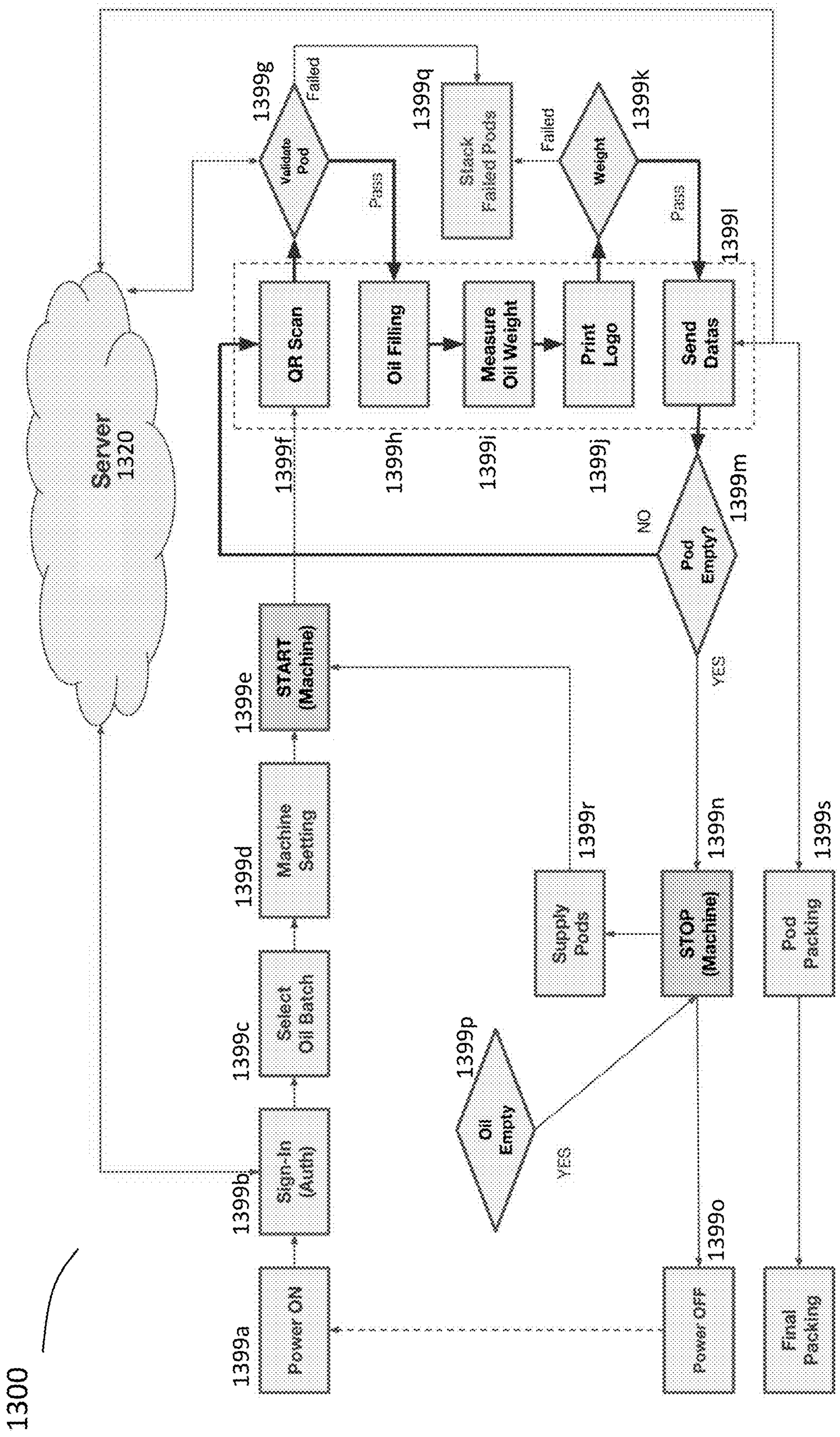
FIG. 33 is a flowchart illustrating a method of operating a system, such as any of the systems described herein, according to an embodiment.

FIG. 33 is a flowchart of an example process of operation of a system 1300 for filling fillable components disposed in a set of packages with a consumable substance, as described herein, according to an embodiment. The system can be the same or similar in structure and/or function to any of the systems described herein, such as the system 900, the system 1000, and/or the system 1100. Additionally, portions of the flowchart of FIG. 33 can be used for the operation of any suitable system such as systems 900, 1000 and/or 1100. The packages can be the same or similar in structure and/or function to any of the packages described herein, such as the packages 1150 or 1209.

In some embodiments, the system 1300 for a set of fillable components with a consumable substance can include a memory, processor, and a transmitter such as a transceiver. For example, the system 1300 can include a control assembly (not shown) including a memory, a processor, and a transceiver and can be substantially similar in structure and/or function to the filler station 610 described previously. The system 1300 can be configured such that it can be powered on, at 1399*a*. An authorized user can sign in, at 1399*b*, before use. For example, an authorized user can be required to complete an authentication process at 1399*b*. In some embodiments, the system 1300 can receive an input from a user (e.g., a user ID and/or a password) and send the information to a server 1320, which can be the same or similar in structure and/or function to the command center 620 described previously. The system 1300 can receive information (e.g., a machine ID, a list of batch numbers associated with a list of consumable substances, a logo information of a producer of the consumable substance, etc.) from the server 1320 that can be used to authenticate the user and/or the machine and/or run for use of the system 1300 to fill a set of fillable components with a consumable substance. The processor included in the system 1300 can be programmed to control the functioning of the system 1300 by controlling the components of the system 1300.

A batch of consumable substance (e.g., an oil and/or carrier material) can be selected at 1399*c*. One or more parameters of the system 1300 can be set at 1399*d*. The system 1300 can be supplied with packages including fillable components (also referred to herein as "pods") in an empty state at 1399*r*. A supply reservoir (e.g., supply reservoir 1153) of the system 1300 can be loaded with a specified batch of consumable substance based on (e.g., corresponding to) the selection of the batch of consumable substance before the system 1300 is started or initiated at 1399*e* via the processor to implement a set of instructions to run the system 1300. In some implementations, the system 1300 can be initiated via the processor to carry out one or more test runs including filling of a "dummy" fillable component in a package or another container with oil (e.g., for priming purposes) every time a new syringe is installed and discarding the "dummy" fillable component or container. In some embodiments, a test or priming run can be carried out at every instance of replacement of one or more components of the system 1300 (e.g., after replacement of a syringe, a reservoir, an actuator, and/or the like). In some instances, the system 1300 can be programmed to perform a test run to test one or more functions of the system 1300. For example, a test run can be carried out to test marking (e.g., printing of a logo, etc.). In some implementations, the system 1300 can be supplied and loaded with a set of packages in a magazine (e.g., the magazine 1141) before or after being powered on. The system 1300 can be powered on, authenticated, and one or more parameters of the system 1300 can be set (e.g., via a control panel and/or display) before initiation of the actuators of the system 1300 at 1399*e*.

In use, the system 1300 can be initiated such that packages from a set of packages are sequentially and individually ejected from a magazine (e.g., magazine 1141) by a first actuator (e.g., first actuator 1181), conveyed via a conveyor belt (e.g., conveyor belt 1176), and transferred to a platform (e.g., platform 1177) by a second actuator (e.g., second actuator 1182). Each package is then advanced through each station of the system 1300 (which may be similar to stations 1171, 1172, 1173, 1174 and 1175) (e.g., by the movement of a holder assembly (e.g., the holder 1145) including a movable arm (e.g., the movable arm 1184)). The system 1300 can be programmatically configured such that packages can be moved through any suitable set of stations in any suitable order. For example, in some instances, a package can be advanced to a reading station (e.g., the reading station 1171) where an identifier (e.g., a QR code) associated with the package (e.g., on a surface of the package or on a surface of the fillable component disposed in the package and viewable through an opening in the package) can be scanned at 1399*f*. The system 1300 (e.g., via the control assembly) can send information associated with the identifier to a server 1320 along with information associated with the system 1300 and/or oil to be delivered to the fillable component (e.g., a machine identifier associated with the system 1300, a serial number associated with the identifier read from the fillable component, etc., another identification of the fillable component based on the identifier).

In some instances, the system 1300 (e.g., a control assembly of the system 1300) can receive information from the server 1320 via the transceiver and perform a validation at 1399*g* of the fillable component based on the identifier. For example, the system 1300 can initiate a look up (locally or via the server) for whether the fillable component is from a known or trusted source based on the identifier. In some instances, if the validation is failed, the package can be advanced directly to a sorting station (e.g., the sorting station 1175) such that the invalidated fillable component can be ejected via a fail chute (e.g., the fail chute 1186) into a container of failed packages at 1399*q*. For example, the control assembly of the system 1300 can instruct intermediate stations through which the package may pass on the way to sorting station (e.g., the stations 1172, 1173, and/or 1174) to skip their respective functions while the package is disposed at each respective intermediate station. In instances where the package is successfully validated, the package can be advanced to a filling station (e.g., filling station 1172) and at 1399*h* filled with a specified quantity of the consumable substance based on a preset parameter of the system 1300. The consumable substance can be delivered to the fillable component of the package at a preset temperature (e.g., set during the initial stages of interaction with a control panel of the system 1300 or by the server 1320 after selecting an oil batch at 1399*c*). The package can then be advanced to a weighing station (e.g. the weighing station 1173) at 1399*i*, weighed (e.g., by a load cell), and then advanced to a marking station and/or marking assembly (e.g., marking station 1174) at 1399*j* where a second identifier (e.g., a logo, an ID, etc.) can be marked on the package and/or on the fillable component within the package.

In some instances, the system 1300 can evaluate the measured weight at 1399*k*, and if the measured weight of the package is not satisfactory (e.g., outside of a threshold weight range or below a threshold value), the package can be advanced to the sorting station and, at 1399*q*, to the fail chute therefrom. If the weight is considered satisfactory, for example based on meeting a threshold weight for the specified consumable substance, the package can be advanced at 13991 to the pass chute at the sorting station and the system 1300 can send additional data to a server. In some embodiments, the marking station engages with each package prior to the weighing station. In some embodiments, the weighing station can weigh each package prior to the package being advanced to the marking station.

In some instances, the system 1300, at 13991, can communicate with the server 1320 via the transceiver and send additional information associated with filling a set of fillable components. For example, the system 1300 can send a machine ID associated with the system 1300, and/or a set of serial numbers or other identifying information associated with the set of fillable components and/or packages filled and passed and/or failed during a run. In some instances, the system 1300 can send information including a batch number associated with the consumable substance used to fill each fillable component of a set of fillable components, and a weight measured for each fillable component. The system 1300 can also send additional information (e.g., a time, date, place stamp, source of consumable substance, etc.) associated with the filling that can be documented by the server 1320 and linked to the set of fillable components such that the information can be retrieved at a later time point. For example, in the event of a recall of a specific consumable substance the association between the set of fillable components and the consumable substance under recall can be used to trace the fillable components that may have to be recalled and/or locked from further use.

In some instances, the system 1300 can evaluate at 1399*m* if a magazine is empty of packages and actuate the ejection of another package from the pod only if the magazine is loaded with at least one package. In instances where the system 1300 determines the package to be empty the system 1300 can instruct the process to terminate and the system to be stopped at 1399*n* or power off the system 1300 at 1399*o*. The system 1300 can also evaluate if the supply reservoir 1353 is empty at 1399*p* and if so stop the system 1300 at 1399*n* or power off the system 1300 at 1399*o*.

Figure 30:
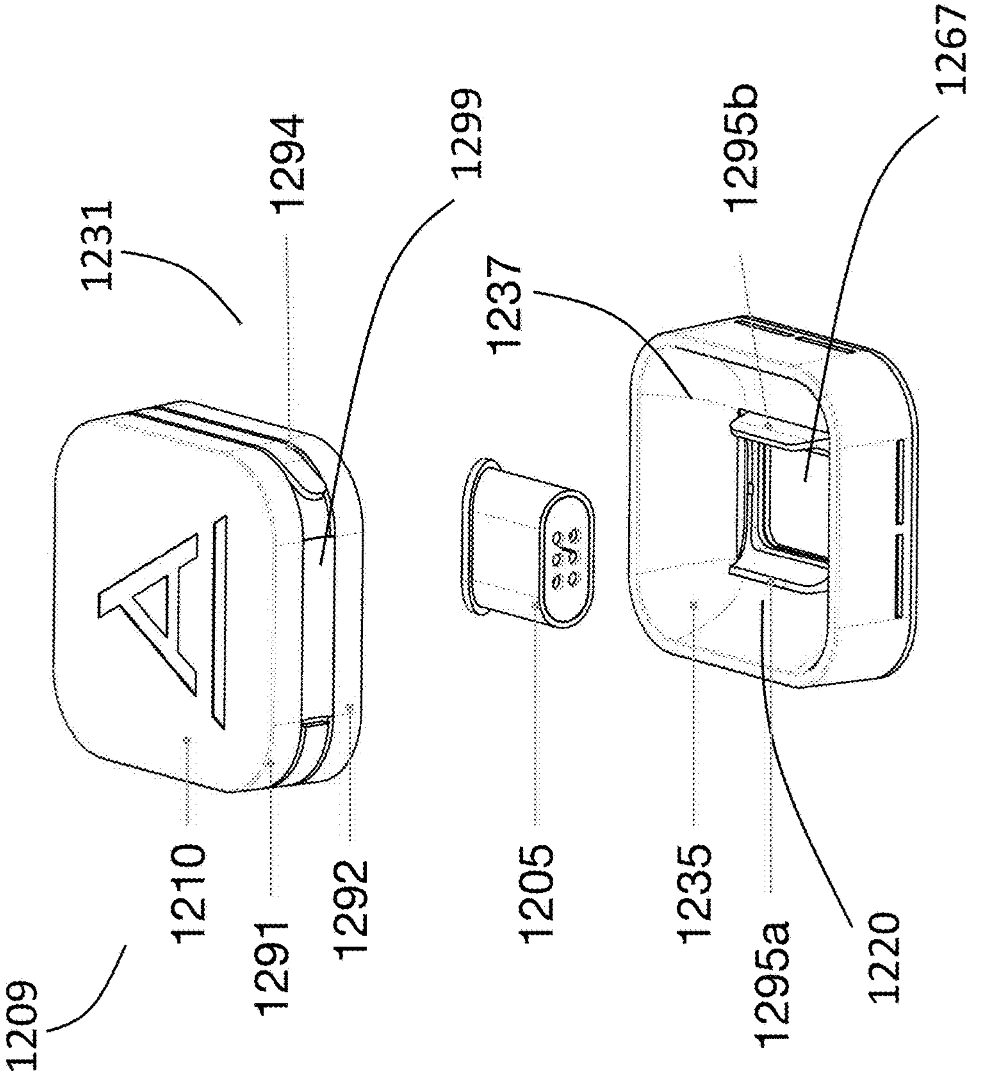
FIG. 30 is a schematic of an exploded view of a package including a fillable component and a housing with a mount configured for securing the fillable component, according to an embodiment.
Figure 32:
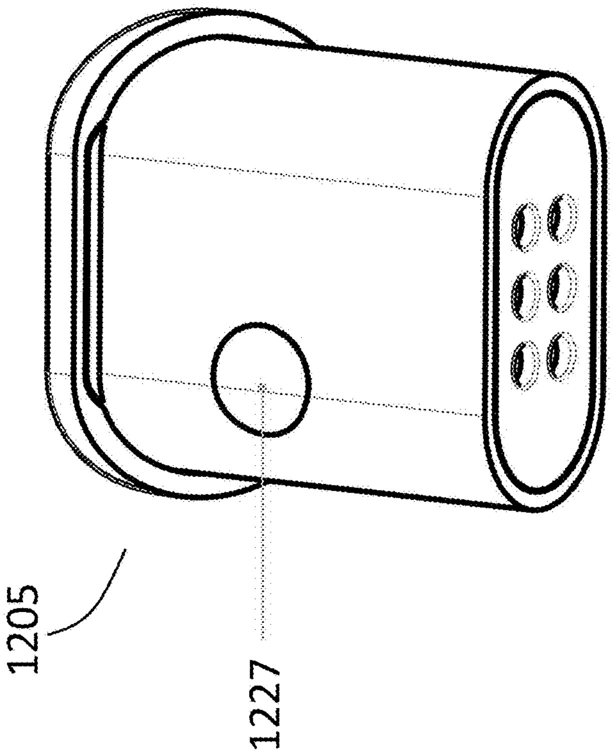
FIG. 32 is a perspective side view of a fillable component to be included in the package of FIG. 31, illustrating a filling aperture included in the fillable component and covered by a membrane, according to an embodiment.
Figure 31:
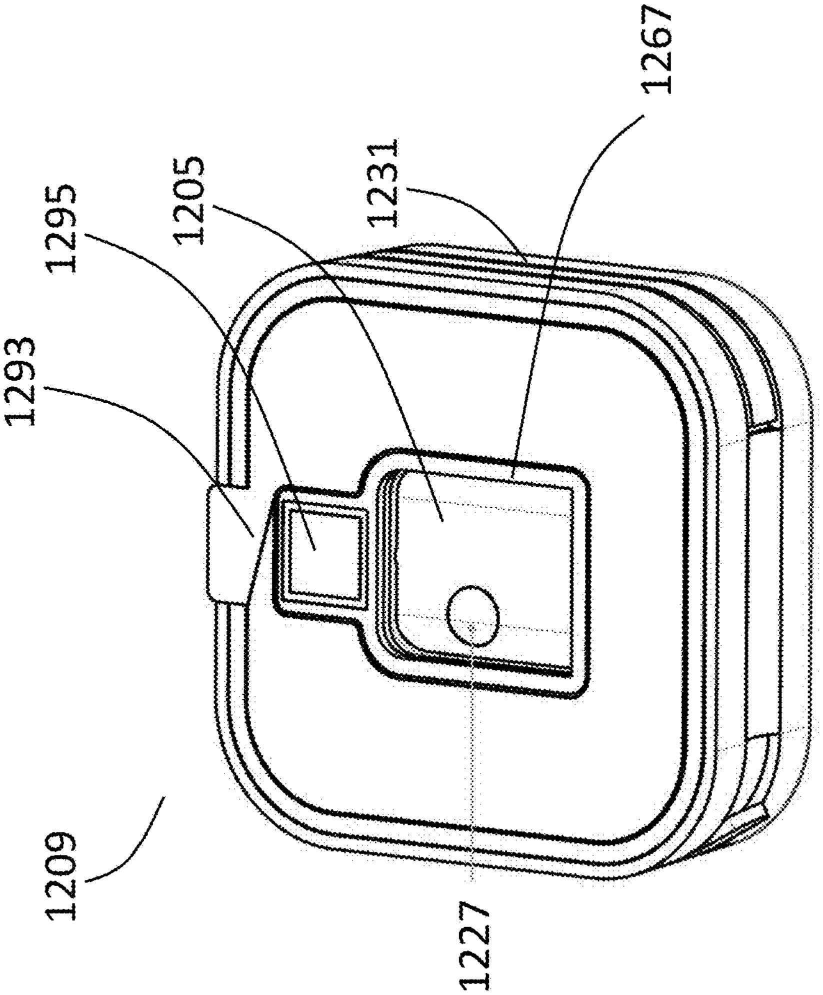
FIG. 31 is a perspective side view of the package of FIG. 30, according to an embodiment.

FIG. 30 is an exploded view of an example package or apparatus 1209 according to an embodiment. FIG. 31 is a rear view of the apparatus 1209. The package 1209 can be the same or similar in structure and/or function to any of the packages described herein, such as the packages 1150 described above. The package or apparatus 1209 can include a housing 1231 that includes a cover portion 1210 and a base portion 1235. The base portion 1235 defines an interior defining a space 1237 that can hold a fillable component 1205. The fillable component 1205 can be, for example, a cartridge assembly (also referred to as a capsule or pod) configured to be used with a vaporizer pen or device after removal from the interior 1237 of the base portion 1235. The package or apparatus 1209 can be configured such that the interior can be accessed from the outside via an opening 1267 defined in the housing 1231.

The housing 1231 includes a mount 1220 coupled to the base portion 1235. The mount 1220 is configured to hold the fillable component 1205 and maintain a position of the fillable component 1205 within the interior of the base portion 1235. For example, the mount 1220 can maintain a position of the fillable component 1205 within the interior 1237 of the base portion 1235 while the apparatus is being held on a base or platform of a filling apparatus (e.g., filling apparatus 900, 1000, and/or 1100). In some embodiments, the mount 1220 includes a first securing tab 1295*a* and a second securing tab 1295*b* configured to receive the fillable component 1205 between the first 1295*a* and second securing tab 1295*b*. In some embodiments, the first and/or the second securing tabs 1295*a* and 1295*b* are configured to have an initial configuration relative to each other to which the first and/or second securing tabs 1295*a* and 1295*b* are biased (also referred to as a contracted configuration). The securing tabs can be configured to be expanded by applying force to the first and/or the second securing tab during placement of the fillable component 1205 such that the securing tabs 1295*a* and 1295*b* can automatically revert toward the first configuration of being contracted when the force is removed. Due to being biased toward the initial configuration, the securing tabs 1295*a* and 1295*b* can retain the fillable component 1205 between the securing tabs by gripping the fillable component 1205. In some embodiments, the apparatus 1209 can include a mount that includes a first second, third and a fourth securing tabs each of the four securing tabs configured to engage with the fillable component 1205. For example, the first securing tab and the second securing tab can be disposed opposite each other and the third securing tab and the fourth securing tab can be disposed opposite each other. One or both sets of securing tabs can be biased toward a gripping configuration.

As shown in FIG. 30, the cover portion 1210 of the apparatus 1200 includes a first cover portion 1291 and a second cover portion 1292. The first cover portion 1291 can be disposed in a first position relative to the second cover portion 1292 in a closed configuration (shown in FIGS. 30 and 31) and in a second position relative to the second cover portion 1292 in an open configuration (not shown). In the closed configuration, the fillable component 1205 can be enclosed within the interior 1237 of the housing 1231. In the open configuration, the housing 1231 can be opened and the fillable component 1205 can be retrieved from the interior 1237 of the housing 1231. The cover portion 1210 can be transitioned between a closed configuration and an open configuration by separating the first cover portion 1291 from the second cover portion 1292.

As shown in FIG. 30, the first cover portion 1291 can be coupled to the second cover portion 1292 via a removable elongated tab 1294. In some embodiments, the cover portion 1210 can include a hinge 1299 coupling the first cover portion 1291 to the second cover portion 1292 in the open configuration and the closed configuration. The elongated tab 1294 and the hinge 1299 can collectively form at least a portion of a perimeter of the cover portion 1210. In some embodiments, the cover portion 1210 the elongated tab 1294 can serve as a tamper proof seal and/or a child resistant seal configured to be removed before transitioning the first cover portion 1291 from the second cover portion 1292 such that the fillable component 1205 cannot be removed from the interior 1237 of the housing unless the elongated tab 1294 is first removed. In some embodiments, the second cover portion 1292 can be is coupled to the base portion 1235 via ultrasonic welding.

The fillable component 1205 can include an resealable (e.g., elastomeric) membrane 1227. The fillable component 1205 can be coupled to the mount 1220 such that the resealable membrane 1227 is aligned with the opening 1267 in the housing 1231. The opening 1267 and the elastomeric membrane 1227 are configured to provide access for a needle (e.g., needle of a filling apparatus) to access a reservoir of the fillable component 1205. The opening 1267 can be smaller than the outer profile of the fillable component 1205 but sufficiently large such that the resealable membrane 1227 can be pierced by a needle via the opening 1267 to fill a reservoir of the fillable component 1205. In some embodiments, the resealable membrane 1227 can be made using silicone via double injection moulding methods.

In some embodiments, after the fillable component 1205 is filled via the opening and the resealable membrane 1227, the package 1209 can be coupled to a backing (not shown) having a larger outer perimeter than the outer perimeter of the package 1209. The backing can cover the opening 1267. The package 1209 can be coupled to the backing via, for example, adhesive. The backing can be formed of, for example, plastic or cardboard.

In some embodiments, the package 1209 can include an identifier 1295 on an outer surface of the package 1209. As shown in FIG. 31, the identifier 1295 can be disposed on the surface of the package 1209 defining the opening 1267. The identifier 1295 can be, for example, an identifier imprinted or marked on the package 1209 and readable by a consumable filling apparatus such as apparatus 900, 100, 110 etc.

The fillable component 1205, and any of the fillable components of any of the packages or systems described herein (e.g., vaporizer 105*a* and/or capsule 105*b*), can be any suitable fillable component configured to receive a consumable substance via a piercable membrane aligned with an opening in a package as described herein. For example, the fillable component 1205, and any of the fillable components (e.g., vaporizers, cartridge assemblies, and/or capsules) described herein can be the same or similar in structure and/or function to any of the vaporizers, cartridge assemblies, and/or capsules described in the U.S. Provisional Patent Application No. 62/886,244 filed on Aug. 13, 2019, entitled "Methods and Systems for Heating Carrier Material Using a Vaporizer," in the U.S. Provisional Patent Application No. 62/886,256 filed on Aug. 13, 2019, entitled "Methods and Systems for Delivering a Dose Using a Vaporizer," and in in the U.S. Provisional Patent Application No. 62/886,240 filed on Aug. 13, 2019, entitled "Variable-Viscosity Carrier Vaporizers with Enhanced Thermal and Hydrodynamic Properties," the disclosures of each of which are incorporated by reference herein in their entireties.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method, comprising:

reading an identifier associated with a vaporizer fillable component;

delivering a consumable substance into a reservoir of the vaporizer fillable component;

transmitting fill information, the consumable substance and the identifier of the vaporizer fillable component to a remote server; and storing the fill information, the consumable substance and the identifier of the vaporizer fillable component for traceability.

2. The method of claim 1, wherein the identifier is stored in a memory of the vaporizer fillable component.

3. The method of claim 1, wherein the identifier is disposed on an outer surface of the vaporizer fillable component.

4. The method of claim 1, wherein the identifier is disposed on an outer surface of a package, and the fillable component is disposed within the package.

5. The method of claim 1, wherein the delivering of the consumable substance includes delivering the consumable substance through a lumen of a needle.

6. The method of claim 1, wherein the delivering includes translating a filling device toward the vaporizer fillable component such that a portion of the filling device is disposed within a reservoir of the vaporizer fillable component.

7. The method of claim 1, further comprising:

determining a characteristic of the consumable substance to be delivered to the vaporizer fillable component based on the identifier, the delivering including delivering the consumable substance based on the characteristic.

8. The method of claim 7, wherein the characteristic includes a type of the consumable substance.

9. The method of claim 1, wherein the fill information includes a type of the consumable substance.

10. The method of claim 1, wherein the determining whether the vaporizer fillable component is valid or invalid includes determining whether a source of the vaporizer fillable component is valid or invalid.

11. The method of claim 10, wherein the determining whether a source of the vaporizer fillable component is valid or invalid includes determining that the source is valid in response to determining that the identifier is associated with at least one of a known source or a valid status stored in a memory.

12. The method of claim 1, wherein the vaporizer fillable component is a capsule configured to be operatively coupled to a vaporizer pen.

13. The method of claim 1, wherein the vaporizer fillable component is located in a vaporizer device configured to heat the consumable substance in the reservoir.

* * * * *